(12) United States Patent
Kitahara

(10) Patent No.: US 12,149,784 B2
(45) Date of Patent: Nov. 19, 2024

(54) RECEIVING DEVICE, TRANSMITTING DEVICE, AND DATA PROCESSING METHOD

(71) Applicant: Saturn Licensing LLC, New York, NY (US)

(72) Inventor: Jun Kitahara, Shizuoka (JP)

(73) Assignee: Saturn Licensing LLC, New York, NY (US)

( * ) Notice: Subject to any disclaimer, the term of this patent is extended or adjusted under 35 U.S.C. 154(b) by 0 days.

(21) Appl. No.: 15/563,776

(22) PCT Filed: Jun. 8, 2016

(86) PCT No.: PCT/JP2016/002770
§ 371 (c)(1),
(2) Date: Oct. 2, 2017

(87) PCT Pub. No.: WO2016/208137
PCT Pub. Date: Dec. 29, 2016

(65) Prior Publication Data
US 2018/0077456 A1    Mar. 15, 2018

(30) Foreign Application Priority Data

Jun. 22, 2015 (JP) .................................. 2015-125154

(51) Int. Cl.
*H04N 21/442* (2011.01)
*H04H 60/31* (2008.01)
(Continued)

(52) U.S. Cl.
CPC ...... *H04N 21/44222* (2013.01); *H04H 60/31* (2013.01); *H04N 21/235* (2013.01);
(Continued)

(58) Field of Classification Search
CPC ........... H04N 21/442; H04N 21/44204; H04N 21/6582; H04N 21/44222; H04N 21/235; H04N 21/23892; H04H 60/31
(Continued)

(56) References Cited

U.S. PATENT DOCUMENTS 6,816,878 B1 * 11/2004 Zimmers .............. G08B 27/005
340/540
7,043,473 B1 * 5/2006 Rassool ................. H04N 5/913
(Continued)

FOREIGN PATENT DOCUMENTS

EP         2667625 A2    11/2013
JP         9-46674 A      2/1997
(Continued)

OTHER PUBLICATIONS

International Search Report issued Aug. 19, 2016, in PCT/JP2016/002770 filed Jun. 8, 2016.
(Continued)

*Primary Examiner* — Jefferey F Harold
*Assistant Examiner* — Franklin S Andramuno
(74) *Attorney, Agent, or Firm* — Oblon, McClelland, Maier & Neustadt, L.L.P.

(57) ABSTRACT

A receiving device is provided that includes circuitry configured to receive a digital broadcast stream. The circuitry is configured to acquire server information corresponding to a viewing history server that collects viewing history information related to a viewing history of content. The server information is included in the digital broadcast stream. The circuitry is further configured to control transmission of the viewing history information to the viewing history server based on the acquired server information.

23 Claims, 47 Drawing Sheets

(51) Int. Cl.
| | |
|---|---|
| *H04H 60/66* | (2008.01) |
| *H04N 21/235* | (2011.01) |
| *H04N 21/2389* | (2011.01) |
| *H04N 21/258* | (2011.01) |
| *H04N 21/435* | (2011.01) |
| *H04N 21/45* | (2011.01) |
| *H04N 21/475* | (2011.01) |
| *H04N 21/488* | (2011.01) |
| *H04N 21/643* | (2011.01) |
| *H04N 21/658* | (2011.01) |
| *H04N 21/8358* | (2011.01) |
| *H04N 21/845* | (2011.01) |
| *H04N 21/858* | (2011.01) |

(52) U.S. Cl.
CPC . *H04N 21/23892* (2013.01); *H04N 21/25891* (2013.01); *H04N 21/435* (2013.01); *H04N 21/4532* (2013.01); *H04N 21/475* (2013.01); *H04N 21/4884* (2013.01); *H04N 21/64322* (2013.01); *H04N 21/6582* (2013.01); *H04N 21/8358* (2013.01); *H04N 21/845* (2013.01); *H04N 21/8586* (2013.01); *H04H 60/66* (2013.01); *H04H 2201/50* (2013.01)

(58) Field of Classification Search
USPC .................................................. 725/46, 51
See application file for complete search history.

(56) References Cited

U.S. PATENT DOCUMENTS

| | | | | |
|---|---|---|---|---|
| 8,629,939 | B1* | 1/2014 | Freund | H04N 5/145 |
| | | | | 348/468 |
| 8,695,048 | B1* | 4/2014 | Kellicker | H04N 21/47202 |
| | | | | 348/468 |
| 9,936,054 | B2* | 4/2018 | Kwak | H04N 21/6408 |
| 2002/0032781 | A1* | 3/2002 | Yoshida | H04L 29/06 |
| | | | | 709/228 |
| 2004/0049554 | A1* | 3/2004 | Watanabe | H04N 7/17318 |
| | | | | 709/217 |
| 2007/0040934 | A1 | 2/2007 | Ramaswamy et al. | |
| 2007/0180367 | A1* | 8/2007 | Chiang | G06F 16/9577 |
| | | | | 715/234 |
| 2008/0077965 | A1* | 3/2008 | Kamimaki | H04N 7/163 |
| | | | | 725/105 |
| 2008/0235368 | A1* | 9/2008 | Nagaraj | H04L 67/02 |
| | | | | 709/224 |
| 2009/0216616 | A1* | 8/2009 | Wang | G06Q 30/02 |
| | | | | 705/14.52 |
| 2009/0249418 | A1* | 10/2009 | Alastruey Gracia | |
| | | | | H04N 7/17318 |
| | | | | 725/114 |
| 2009/0287820 | A1* | 11/2009 | Okazaki | H04L 12/2809 |
| | | | | 709/225 |
| 2011/0055860 | A1 | 3/2011 | Ramaswamy et al. | |
| 2011/0145052 | A1* | 6/2011 | Lin | G06Q 10/10 |
| | | | | 705/14.27 |
| 2011/0161513 | A1* | 6/2011 | Viers | H04L 65/4084 |
| | | | | 709/231 |
| 2013/0283053 | A1 | 10/2013 | Hwang et al. | |
| 2013/0297822 | A1 | 11/2013 | Park et al. | |
| 2014/0047475 | A1* | 2/2014 | Oh | H04N 21/4355 |
| | | | | 725/40 |
| 2014/0082662 | A1 | 3/2014 | Ramaswamy et al. | |
| 2014/0201632 | A1* | 7/2014 | Kunigita | H04N 21/4667 |
| | | | | 715/716 |
| 2016/0142783 | A1* | 5/2016 | Bagga | H04N 21/4532 |
| | | | | 725/47 |
| 2016/0255394 | A1* | 9/2016 | Yang | H04N 21/64322 |
| | | | | 725/131 |
| 2016/0269765 | A1* | 9/2016 | Mandyam | H04N 21/2541 |
| 2016/0277125 | A1* | 9/2016 | Han | H04B 11/00 |
| 2016/0316032 | A1* | 10/2016 | Brunn | H04L 67/06 |
| 2017/0078765 | A1* | 3/2017 | Yang | H04N 21/2665 |
| 2018/0048408 | A1* | 2/2018 | Deshpande | H04H 20/95 |
| 2018/0152256 | A1* | 5/2018 | Deshpande | H04N 21/84 |

FOREIGN PATENT DOCUMENTS

| | | | | |
|---|---|---|---|---|
| JP | 11-275537 | A | | 10/1999 |
| JP | 11-341464 | A | | 12/1999 |
| JP | 2001-292427 | A | | 10/2001 |
| JP | 2005-176287 | A | | 6/2005 |
| JP | 2005-311810 | A | | 11/2005 |
| JP | 2006-270924 | A | | 10/2006 |
| JP | 2007-088861 | A | | 4/2007 |
| JP | 2007-214794 | A | | 8/2007 |
| JP | 201050549 | | * | 8/2008 |
| JP | 2009-278651 | A | | 11/2009 |
| JP | 2014-220569 | | | 11/2014 |
| WO | 2005/099385 | | | 10/2005 |
| WO | 2010/029743 | | | 9/2009 |
| WO | 2013/148457 | A1 | | 10/2013 |

OTHER PUBLICATIONS

N.L. Ewald-Arostegui et al., "IP/UDP Header Suppression for Signaling in an All-IP DVB Transmission System", IEEE Transactions on Broadcasting, Jun. 2012, vol. 58, No. 2, pp. 301-304.
"Timed Text Markup Language (TTML) 1.0", W3C Recommendation, Nov. 18, 2010, pp. 1-135, XP055170289.
Japanese Office Action mailed Jan. 22, 2019 in corr. Japanese Patent Application No. 2015-125154, filed Jun. 22, 2015 (w/ computer-generated English translation) 9 pp.
Office Action issued Aug. 20, 2019 in Japanese Patent Application No. 2015-125154 (With English Translation), p. 1-12.

* cited by examiner

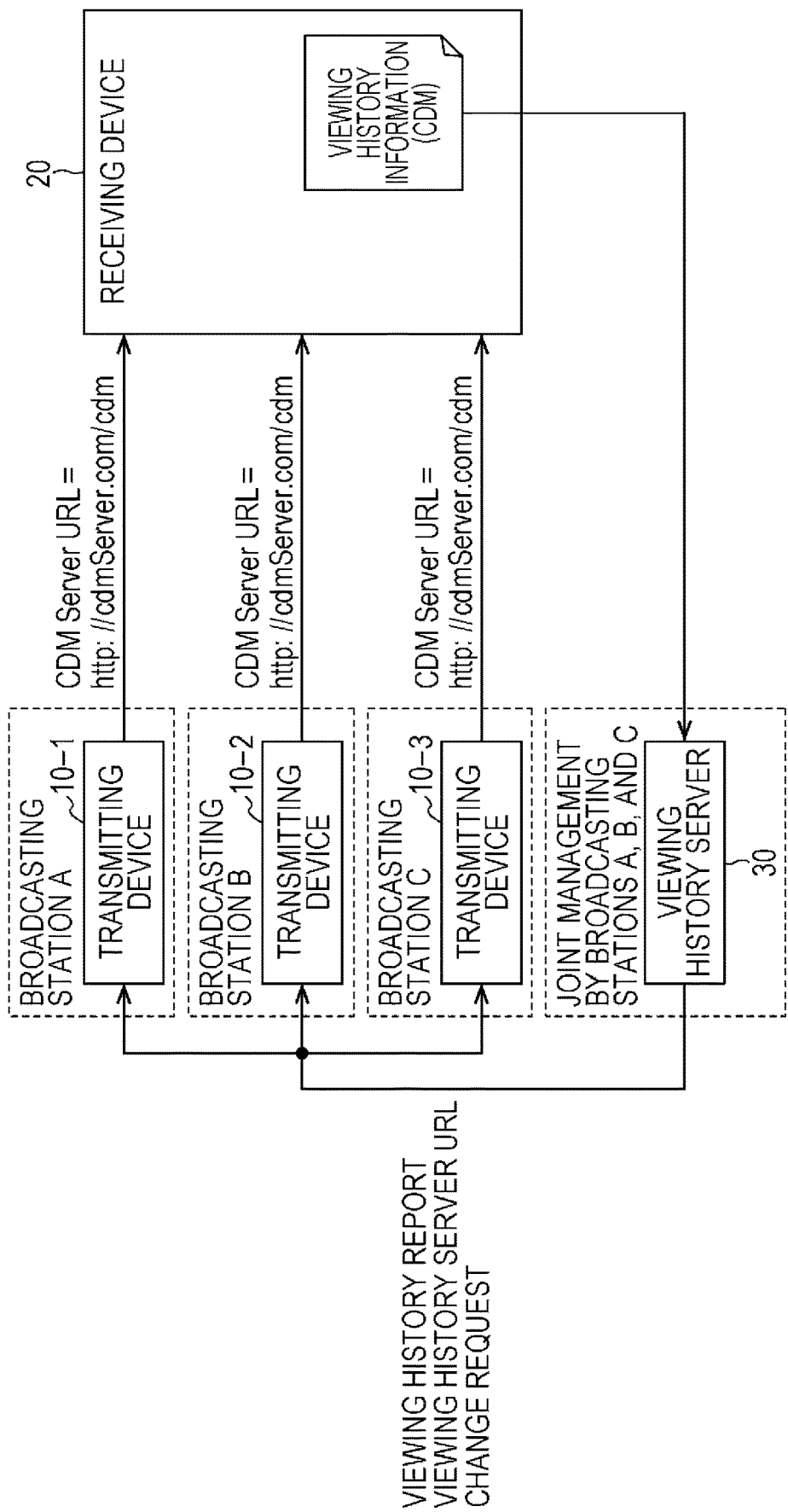

FIG. 8

| Element (or Attribute with @) | Cardinality | Data Type | Description |
|---|---|---|---|
| CDM | 1 | | Consumption Data Message |
| @protocolVersion | 1 | hexBinary | Major Version of CDM protocol |
| AVChannel | 0..N | | |
| @channelNum | 1 | hexBinary | Virtual Channel number |
| @serviceType | 1 | unsignedByte | e.g., Television, Audio only. Parameterized |
| ViewInterval | 1..N | | Virtual channel viewing interval |
| @startTime | 1 | dateTime | Start time of interval |
| @endTime | 1 | dateTime | End time of interval |
| @usageType | 1 | int | Full screen, PIP, etc. |
| @timeShift | 1 | boolean | |
| @viewStartTime | 0..1 | dateTime | |
| @viewEndTime | 0..1 | dateTime | |
| DOInterval | 0..N | | Interval of active TDO |
| @doId | 1 | string | DO ID |
| @startTime | 1 | dateTime | Start time of interval |
| @endTime | 1 | dateTime | End time of interval |
| NRTService | 0..N | | NRT service selection interval |
| @serviceID | 1 | hexBinary | |
| NRTInterval | 1..N | | |
| @startTime | 1 | dateTime | Start time of interval |
| @endTime | 1 | dateTime | End time of interval |
| NRTItem | 0..N | | Content item usage interval |
| @contentItemid | 1 | string | Content item content linkage |
| @startTime | 1 | dateTime | Start time of interval |
| @endTime | 1 | dateTime | End time of interval |

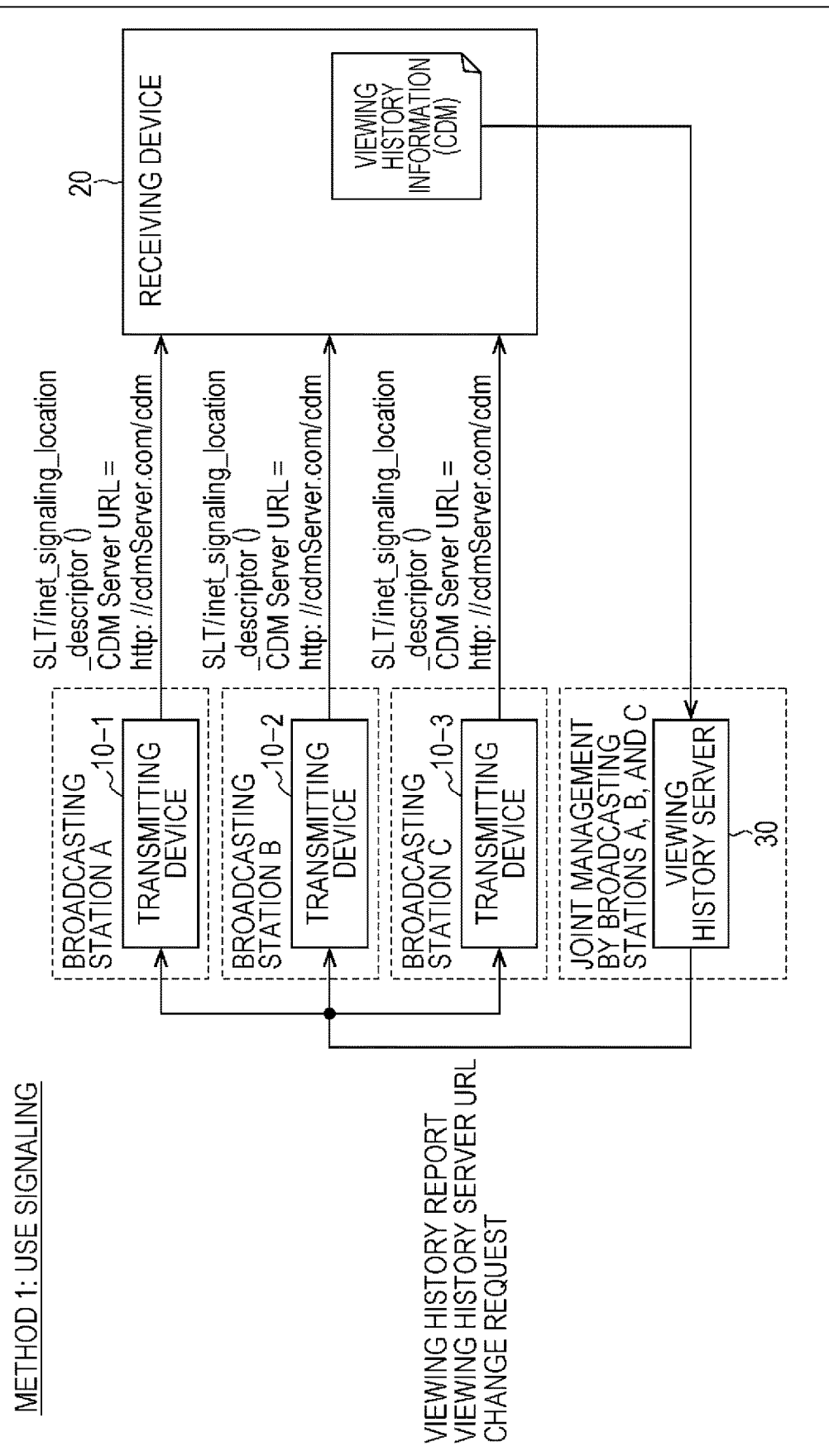

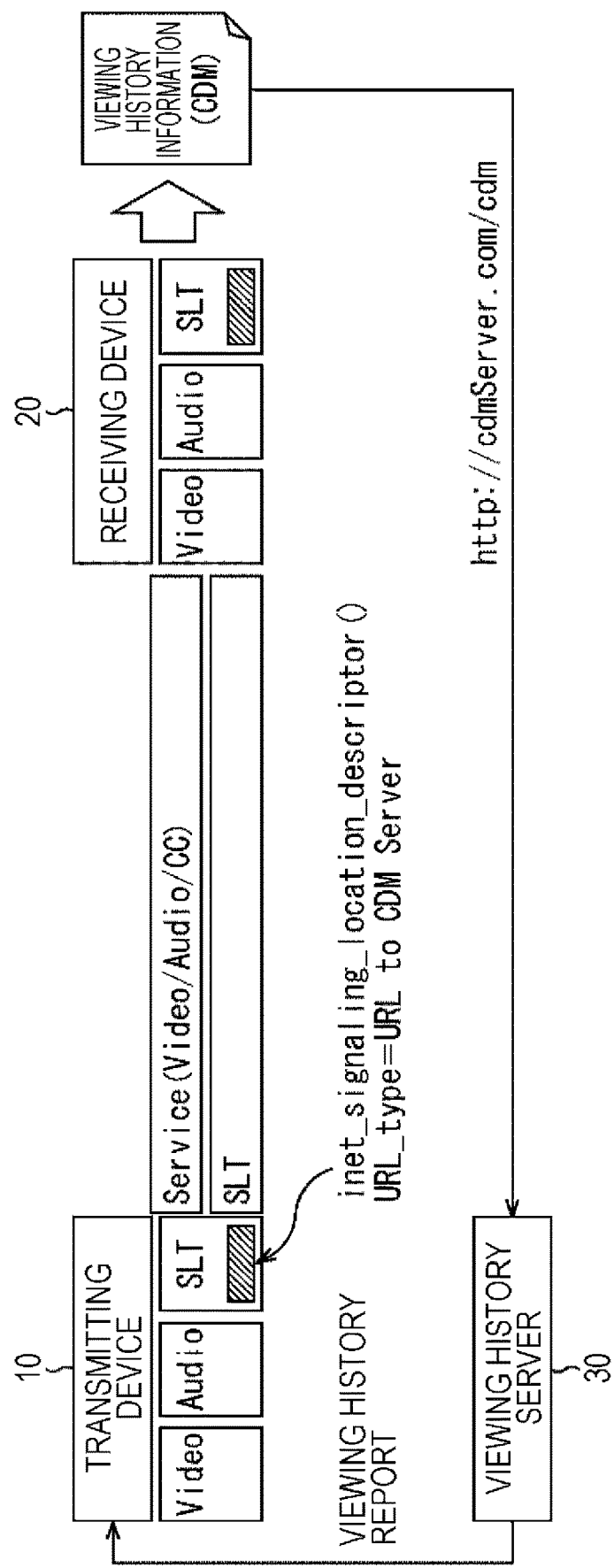

FIG. 12

| Syntax | No. of Bits | Format |
|---|---|---|
| service_list_table_section() { | | |
|   table_id | 8 | TBD |
|   SLT_section_version | 4 | uimsbf |
|   SLT_section_length | 12 | uimsbf |
|   SLT_protocol_version | 8 | uimsbf |
|   broadcast_stream_id | 16 | uimsbf |
|   SLT_section_number | 4 | uimsbf |
|   last_SLT_section_number | 4 | uimsbf |
|   num_services | 8 | uimsbf |
|   for(i=0; i<num_services; i++) { | | |
|     service_id | 16 | uimsbf |
|     SLT_service_seq_number | 3 | uimsbf |
|     protected | 1 | bslbf |
|     major_channel_number | 10 | uimsbf |
|     minor_channel_number | 10 | uimsbf |
|     service_category | 4 | uimsbf |
|     short_service_name_length /* m */ | 4 | uimsbf |
|     short_service_name() | 8*m | uimsbf |
|     broadcast_signaling_present | 1 | bslbf |
|     SLS_source_IP_address_present | 1 | bslbf |
|     broadcast_access_required | 1 | bslbf |
|     reserved | 1 | '1' |
|     SLS_protocol_type | 4 | uimsbf |
|     if(broadcast_signaling_present) { | | |
|       SLS_PLP_ID | 8 | uimsbf |
|       SLS_destination_IP_address | 32 | uimsbf |
|       SLS_destination_UDP_port | 16 | uimsbf |
|       if(SLS_source_address_present) { | | |
|         SLS_source_IP_address | 32 | uimsbf |
|       } | | |
|       SLS_protocol_version | 8 | uimsbf |
|       reserved | 4 | '1111' |
|       num_ext_length_bits /* b */ | 4 | uimsbf |
|       if(num_ext_length_bits%8)!=0 { | | |
|         reserved1 | (8-b%8) | '11111..' |
|       } | | |
|       ext_length /* e */ | b | uimsbf |
|       reserved2 | 8*e | |
|     } | | |
|     reserved | 4 | '1111' |
|     num_service_level_descriptors | 4 | uimsbf |
|     for(j=0; j<num_service_level_descriptors; j++) { | | |
|       service_level_descriptor() | var | |
|     } | | |
|   } | | |
|   reserved | 4 | '1111' |
|   num_SLT_level_descriptors | 4 | uimsbf |
|   for(n=0; n<num_SLT_level_descriptors; n++) { | | |
|     SLT_level_descriptor() | var | |
|   } | | |
|   for(k=0; k<N; k++) { | | |
|     reserved3 | | |
|   } | | |
| } | | |

A → (service_level_descriptor block)
B → (SLT_level_descriptor block)

FIG. 13

| Descriptor Name | Descriptor Tag | ATSC3.0 Broadcast | |
|---|---|---|---|
| | | Service level | SLT level |
| inet_signaling_location_descriptor () | TBD | O | O |
| service_language_descriptor () | TBD | O | O |
| capabilities_descriptor () | TBD | O | O |

| Syntax | No. of Bits | Format |
|---|---|---|
| inet_signaling_location_descriptor(){ | | |
|   descriptor_tag | 8 | TBD |
|   descriptor_length | 8 | uimsbf |
|   URL_type | 8 | uimsbf |
|   URL_bytes() | 8*(descriptor_length-1) | |
| } | | |

FIG. 15

| URL_type | Meaning |
|---|---|
| 0x00 | URL to Signaling server |
| 0x01 | URL to ESG server |
| 0x02 | URL to CDM server |
| 0x03-0xFF | Reserved for future use |

FIG. 27

| Syntax | No. of Bits | Format |
|---|---|---|
| watermark_payload() { | | |
|   run_in_pattern | 16 | 0xEB52 |
|   for(i=0; i<N; i++) { | | |
|     wm_message() | var | uimsbf |
|   } | | |
|   for(i=0; i<M; i++) { | | |
|     zero_pad | 8 | 0x00 |
|   } | | |
| } | | |

FIG. 28

| Syntax | No. of Bits | Format |
|---|---|---|
| wm_message() { | | |
|     wm_message_id | 8 | uimsbf |
|     wm_message_length | 8 | uimsbf |
|     wm_message_sequence | 4 | uimsbf |
|     fragment_number | 2 | uimsbf |
|     last_fragment | 2 | uimsbf |
|     switch(wm_message_id) { | | |
|         case 0x01: | | |
|             content_id_message() | var | Sec. 5.6.4 |
|         break; | | |
|         case 0x02: | | |
|             channel_id_message() | var | Sec. 5.6.5 |
|         break; | | |
|         case 0x03: | | |
|             uri_message() | var | Sec. 5.6.6 |
|         break; | | |
|         default: | 8 | uimsbf |
|         reserved | var | |
|     } | | |
|     if(fragment_number==last_fragment)&&<br>    (!fragment_number)) { | | |
|         message_CRC_32 | 32 | uimsbf |
|     } | | |
|     CRC_32 | 32 | uimsbf |
| } | | |

FIG. 29

| Syntax | No. of Bits | Format |
|---|---|---|
| uri_message() { | | |
|   uri_type | 8 | uimsbf |
|   uri_strlen | 8 | uimsbf |
|   URI_string() | 8*uri_strlen | |
| } | | |

FIG. 30

| uri_type value | Meaning |
|---|---|
| 0x00 | Reserved |
| 0x01 | TBD |
| 0x02 | TBD |
| 0x03 | CDM server URI |
| 0x04-0xFF | Reserved |

*FIG. 34*

| Syntax | No. of Bits | Mnemonic |
|---|---|---|
| SysMetaFrame() { | | |
| sysType; | 8 | uimsbf |
| dataLen = escapedValue (5,7,16); | | |
| sysData; | 8*dataLen | bslbf |
| } | | |

FIG. 35

| sysType | Value | Designated System for sysData |
|---|---|---|
| Undefined | 0 | |
| SYS_MP2TS | 1 | MPEG 2 TS Packet with Section [ISO/IEC 13818-1] |
| SYS_MMT | 2 | MMTP Packet [ISO/IEC 23008-1] |
| SYS_DASH | 3 | MPD [ISO/IEC 23009-1] |
| /* reserved */ | 4-127 | /* reserved for ISO use */ |
| /* reserved */ | 128-255 | /* reserved for user private */ |

FIG. 36

| Syntax | No. of Bits | Format | |
|---|---|---|---|
| sysData_atsc3_0() { | | | |
| version | 4 | uimsbf | VERSION |
| sys_data_type | 4 | uimsbf | DATA TYPE |
| if(sys_data_type==cdm_uri) { | | | |
| cdm_uri_length | 16 | uimsbf | CDM server URI LENGTH |
| cdm_uri | 8*cdm_uri_length | | CDM server URI |
| } | | | |
| } | | | |

FIG. 40

```
<tt xml:lang="" xmlns="http://www.w3.org/ns/ttml">
  <head>
    <metadata xmlns:ttm="http://www.w3.org/ns/ttml#metadata"
              xmlns:atsc3.0=" http://www.atsc.org/ns/atsc3.0">
      <ttm:title>Timed Text EXAMPLE OF TTML</ttm:title>
      <atsc3.0:cdmUri>http://cdmServer.com/cdm</atsc3.0:cdmUri>
    </metadata>
    <styling/>
    <layout/>
  </head>
  <body/>
</tt>
```

FIG. 43

| Element or Attribute Name | Use | Description |
|---|---|---|
| slt | | Root element of the SLT |
| @bsid | 1 | Identifier of the whole Broadcast Stream |
| @sltSectionVersion | 1 | Version number of the SLT section. The sltSectionVersion shall be incremented by 1 when a change in the information carried within the slt occurs. When it reaches maximum value, it shall wrap around to 0. |
| @sltSectionNumber | 0..1 | The number, counting from 1, of this section of the SLT. Shall default to 1 when not present. |
| @totalSltSectionNumbers | 0..1 | The total number of sections (that is, the section with the highest sltSectionNumber) of the SLT of which this section is part. sltSectionNumber and totalSltSectionNumbers together can be considered to indicate "Part M of N" of one portion of the SLT when it is sent in fragments. Shall default to 1 when not present. |
| @language | 0..1 | A three-character language code per ISO 639.3 indicating the primary language of the services included in this slt instance. |
| @capabilities | 0..1 | Required capabilities for decoding and meaningfully presenting the content for all the services in this slt instance. The syntax and semantics of capabilities shall follow the syntax and semantics of the atsc:capabilities element specified under the Content fragment of the ATSC 3.0 Service Announcement & Personalization spec |
| InetSigLocation | 0..1 | Provides a URL telling the receiver where it can acquire any requested type of data from external server(s) via broadband. |
| Service | 1..N | ATSC 3.0 service entry |
| @serviceId | 1 | Integer number that shall uniquely identify this Service |

FIG. 44

| Element or Attribute Name | Use | Description |
|---|---|---|
| | | within the scope of this Broadcast area. |
| @SLTserviceSeqNumber | 1 | This integer number shall indicate the sequence number of the SLT service information with service ID equal to the serviceId attribute above. SLTserviceSeqNumber value shall start at 0 for each service and shall be incremented by 1 every time any attribute in this Service element is changed. If no attribute values are changed compared to the previous Service element with a particular value of ServiceID then SLTserviceSeqNumber shall not be incremented. The SLTserviceSeqNumber field shall wrap back to 0 after reaching the maximum value. |
| @protected | 0..1 | When set to true, that one or more components necessary for meaningful presentation is protected. When set to false, this flag indicates that no components necessary for meaningful presentation of the service are protected. Default value is false. |
| @majorChannelNo | 1 | An integer number in the range 1 to 1000 that shall represent the "major" channel number of the service. |
| @minorChannelNo | 1 | An integer number in the range 1 to 1000 that shall represent the "minor" channel number of the service. |
| @serviceCategory | 1 | Attribute indicates the category of this service. |
| @shortServiceName | 1 | Short string name of the Service |
| @SLSProtocolType | 1 | An attribute indicating the type of protocol of Service Layer Signaling used by this service. |
| BroadcastSignaling | 0..1 | This element along with its attributes provides broadcast signaling related information. When the BroadcastSignaling element is not present, the child element InetSigLocation of the parent Service element shall be present and its attribute urlType shall include URL_type 0x00 (URL to signaling server). In this case attribute url shall support the query parameter svc=<service_id> where service_id |

FIG. 45

| Element or Attribute Name | Use | Description |
|---|---|---|
| | | corresponds to the serviceId attribute for the parent Service element. Alternatively when the BroadcastSignaling element is not present, the element InetSigLocation shall be present as a child element of the slt root element and the attribute urlType of that InetSigLocation element shall include URL_type 0x00 (URL to signaling server). In this case attribute url for URL_type 0x00 shall support the query parameter svc=<service_id> where service_id corresponds to the serviceId attribute for the parent Service element. |

FIG. 46

| Element or Attribute Name | Use | Description |
|---|---|---|
| @slsPlpId | 0..1 | A string representing an integer number indicating the PLP ID of the physical layer pipe carrying the SLS for this service. |
| @slsDestinationIpAddress | 0..1 | A string containing the dotted-IPv4 destination address of the packets carrying SLS data for this service. |
| @slsDestinationUdpPort | 0..1 | A string containing the port number of the packets carrying SLS data for this service. |
| @slsSourceIpAddress | 0..1 | A string containing the dotted-IPv4 source address of the packets carrying SLS data for this service. |
| @slsMajorProtocolVersion | 0..1 | Major version number of the protocol used to deliver the Service Layer Signaling for this service. Default value is 1. |
| @slsMinorProtocolVersion | 0..1 | Minor version number of the protocol used to deliver the Service Layer Signalling for this service. Default value is 0.. |
| @serviceLanguage | 0..1 | A three-character language code per ISO 639.3 ERROR! NO REFERENCE SOURCE FOUND. indicating the primary language of the service. |
| @broadbandAccessRequired | 0..1 | A Boolean indicating that broadband access is required for a receiver to make a meaningful presentation of the service. Default value is false. |
| @capabilities | 0..1 | Required capabilities for decoding and meaningfully presenting the content for the service with service ID equal to the serviceId attribute above. The syntax and semantics of capabilities shall follow the syntax and semantics of the atsc:capabilities element specified under the Content fragment of the ATSC 3.0 Service Announcement & Personalization spec ERROR! NO REFERENCE SOURCE FOUND. |
| InetSigLocation | 0..1 | Provides a URL telling the receiver where it can acquire any requested type of data from external server(s) via broadband. |

*FIG. 47*

| Element or Attribute Name | | Use | Description |
|---|---|---|---|
| InetSigLocation | | 0..1 | Contains URL telling where a receiver can acquire any requested type of data from external server(s) via broadband. |
| | @urlType | 1 | Attribute indicates the type of URL. |
| | @url | 1 | This URL can be used by a query term to indicate what the type of resource is by which requesting with this URL. If the type of resource is SLS, it gives a single URL where the receiver can retrieve SLS over broadband for all services fragment in this SLT. In this case, optional svc=<service_id> is very useful and the receiver can request SLS for a specific service if svc query string is appended at the end of query terms. If the type of resource is ESG, it gives a single URL where the receiver can retrieve ESG over broadband for all services described in this SLT. |

RECEIVING DEVICE, TRANSMITTING DEVICE, AND DATA PROCESSING METHOD

TECHNICAL FIELD

The present technology relates to a receiving device, a transmitting device, and a data processing method, and especially relates to a receiving device, a transmitting device, and a data processing method that can flexibly perform an operation related to a viewing history.

CROSS REFERENCE TO RELATED APPLICATIONS

This application claims the benefit of Japanese Priority Patent Application JP 2015-125154 filed on Jun. 22, 2015, the entire contents of which are incorporated herein by reference.

BACKGROUND ART

In the field of broadcasting, there is a case of performing an operation related to a viewing history such as collection and analysis of a viewing history of content by a user. For example, a technology for transmitting the viewing history periodically or as needed is disclosed (for example, see Patent Literature 1).

CITATION LIST

Patent Literature

PTL 1: JP 2009-278651 A

SUMMARY OF INVENTION

Technical Problem

By the way, since a technical method for performing the operation related to a viewing history has not yet been established, proposals for flexibly performing the operation related to a viewing history have been requested.

The present technology has been made in view of the foregoing, and enables a flexible operation related to a viewing history.

Solution to Problem

According to an embodiment of the present disclosure, there is provided a receiving device including circuitry configured to receive a digital broadcast stream. The circuitry is configured to acquire server information corresponding to a viewing history server that collects viewing history information related to a viewing history of content. The server information is included in the digital broadcast stream. The circuitry is further configured to control transmission of the viewing history information to the viewing history server based on the acquired server information.

According to an embodiment of the present disclosure, there is provided a data processing method of a receiving device. The method includes acquiring, by circuitry of the receiving device, server information corresponding to a viewing history server that collects viewing history information related to a viewing history of content. The server information is included in a digital broadcast stream. The method further includes controlling, by the circuitry of the receiving device, transmission of the viewing history information to the viewing history server based on the acquired server information.

According to an embodiment of the present disclosure, there is provided a transmitting device including circuitry configured to generate server information corresponding to a viewing history server that collects viewing history information related to a viewing history of content. The server information is included in a digital broadcast stream. The circuitry is further configured to transmit the digital broadcast stream including the generated server information and the content.

According to an embodiment of the present disclosure, there is provided a data processing method of a transmitting device. The method includes generating, by circuitry of the transmitting device, server information corresponding to a viewing history server that collects viewing history information related to a viewing history of content. The server information is included in a digital broadcast stream. The method further includes transmitting, by the circuitry of the transmitting device, the digital broadcast stream including the generated server information and the content.

Advantageous Effects of Invention

According to the first and second aspects of the present technology, the operation related to a viewing history can be flexibly performed.

Note that the effects described here are not necessarily limited, and any of the effects described in the present disclosure may be exerted.

BRIEF DESCRIPTION OF DRAWINGS

FIG. 7 is a diagram illustrating a collection example of viewing history information (CDM).

FIG. 8 is a diagram illustrating an example of syntax of the CDM.

FIG. 10 is a diagram illustrating a collection example of viewing history information (CDM) in a case of transmitting a viewing history server URL using signaling.

FIG. 11 is a diagram illustrating a method 1 of a method of notifying a viewing history server URL in a case of using signaling.

FIG. 12 is a diagram illustrating an example of syntax of an SLT.

FIG. 13 is a diagram illustrating an example of a descriptor arranged in the SLT.

FIG. 14 is a diagram illustrating an example of syntax of a signaling location descriptor.

FIG. 15 is a diagram illustrating an example of URL_type.

FIG. 27 is a diagram illustrating an example of syntax of a watermark payload.

FIG. 28 is a diagram illustrating an example of syntax of a WM message.

FIG. 29 is a diagram illustrating an example of syntax of a URI message.

FIG. 30 is a diagram illustrating an example of uri_type.

FIG. 34 is a diagram illustrating an example of syntax of an SYS metaframe.

FIG. 35 is a diagram illustrating an example of sysType.

FIG. 36 is a diagram illustrating an example of sysData.

FIG. 40 is a diagram illustrating a description example of a TTML document.

FIG. 43 is a diagram illustrating an example of syntax of an SLT in an XML format.

FIG. 44 is a diagram illustrating an example of syntax of an SLT in an XML format.

FIG. 45 is a diagram illustrating an example of syntax of an SLT in an XML format.

FIG. 46 is a diagram illustrating an example of syntax of an SLT in an XML format.

FIG. 47 is a diagram illustrating an example of syntax of a signaling location descriptor in an XML format.

DESCRIPTION OF EMBODIMENTS

Hereinafter, embodiments of the present technology will be described with reference to the drawings. Note that the description will be given in the following order.

1. Configuration of System
2. Outline of Present Technology
3. Specific Operation Examples
    (1) Method 1: Transmission of Viewing History Server URL Using Signaling
    (2) Method 2: Transmission of Viewing History Server URL Using Video Watermark
    (3) Method 3: Transmission of Viewing History Server URL Using Audio User Data
    (4) Method 4: Transmission of Viewing History Server URL Using Metadata of TTML Document
4. Modification
5. Configuration of Computer 1. Configuration of System (Configuration of Transmission System)

Figure 1:
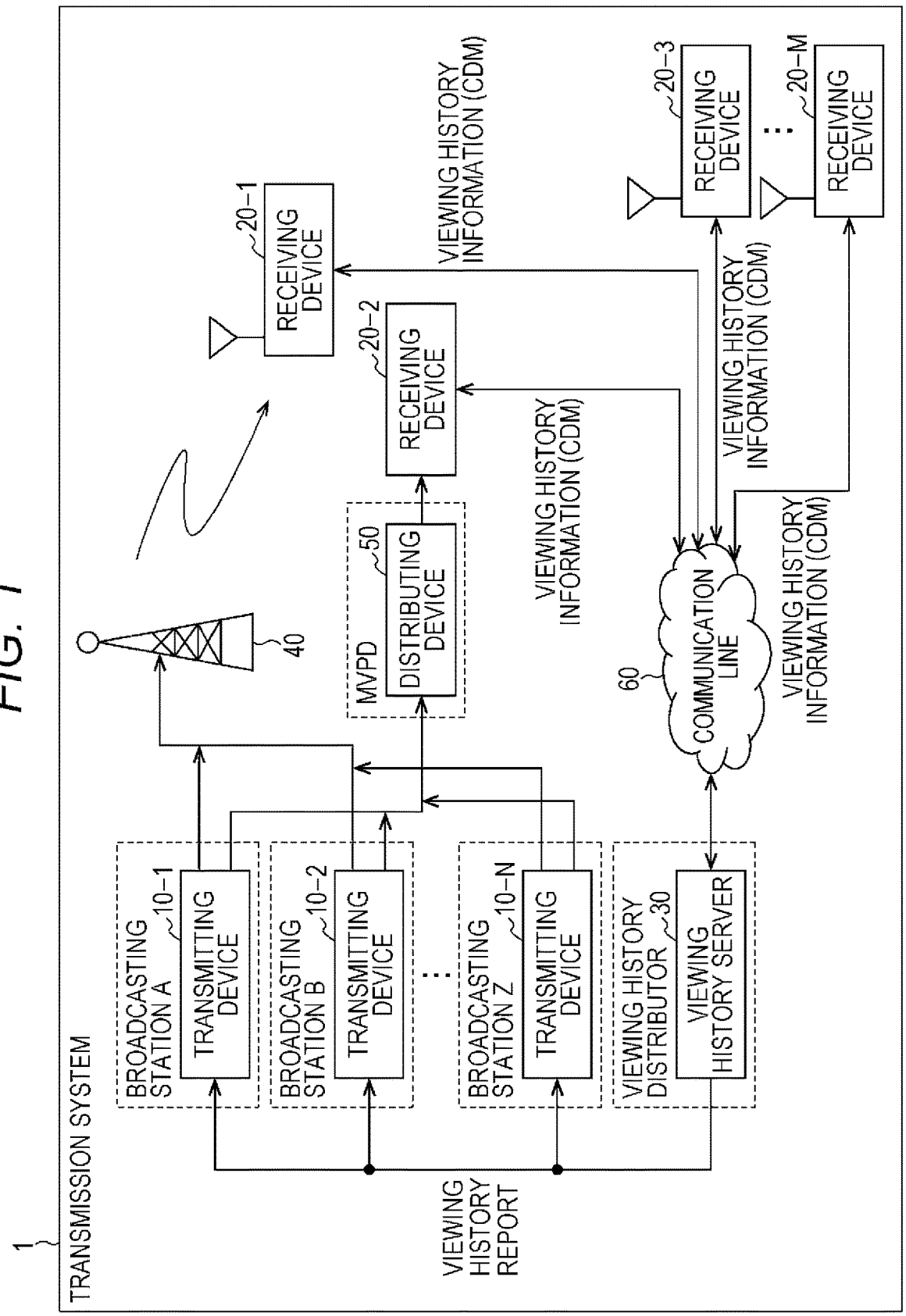
FIG. 1 is a diagram illustrating a configuration of an embodiment of a transmission system to which the present technology is applied.

FIG. 1 is a diagram illustrating a configuration of an embodiment of a transmission system to which the present technology is applied. Note that a system refers to a plurality of logically collected devices.

A transmission system 1 is configured from transmitting devices 10-1 to 10-N(N is an integer of 1 or more), receiving devices 20-1 to 20-M (M is an integer of 1 or more), a viewing history server 30, a transmitting facility 40, and a distributing device 50. Further, the receiving devices 20-1 to 20-M and the viewing history server 30 are mutually connected through a communication line 60.

The transmitting device 10-1 is a transmitter complying with a digital broadcasting standard such as the advanced television systems committee (ATSC), and installed by a broadcasting station A. The transmitting device 10-1 transmits a digital broadcasting signal including content (for example, a television program) and signaling through the transmitting facility 40. Further, the transmitting device 10-1 transmits the digital broadcasting signal including the content and the like to the distributing device 50. Note that the distributing device 50 is installed by multichannel video programming distributors (MVPD) that provides pay broadcasting such as a cable television (CATV) or satellite broadcasting, and distributes the content provided by the transmitting device 10-1.

The transmitting devices 10-2 to 10-N are installed by broadcasting stations such as a broadcasting station B and a broadcasting station Z. The transmitting devices 10-2 to 10-N transmit the digital broadcasting signals including content and signaling through the transmitting facility 40 or the distributing device 50. Note that, in the description below, when the transmitting devices 10-1 to 10-N do not need to be especially distinguished, they are referred to as transmitting device 10 and description will be given.

The receiving device 20-1 is a receiver complying with a standard of digital broadcasting such as the ATSC, and is, for example, a fixed receiver such as a television receiver or a set-top box, or a mobile receiver such as a smart phone, a mobile phone device, or a tablet-type computer. Further, the receiving device 20-1 may be a device mounted in an automobile, such as an on-vehicle television.

The receiving device 20-1 receives (directly receives), with an antenna, the digital broadcasting signal transmitted through the transmitting facility 40 as a radio wave tower from the transmitting device 10, and reproduces the content (for example, the television program or the like) according to a channel selection operation of a service (channel) by a user. Further, the receiving device 20-1 records (accumulates) viewing history information related to a viewing history of the content. Here, as the viewing history information, a consumption data message (CDM) defined by the ATSC can be used. The receiving device 20-1 transmits the viewing history information (CDM) to the viewing history server 30 through the communication line 60 according to a uniform resource locator (URL) of the viewing history server 30.

Note that the URL of the viewing history server 30 (hereinafter, referred to as viewing history server URL) is included in the digital broadcasting signal and transmitted from the transmitting device 10. Therefore, the receiving device 20-1 acquires and holds the viewing history server URL included in the digital broadcasting signal. As the method of transmitting the viewing history server URL, there are a method 1 that is a method using signaling, a method 2 that is a method using a video watermark, a method 3 that is a method using audio user data, and a method 4 that is a method using metadata of a TTML document, and details of the methods will be described below.

The receiving device 20-2 is a fixed receiver such as a television receiver, a mobile receiver such as a smart phone, or the like, similarly to the receiving device 20-1. The receiving device 20-2 receives (indirectly receives) the content (the digital broadcasting signal of the content) received from the transmitting device 10 through the distributing device 50 of the MVPD, and reproduces the content according to the channel selection operation of a service.

Further, the receiving device 20-2 records (accumulates) the viewing history information (CDM) of the content, and transmits the viewing history information (CDM) to the viewing history server 30 through the communication line 60 according to the viewing history server URL, similarly to the receiving device 20-1.

The receiving devices 20-3 to 20-M are, for example, a fixed receiver such as a television receiver, a mobile receiver such as a smart phone, or the like, similarly to the receiving device 20-1 and the receiving device 20-2.

The receiving devices 20-3 to 20-M receive (directly receive) the digital broadcasting signal transmitted from the transmitting device 10 through the transmitting facility 40, or receive (indirectly receive) the content (the digital broadcasting signal of the content) distributed through the distributing device 50 of the MVPD, and reproduces the content according to the channel selection operation of a service.

Further, the receiving devices 20-3 to 20-M record (accumulate) the viewing history information (CDM) of the content, and transmits the viewing history information (CDM) to the viewing history server 30 through the communication line 60 according to the viewing history server URL, similarly to the receiving device 20-1 and the receiving device 20-2. When the receiving devices 20-1 to 20-M do not need to be especially distinguished, they are referred to as receiving device 20, and description will be given.

The viewing history server 30 is a server that collects and processes the viewing history information (CDM) transmitted from the plurality of receiving devices 20. The viewing history server 30 is provided by a viewing history provider such as a sole broadcasting provider, a joint management provider established by a plurality of broadcasting providers (for example, broadcasting stations A to Z), or a provider by a third party organization (for example, a representative organization that specially performs viewing rate investigation) that is irrelevant to a broadcasting provider.

The viewing history server 30 receives and accumulates (collects) the viewing history information (CDM) transmitted from the receiving devices 20-1 to 20-M through the communication line 60. The viewing history server 30 then performs various types of processing such as an analysis of the viewing history, for the collected viewing history information (CDM). For example, the viewing history server 30 generates a viewing history report related to the viewing history of each broadcasting station, and provides the viewing history report to the transmitting device 10 of each broadcasting station.

The configuration of the transmission system 1 has been described. Next, configuration examples of the transmitting device 10, the receiving device 20, and the viewing history server 30 that configure the transmission system 1 of FIG. 1 will be described.

(Configuration of Transmitting Device)

Figure 2:
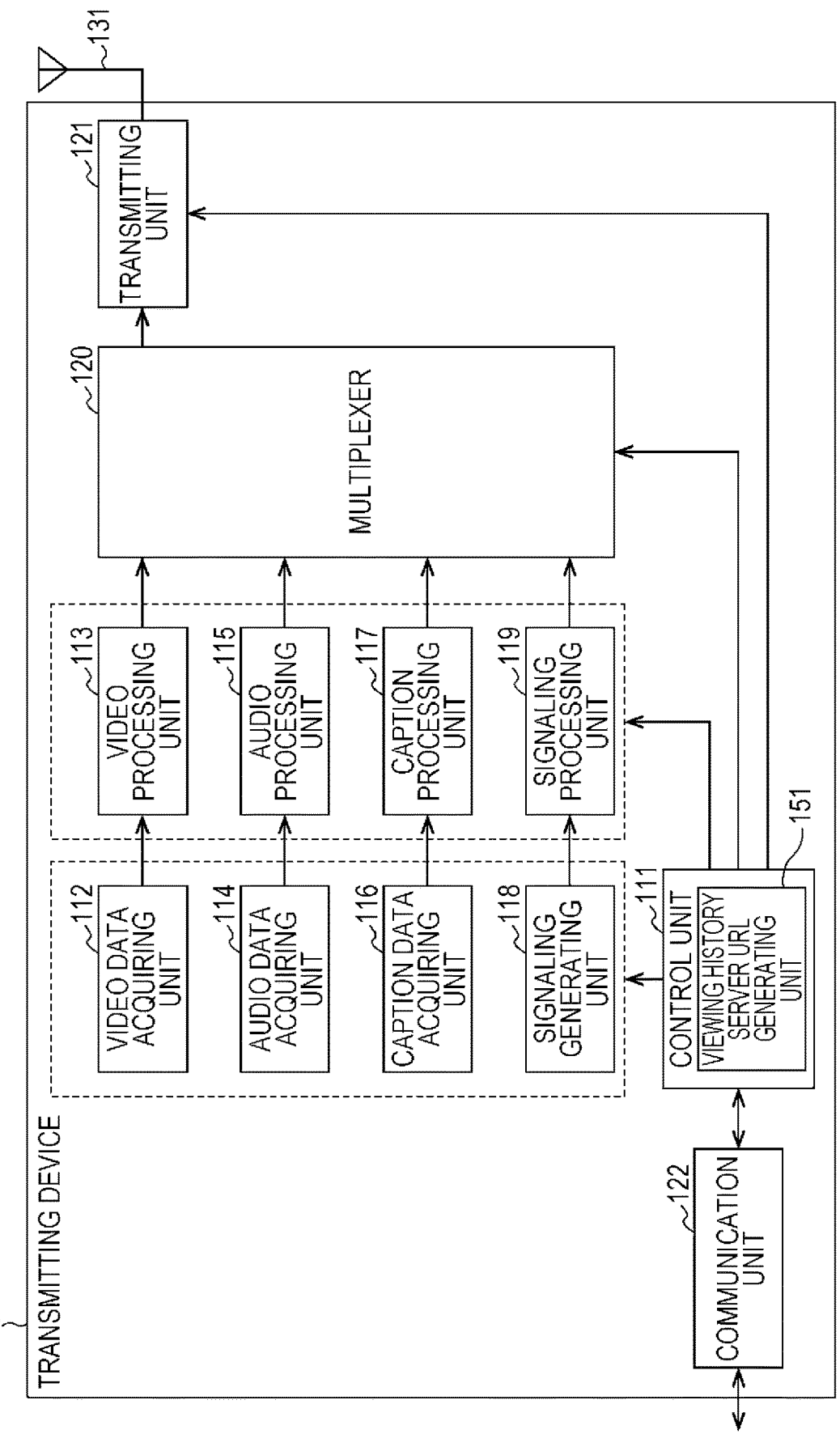
FIG. 2 is a diagram illustrating a configuration example of a transmitting device.

FIG. 2 is a diagram illustrating a configuration example of the transmitting device 10 of FIG. 1.

In FIG. 2, the transmitting device 10 is configured from a control unit 111, a video data acquiring unit 112, a video processing unit 113, an audio data acquiring unit 114, an audio processing unit 115, a caption data acquiring unit 116, a caption processing unit 117, a signaling generating unit 118, a signaling processing unit 119, a multiplexer 120, a transmitting unit 121, and a communication unit 122.

The control unit 111 controls operations of respective units of the transmitting device 10.

The video data acquiring unit 112 acquires video data (a component of a video) of the content (for example, a television program or the like) from an external server, a camera, a recording medium, or the like, and supplies the video data to the video processing unit 113. The video processing unit 113 applies processing such as encoding processing conforming to a predetermined encoding method to the video data supplied from the video data acquiring unit 112, and supplies the processed video data to the multiplexer 120.

The audio data acquiring unit 114 acquires audio data (a component of an audio) of the content (for example, a television program or the like) from an external server, a microphone, a recording medium, or the like, and supplies the audio data to the audio processing unit 115. The audio processing unit 115 applies processing such as encoding processing conforming to a predetermined encoding method to the audio data supplied from the audio data acquiring unit 114, and supplies the processed audio data to the multiplexer 120.

The caption data acquiring unit 116 acquires caption data (a component of a caption) of the content (for example, a television program or the like) from an external server, a recording medium, or the like, and supplies the caption data to the caption processing unit 117. The caption processing unit 117 applies processing such as encoding processing conforming to a predetermined encoding method to the caption data supplied from the caption data acquiring unit 116, and supplies the processed caption data to the multiplexer 120.

The signaling generating unit 118 generates signaling information used in processing such as channel selection or reproduction of the content, and supplies the signaling information to the signaling processing unit 119. The signaling processing unit 119 processes the signaling information supplied from the signaling generating unit 118, and supplies the processed signaling information to the multiplexer 120. Here, for example, link layer signaling (LLS) signaling information, or service layer signaling (SLS) signaling information is generated and processed.

The multiplexer 120 multiplexes a video stream supplied from the video processing unit 113, an audio stream supplied from the audio processing unit 115, a caption stream supplied from the caption processing unit 117, and the signaling information supplied from the signaling processing unit 119, and supplies a multiplexed stream obtained as a result of the multiplexing to the transmitting unit 121.

The transmitting unit 121 transmits the multiplexed stream supplied from the multiplexer 120 as a broadcasting wave (digital broadcasting signal) of the digital broadcasting through an antenna 131.

Further, the control unit 111 includes a viewing history server URL generating unit 151. The viewing history server URL generating unit 151 generates the viewing history server URL. The viewing history server URL generating unit 151 supplies the generated viewing history server URL to the signaling generating unit 118, the video processing unit 113, the audio processing unit 115, or the caption processing unit 117 according to the method from the method 1 to the method 4. The viewing history server URL is included in the multiplexed stream multiplexed by the multiplexer 120 according to the method from the method 1 to method 4.

The communication unit 122 exchanges data with the viewing history server 30 (FIG. 1) through various networks (not illustrated) according to control from the control unit 111. For example, the communication unit 122 receives the viewing history report transmitted from the viewing history server 30, and supplies the viewing history report to the control unit 111. The control unit 111 acquires the viewing history report supplied from the communication unit 122, and performs processing of presenting the viewing history report, for example.

(Configuration of Receiving Device)

Figure 3:
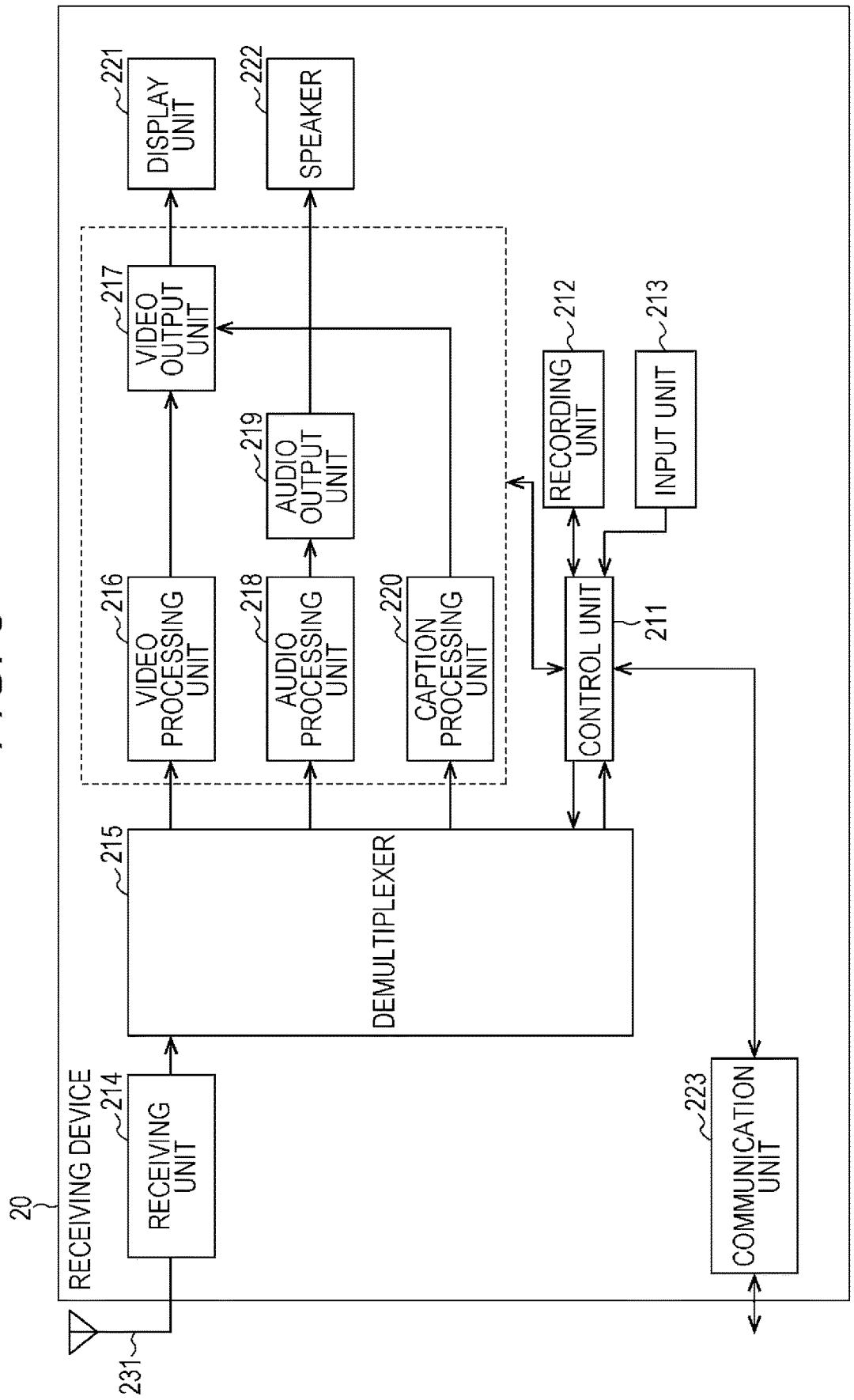
FIG. 3 is a diagram illustrating a configuration example of a receiving device.

FIG. 3 is a diagram illustrating a configuration example of the receiving device 20 of FIG. 1.

In FIG. 3, the receiving device 20 is configured from a control unit 211, a recording unit 212, an input unit 213, a receiving unit 214, a demultiplexer 215, a video processing unit 216, a video output unit 217, an audio processing unit 218, an audio output unit 219, a caption processing unit 220, a display unit 221, a speaker 222, and a communication unit 223. FIG. 3 illustrates the configuration including the display unit 221 and the speaker 222. However, a configuration without the display unit 221 and the speaker 222 may be employed.

The control unit 211 controls operations of the respective units of the receiving device 20. The recording unit 212 is, for example, a non-volatile memory such as a non-volatile RAM (NVRAM), and records various types of data according to control from the control unit 211. The input unit 213 supplies an operation signal to the control unit 211 according to an operation of the user.

The receiving unit 214 extracts and demodulates a signal according to the channel selection operation of a service from the broadcasting wave (digital broadcasting signal) of the digital broadcasting received through an antenna 231, and supplies the multiplexed stream obtained as a result to the demultiplexer 215.

The demultiplexer 215 separates the multiplexed stream supplied from the receiving unit 214 into the audio, video, and caption streams, and the signaling information. The demultiplexer 215 supplies the video data (the component of a video) to the video processing unit 216, the audio data (the component of an audio) to the audio processing unit 218, the caption data (the component of a caption) to the caption processing unit 220, and the signaling information to the control unit 211, respectively.

The control unit 211 controls the operations of the respective units such as the demultiplexer 215 and the processing units of the respective components based on the signaling information supplied from the demultiplexer 215 in order to reproduce the content.

The video processing unit 216 applies processing such as decoding processing conforming to a predetermined decoding method to the video data supplied from the demultiplexer 215, and supplies the processed video data to the video output unit 217. The video output unit 217 outputs the video data supplied from the video processing unit 216 to the display unit 221. Accordingly, in the display unit 221, a video of the content (for example, a television program or the like) according to the channel selection operation of a service is displayed.

The audio processing unit 218 applies processing such as decoding processing conforming to a predetermined decoding method to the audio data supplied from the demultiplexer 215, and supplies the processed audio data to the audio output unit 219. The audio output unit 219 outputs the audio data supplied from the audio processing unit 218 to the speaker 222. Accordingly, an audio of the content (for example, a television program or the like) according to the channel selection operation of a service is output from the speaker 222.

The caption processing unit 220 applies processing such as decoding processing conforming to a predetermined decoding method to the caption data supplied from the demultiplexer 215, and supplies the processed caption data to the video output unit 217. The video output unit 217 displays a caption corresponding to the caption data supplied from the caption processing unit 220 to be superimposed on the video corresponding to the video data supplied from the video processing unit 216. Accordingly, in the display unit 221, the caption superimposed on the video of the content (for example, a television program or the like) according to the channel selection operation of a service.

The communication unit 223 exchanges various types of data with the viewing history server 30 through the communication line 60 according to control from the control unit 211.

(Functional Configuration of Control Unit)

Figure 4:
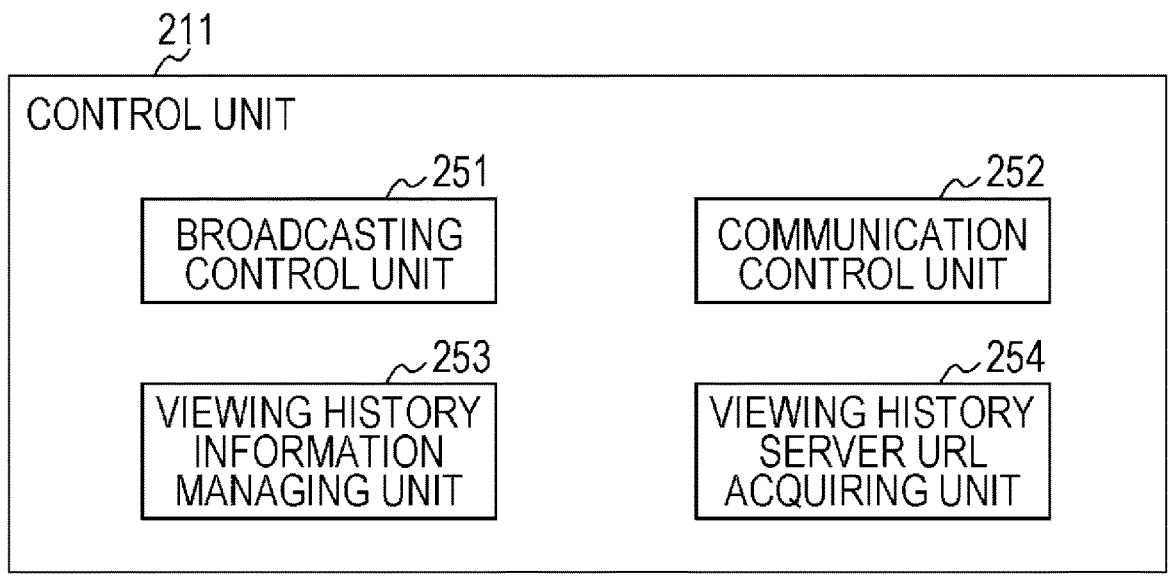
FIG. 4 is a diagram illustrating a functional configuration example of a control unit.

FIG. 4 is a diagram illustrating a functional configuration example of the control unit 211 of FIG. 3.

In FIG. 4, the control unit 211 is configured from a broadcasting control unit 251, a communication control unit 252, a viewing history information managing unit 253, and a viewing history server URL acquiring unit 254.

The broadcasting control unit 251 controls the respective units such as the receiving unit 214, the demultiplexer 215, and the processing units and output units of the respective components in order to reproduce the content included in the digital broadcasting signal transmitted from the transmitting device 10.

The communication control unit 252 controls the communication unit 223 in order to exchange various types of data with the viewing history server 30 through the communication line 60.

The viewing history information managing unit 253 manages the viewing history information (CDM) of the content. When it becomes timing to record the viewing history information (CDM), the viewing history information managing unit 253 records (accumulates) the viewing history information (CDM) according to a viewing state of the content by the user to the recording unit 212.

The viewing history server URL acquiring unit 254 acquires the viewing history server URL included in the multiplexed stream to be separated by the demultiplexer 215 according to the method from the method 1 to method 4, and records (holds) the viewing history server URL to the recording unit 212.

When it becomes timing to transmit the viewing history information (CDM) to the viewing history server 30, the viewing history information managing unit 253 reads the viewing history information (CDM) and the viewing history server URL from the recording unit 212, and supplies the viewing history information (CDM) and the viewing history server URL to the communication control unit 252.

To the communication control unit 252, the viewing history information (CDM) and the viewing history server URL are supplied from the viewing history information managing unit 253. The communication control unit 252 controls the communication unit 223 so that the viewing history information (CDM) is transmitted to the viewing history server 30 through the communication line 60 based on the viewing history server URL.

(Configuration of Viewing History Server)

Figure 5:
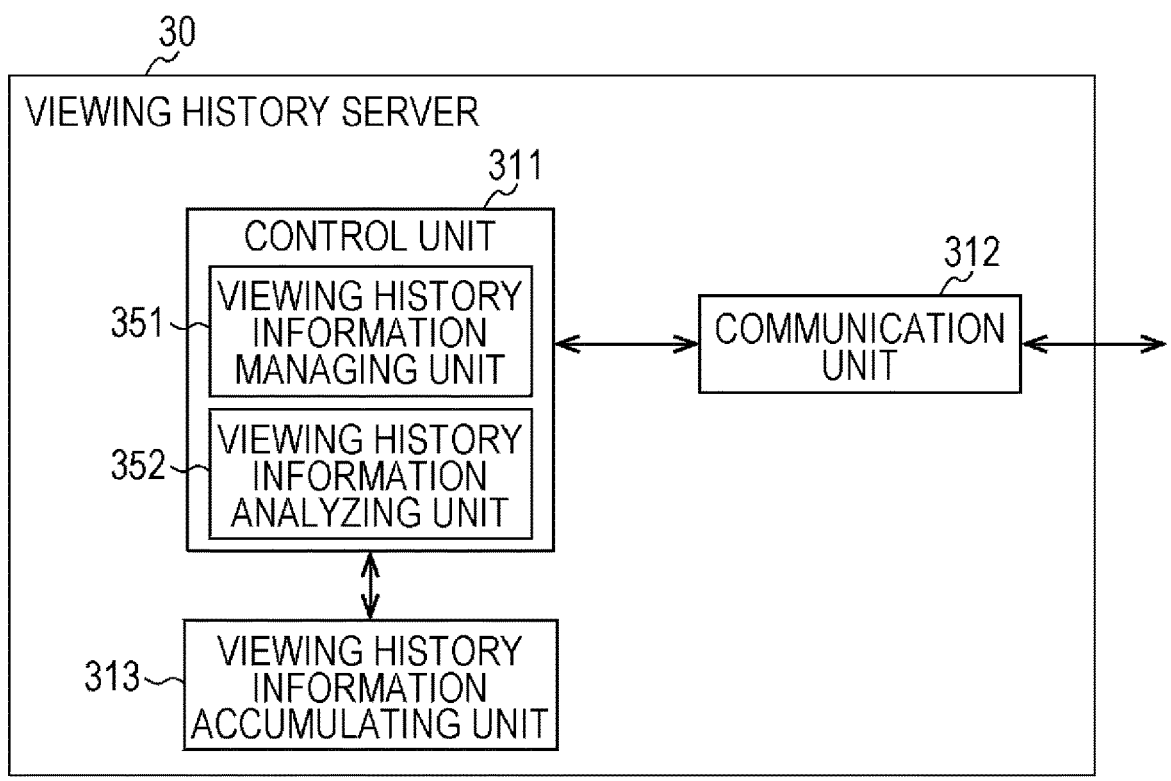
FIG. 5 is a diagram illustrating a configuration example of a viewing history server.

FIG. 5 is a diagram illustrating a configuration example of the viewing history server 30 of FIG. 1.

In FIG. 5, the viewing history server 30 is configured from a control unit 311, a communication unit 312, and a viewing history information accumulating unit 313.

The control unit 311 controls operations of the respective units of the viewing history server 30. The control unit 311 is configured from a viewing history information managing unit 351 and a viewing history information analyzing unit 352. The viewing history information managing unit 351 manages the viewing history information (CDM). The viewing history information analyzing unit 352 analyzes the viewing history information (CDM).

The communication unit 312 receives the viewing history information (CDM) transmitted from the receiving device 20 through the communication line 60 according to the control from the control unit 311, and supplies the viewing history information (CDM) to the control unit 311. The viewing history information managing unit 351 records (accumulates) the viewing history information (CDM) supplied from the communication unit 312 to the viewing history information accumulating unit 313. Accordingly, in the viewing history information accumulating unit 313, the viewing history information (CDM) sequentially sent from the plurality of receiving devices 20 is collected, and is accumulated for each broadcasting station.

When it becomes timing to analyze the viewing history information (CDM), the viewing history information analyzing unit 352 reads the viewing history information (CDM) of each broadcasting station from the viewing history information accumulating unit 313 and analyzes the viewing history information (CDM). The viewing history information analyzing unit 352 generates the viewing history report of each broadcasting station based on an analysis result of the viewing history information (CDM), and supplies the viewing history report to the communication unit 312. The communication unit 312 transmits the viewing history report of each broadcasting station to the transmitting device 10 of the target broadcasting station through various types of networks (not illustrated) according to control from the control unit 311.

2. Outline of Present Technology

By the way, in the next-gen ATSC standard called ATSC 3.0, an IP transmission method is employed, and as data transmission, use of an Internet protocol (IP)/user datagram protocol (UDP) packet, that is, an IP packet including a UDP packet, instead of a transport stream (TS) packet, has been determined. Further, in broadcasting methods other than ATSC 3.0, use of an IP transmission method using an IP packet in the future is expected.

Further, in the ATSC 3.0, as transport protocols, real-time object delivery over unidirectional transport (ROUTE) and MPEG media transport (MMT) co-exist, and streams (of components) such as a video, an audio, and a caption are transmitted using either one of the transport protocols. Note that which of the ROUTE and MMT is used as the transport protocol is selected for each broadcasting provider.

Here, the ROUTE is a protocol of extended file delivery over unidirectional transport (FLUTE) that is a protocol suitable for unidirectional multicast transfer of a binary file. Further, the MMT is a transport method used on an Internet protocol (IP), and can refer to data of the video, the audio, and the like by setting an IP address or a uniform resource locator (URL) with control information.

Further, in the ATSC 3.0, as signaling, definition of link layer signaling (LLS) signaling information and service layer signaling (SLS) signaling information is expected, and the SLS signaling information of each service is acquired according to information described in the LLS signaling information acquired in advance.

Here, as the LLS signaling information, for example, metadata such as a service list table (SLT) is included. The SLT includes information (service configuration information) that indicates configurations of a stream and a service in a broadcasting network, such as information necessary for channel selection of a service (channel selection information).

Further, as the SLS signaling information, for example, metadata such as user service description (USD), LCT session instance description (LSID), media presentation description (MPD) is included. The USD includes information such as an acquisition destination of other metadata. The LSID is control information of a ROUTE protocol. The MPD is control information for managing reproduction of a stream of a component. Note that the metadata such as the USD, LSID, and MPD is described in markup language such as extensible markup language (XML). Further, the MPD conforms to the standard of dynamic adaptive streaming over HTTP (MPEG-DASH).

(Protocol Stack)

Figure 6:
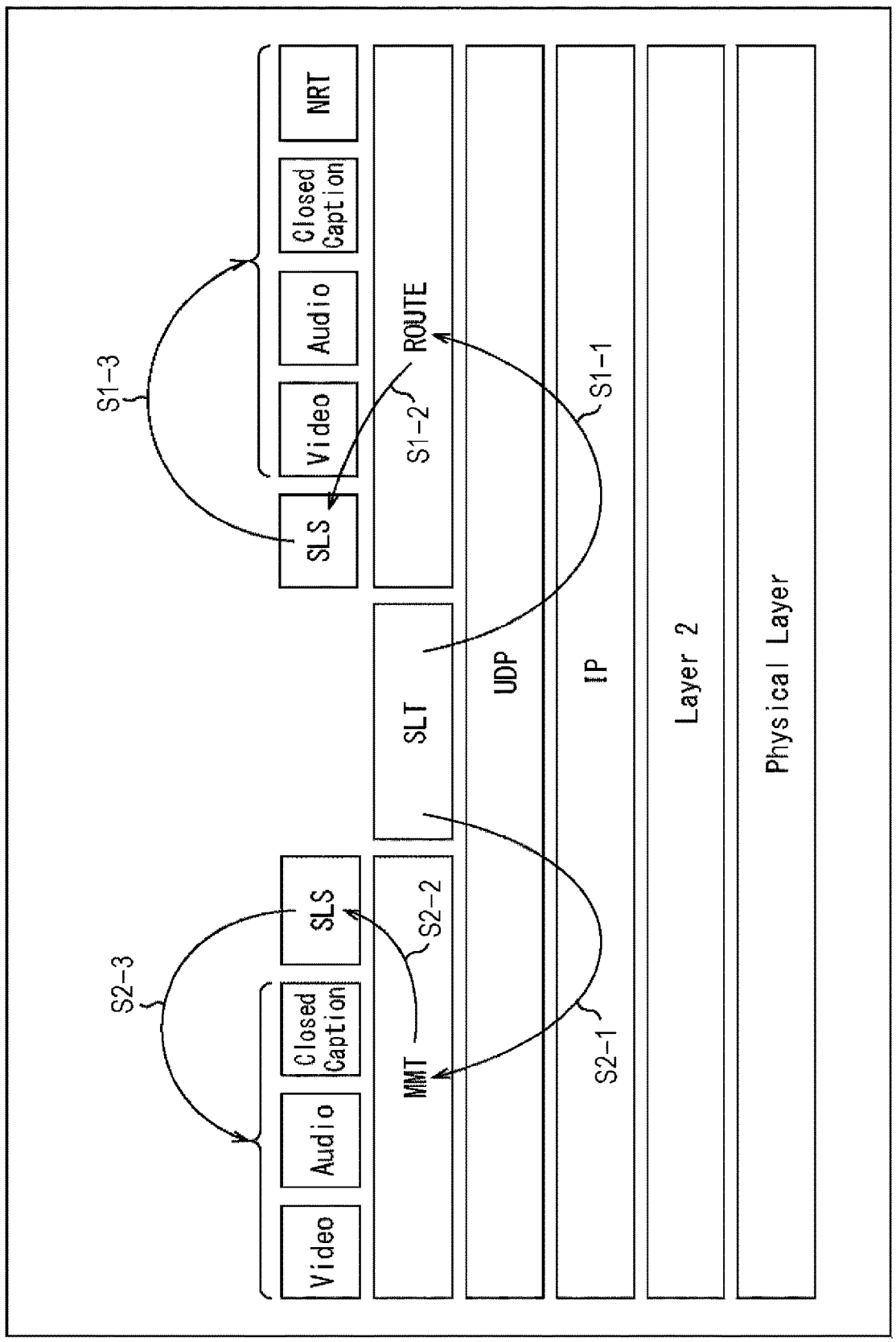
FIG. 6 is a diagram illustrating protocol stack of an IP transmission method to which the present technology is applied.

FIG. 6 is a diagram illustrating a protocol stack of an IP transmission method to which the present technology is applied.

In FIG. 6, the lowest hierarchy is a physical layer. A higher hierarchy adjacent to the physical layer is a hierarchy of a layer 2 (Layer2), and a higher hierarchy adjacent to the hierarchy of the layer 2 is an IP layer. Further, a higher hierarchy adjacent to the IP layer is a UDP layer. That is, the IP packet (IP/UDP packet) including the UDP packet is arranged in a payload of a L2 packet (generic packet) of the layer 2, and is encapsulated (encapsulation). Further, a L1 frame (physical frame) of the physical layer is configured from a preamble and a data portion, and in the data portion, data is mapped, the data being obtained by performing processing related to the physical layer such as interleave and mapping, after adding error correction parity to a BB frame obtained by encapsulation of a plurality of L2 packets.

A higher hierarchy adjacent to the UDP layer is ROUTE, MMT, and SLT. That is, the video, audio, and caption streams, an SLS signaling information stream, and an NRT content stream, transmitted by an ROUTE session, are stored in the IP/UDP packet and transmitted. Note that the NRT content is content distributed by non real time (NRT) broadcasting, and is accumulated in a storage of the receiving device 20 once and reproduced. Further, a file other than the NRT content (for example, a file of an application) may be transmitted by the ROUTE session.

Meanwhile, the video, audio, and caption streams and the SLS signaling information stream transmitted by an MMT session are stored in the IP/UDP packet and transmitted. Further, the SLT is stored in the IP/UDP packet and transmitted.

In the IP transmission method to which the present technology is applied, when the above protocol stack is employed, the receiving device 20 acquires the SLS signaling information transmitted by the ROUTE session according to the channel selection information included in the SLT at the time of the channel selection of a service (channel) provided by the streams of the components transmitted by the ROUTE session (S1-1, S1-2). The receiving device 20 is then connected with the streams of the components of the selected service according to the metadata such as the USD, LSID, and MPD (S1-3). Accordingly, the receiving device 20 outputs a video and an audio of content (for example, a television program) according to the channel selection operation of the service.

Further, the receiving device 20 acquires the SLS signaling information transmitted by the MMT session, according to the channel selection information included in the SLT, at the time of the channel selection of a service provided by the streams of the components transmitted by the MMT session (S2-1, S2-2). The receiving device 20 is then connected with the streams of the components of the selected service according to the metadata such as the USD, LSID, and MPD (S2-3). Accordingly, the receiving device 20 outputs a video and an audio of content (for example, a television program) according to the channel selection operation of the service.

(Collection Example of Viewing History Information)

FIG. 7 is a diagram illustrating a collection example of the viewing history information (CDM) in the transmission system 1 of FIG. 1. Note that, in FIG. 7, "CDM Server" means the viewing history server 30, and the same applies to other drawings described below.

In FIG. 7, the receiving device 20 receives (directly or indirectly receives) the digital broadcasting signal transmitted from the transmitting device 10, and reproduces the content according to the channel selection operation of the service. Further, in the receiving device 20, the viewing history information (CDM) is recorded (accumulated) according to viewing of the content by the user, and the viewing history information (CDM) is transmitted to the viewing history server 30 through the communication line 60.

Here, to access the viewing history server 30 through the communication line 60 and transmit the viewing history information (CDM) by the receiving device 20, the receiving device 20 needs to acquire the URL (viewing history server URL) of the viewing history server 30 in advance.

In the present technology, a technology for causing the transmitting device 10 to include the viewing history server URL to the digital broadcasting signal and transmit the signal, thereby to cause the receiving device 20 that receives the digital broadcasting signal to acquire (hold) the viewing history server URL is proposed. To be specific, as the methods of transmitting the viewing history server URL, the method 1 as a method using signaling, the method 2 as a method using a video watermark, the method 3 as a method using audio user data, and the method 4 as a method using metadata of a TTML document are proposed. Details will be described below.

FIG. 7 illustrates a case in which the broadcasting station A, the broadcasting station B, and the broadcasting station C jointly manage the viewing history server 30. At this time, in the receiving device 20, the content distributed from the transmitting device 10-1 of the broadcasting station A, the content distributed from the transmitting device 10-2 of the broadcasting station B, and the content distributed from the transmitting device 10-3 of the broadcasting station C are viewed by the user, and the viewing history information (CDM) of the content is accumulated.

Further, the digital broadcasting signal including the viewing history server URL is transmitted from the transmitting device 10 of each broadcasting station according to any method of the method 1 to method 4. Therefore, the receiving device 20 acquires and holds the viewing history server URL. Here, the viewing history server 30 is jointly managed by the broadcasting station A, the broadcasting station B, and the broadcasting station C. Therefore, each of the transmitting devices 10-1 to 10-3 notifies the same viewing history server URL (for example, a URL of "http://cdmServer.com/cdm") for accessing the viewing history server 30.

The receiving device 20 can receive the digital broadcasting signals from the transmitting devices 10-1 to 10-3, and acquire and hold the viewing history server URL included in the digital broadcasting signals. Accordingly, when it becomes timing to transmit the viewing history information (CDM) to the viewing history server 30, the receiving device 20 can access the viewing history server 30 through the communication line 60 according to the held viewing history server URL (for example, the URL of "http://cdmServer.com/cdm"), and transmit the viewing history information (CDM).

The viewing history server 30 receives and accumulates the viewing history information (CDM) transmitted from the receiving device 20 through the communication line 60. In the example of FIG. 7, only one receiving device 20 is illustrated. However, in reality, the viewing history information (CDM) is transmitted from the plurality of receiving devices 20 (the receiving devices 20-1 to 20-M). Therefore, the viewing history server 30 accumulates the viewing history information (CDM) collected from the plurality of receiving devices 20.

In the viewing history server 30, analysis processing and the like are applied to the viewing history information (CDM) collected from the plurality of receiving devices 20, as described above, and the viewing history report of each broadcasting station is generated. The viewing history report of each broadcasting station is transmitted to the transmitting device 10 of each broadcasting station. Accordingly, each broadcasting station can confirm the viewing history report provided by the viewing history server 30.

Further, the viewing history server 30 can request the transmitting device 10 of each broadcasting station to change the viewing history server URL. When having received the request to change the viewing history server URL from the viewing history server 30, the transmitting device 10 of each broadcasting station changes the viewing history server URL to be included in the digital broadcasting signal so that the viewing history server URL (for example, a URL of "http://cdmServer_2.com/cdm") after change is transmitted.

Here, the viewing history server URL is expected to be periodically or irregularly changed in operation. Therefore, the viewing history server URL after change is requested to be reliably notified to the receiving device 20. In the case of employing the method 1 to method 4 of notifying the viewing history server URL included in the digital broadcasting signal by push, the viewing history server URL can be dynamically changed and notified to many unspecified receiving devices 20-1 to 20-M, using broadcasting properties, immediacy, expandability (scalability) that are characteristics of the digital broadcasting signal, and can respond to the request. Further, accordingly, the viewing history server URL for accessing the viewing history server 30 can be periodically changed or instantly changed as needed. Therefore, for example, security can be enhanced, such as avoidance of denial of service attack (DoS attack) against the viewing history server 30.

Note that, in the example of FIG. 7, a case where the viewing history server 30 is jointly managed by the plurality of broadcasting stations including the broadcasting station A, the broadcasting station B, and the broadcasting station C has been described. However, the viewing history server 30 may be managed by a single broadcasting station.

In this case, the transmitting device 10-1 of the broadcasting station A notifies the viewing history server URL (for example, a URL of "http://cdmServer_A.com/cdm") for accessing a viewing history server 30A managed by the broadcasting station A to the receiving device 20. Similarly, the transmitting device 10-2 of the broadcasting station B notifies the viewing history server URL (for example, a URL of "http://cdmServer_B.com/cdm") for accessing a viewing history server 30B managed by the broadcasting station B, and the transmitting device 10-3 of the broadcasting station C notifies the viewing history server URL (for example, a URL of "http://cdmServer_C.com/cdm") for accessing a viewing history server 30C managed by the broadcasting station C.

That is, in this case, the transmitting devices 10-1 to 10-3 notify the different viewing history server URLs for accessing the viewing history servers 30 (for example, the viewing history server 30A, the viewing history server 30B, and the viewing history server 30C) of the respective broadcasting stations to the receiving device 20 by the digital broadcasting signals.

As described above, the viewing history server 30 is expected to be managed by the single broadcasting station or jointly managed by the plurality of broadcasting stations. In the notification of the viewing history server URL by the method 1 to the method 4, the notification of the viewing history server URL can be performed according to a management form of the viewing history server 30. Therefore, the viewing history server URL can be notified without depending on the broadcasting station. For example, as illustrated in FIG. 7, even in the case where the plurality of broadcasting stations jointly manages the viewing history server 30, (the transmitting device 10 of) each broadcasting station transmits the same viewing history server URL, so that such operation can be handled.

In the transmission system 1 of FIG. 1, the collection and analysis of the viewing history information (CDM) are performed as described above. That is, in the transmission system 1 of FIG. 1, the service (channel) the viewing history information (CDM) of which is recorded and the notification of the viewing history server URL of the viewing history server 30 that transmits the viewing history information (CDM) are associated with each other. Therefore, specification of the viewing history server 30 that transmits the viewing history information (CDM) on a broadcasting station by broadcasting station basis can be easily realized.

Further, the viewing history server URL of the viewing history server 30 is notified by push by the broadcasting wave (digital broadcasting signal) of the digital broadcasting, whereby a possibility of falsification of the viewing history server URL along the way of the path between the transmitting device 10 and the receiving device 20 can be decreased. Therefore, for example, security of the viewing history information (CDM) that is personal information can be enhanced, such as prevention of erroneous transmission (forcible transmission) of the viewing history information (CDM) to a third party server.

Further, methods of receiving a television service in the receiving device 20 are roughly classified into a method of performing reception (direction reception) with an antenna, and a method of performing reception (indirect reception) through (the distributing device 50 of) the MVPD such as a cable television (CATV). In the former case of the direct reception, all of the information such as the streams of the component (for example, the video, audio, caption, and the like), and the metadata (for example, the signaling information) included in the digital broadcasting signal distributed by (the transmitting device 10 of) the broadcasting station are acquired by the receiving device 20. However, in the latter case of the indirect reception, there is a possibility that the metadata and the like may be removed (filtered) by (the distributing device 50 of) the MVPD.

Even in such a case, in the transmission system 1 of FIG. 1, by employment of the method 2 (the method using a video watermark), the method 3 (the method using audio user data), or the method 4 (the method using metadata of a TTML document), the viewing history server URL can be notified regardless of the metadata. Therefore, various reception environments such as the direct reception with an antenna and the indirect reception through the MVPD can be handled.

(Syntax of CDM)

FIG. 8 is a diagram illustrating an example of syntax of the consumption data message (CDM) in the XML format. Note that, among elements and attributes in FIG. 8, "@" is attached to the attributes. Further, indented elements and attributes are specified for higher elements thereof.

In FIG. 8, a CDM element as a route element is a higher element of a protocolVersion attribute, an AVChannel element, and an NRTService element. As the protocolVersion attribute, a protocol version of the CDM is specified.

As the AVChannel element, information related to the viewing history of each channel (service) of the distributed content is specified. The AVChannel element is a higher element of a channelNum attribute, a serviceType attribute, and a ViewInterval element. As the ChannelNum attribute, a channel number (service ID) is specified. As the serviceType attribute, for example, a type of the service such as normal broadcasting or broadcasting of an audio only is specified.

The ViewInterval element is a higher element of a startTime attribute, an endTime attribute, a usageType attribute, a timeShift attribute, a viewStartTime attribute, a viewEndTime attribute, and a DOInterval element. Further, the DOInterval element is a higher element of a doId attribute, a startTime attribute, and an endTime attribute. In the ViewInterval element, information related to the viewing history of each channel (service) is specified by these elements and attributes.

As the NRTService element, information related to the viewing history about an NRT service is specified. The NRTService element is a higher element of a serviceID attribute and an NRTInterval element. As the serviceID attribute, a service ID is specified.

The NRTInterval element is a higher element of a startTime attribute, an endTime attribute, and an NRTItem element. Further, the NRTItem element is a higher element of a contentItemId attribute, a startTime attribute, and an endTime attribute. In the NRTInterval element, information related to the viewing history is specified for each NRT service by these elements and attributes.

Figure 9:
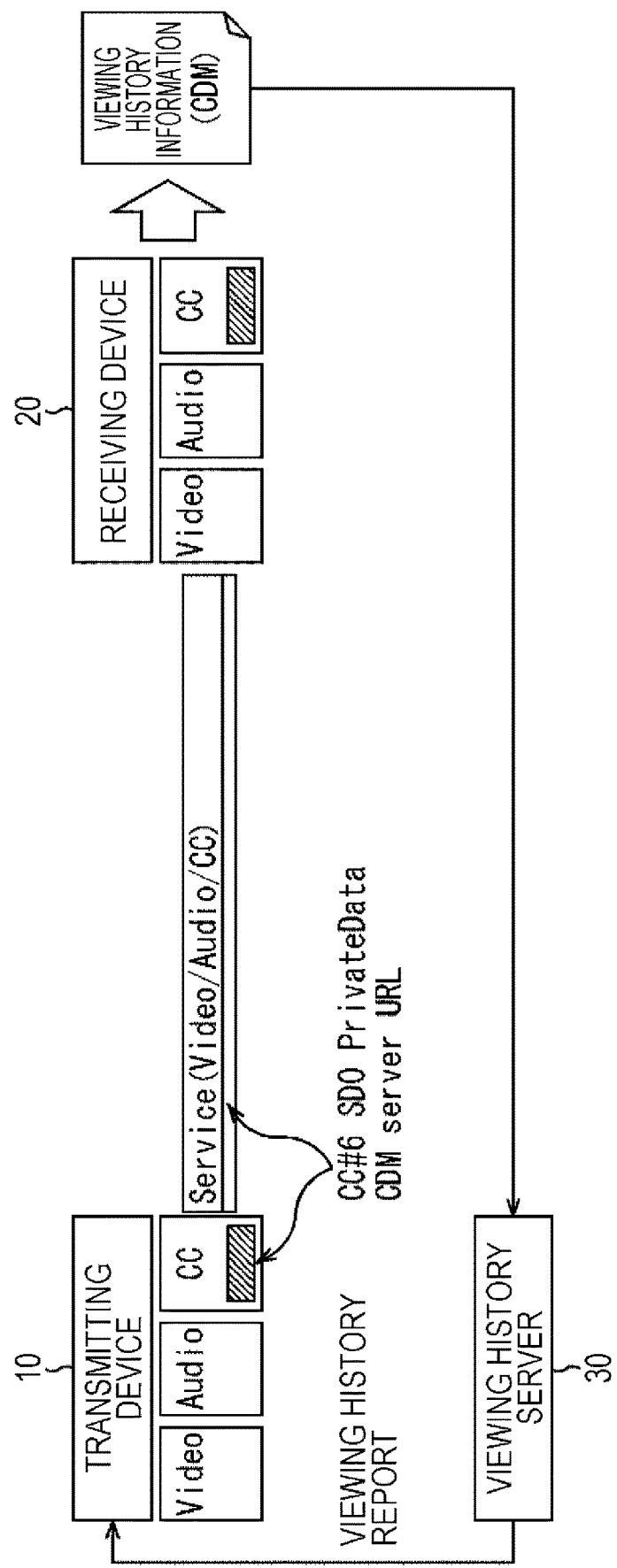
FIG. 9 is a diagram illustrating a related method of notifying a viewing history server URL.

The CDM is defined by ATSC 2.0. FIG. 9 illustrates a method of notifying the viewing history server URL in the ATSC 2.0. As illustrated in FIG. 9, in the ATSC 2.0, the viewing history server URL is arranged in private data (PrivateData) (as a payload) of a service #6 defined by the ATSC as the standards developing organization (SDO) in a caption (CC: closed caption) among components that configure content.

Here, the IP transmission method employed in the ATSC 3.0 or the like is different from the transmission method in the ATSC 2.0. Therefore, even in the IP transmission method, a method of notifying the viewing history server URL to the receiving device 20 is requested, and in the present technology, the viewing history server URL can be notified by the transmission methods of the method 1 to method 4 described below.

3. Specific Operation Examples (1) Method 1: Transmission of Viewing History Server URL Using Signaling (Collection Example of Viewing History Information)

FIG. 10 is a diagram illustrating a collection example of viewing history information (CDM) in a case of transmitting the viewing history server URL using signaling.

In FIG. 10, the transmitting device 10 of each broadcasting station includes the viewing history server URL to the digital broadcasting signal and transmits the signal by the method 1 using signaling. To be specific, the viewing history server URL is described in a signaling location descriptor (inet__signaling__location__descriptor) arranged in the SLT that is the LLS signaling information.

Here, the viewing history server 30 is jointly managed by the broadcasting station A, the broadcasting station B, and the broadcasting station C. Therefore, the transmitting devices 10-1 to 10-3 notify the same viewing history server URL (for example, the URL of "http://cdmServer.com/cdm") for accessing the viewing history server 30 by the signaling location descriptors of the SLTs transmitted by the digital broadcasting signals.

The receiving device 20 can receive the digital broadcasting signals from the transmitting devices 10-1 to 10-3, and acquire and hold the viewing history server URL described in the signaling location descriptors of the SLTs. Accordingly, the receiving device 20 can access the viewing history server 30 through the communication line 60 and transmit the viewing history information (CDM) according to the held viewing history server URL (for example, the URL of "http://cdmServer.com/cdm") when it becomes timing to transmit the viewing history information (CDM) to the viewing history server 30.

The viewing history server 30 receives and accumulates the viewing history information (CDM) transmitted from the plurality of receiving devices 20 through the communication line 60. The viewing history server 30 applies analysis processing and the like to the viewing history information (CDM) collected from the plurality of receiving devices 20, thereby to generate the viewing history reports of the respective broadcasting stations.

(Method of Notifying Viewing History Server URL)

FIG. 11 is a diagram illustrating a method of notifying the viewing history server URL in a case of using signaling.

In FIG. 11, the transmitting device 10 transmits the signaling information such as the SLT by the digital broadcasting signal together with the streams of (the components of) the video, audio, and caption. The receiving device 20 processes the streams of the components and reproduces the content based on the signaling information transmitted by the digital broadcasting signal from the transmitting device 10. Further, in the receiving device 20, the viewing history information (CDM) of the content is recorded (accumulated).

Here, the transmitting device 10 describes the viewing history server URL (for example, the URL of "http://cdm-Server.com/cdm") to the signaling location descriptor (inet__signaling__location__descriptor) arranged in the SLT so that the viewing history server URL is transmitted by the digital broadcasting signal. The receiving device 20 acquires and records (holds) the viewing history server URL from the signaling location descriptor arranged in the SLT transmitted by the digital broadcasting signal from the transmitting device 10. The receiving device 20 then can access the viewing history server 30 through the communication line 60 and transmit the viewing history information (CDM) according to the held viewing history server URL (for example, the URL of "http://cdmServer.com/cdm").

(Syntax of SLT)

FIG. 12 is a diagram illustrating an example of syntax of an SLT in a binary format.

In 8-bit table__id, an identifier of a table to which a section of the SLT belongs is specified. In 4-bit SLT__section_version, a version of the section of the SLT is specified. In 12-bit SLT_section_length, a section length of the SLT is specified. In 8-bit SLT_protocol_version, a protocol version of the SLT is specified.

In 16-bit broadcast_stream_id, a broadcast ID is specified. In 4-bit SLT_section_number and last_SLT_section_number, a section number of the SLT is specified.

In 8-bit num_service, the number of services is specified. The service loop is repeated according to the number of services. In the service loop, contents below are specified.

In 16-bit service_id, a service ID is specified. In 3-bit SLT_service seq_number, a sequence number of the service is specified. In 1-bit protected, encryption information that indicates protection of the service is specified.

In 10-bit major_channel_number, a major channel number is specified. In 10-bit minor_channel_number, a minor channel number is specified. In 4-bit service_category, a category of the service is specified.

In 4-bit short_service_name_length, the length of a short service name is specified.

In 8*m-bit short_service_name, the short service name is specified. In 1-bit broadcast_signaling_present, whether the SLS signaling information has been transmitted is specified.

In 1-bit SLS_source_IP_address_present, whether an IP address of a transmission source (source) exists is specified. In 1-bit broadband_access_reuired, whether an access to the communication line (broad band) is necessary is specified. In 4-bit SLS_protocol_type, a type of the protocol of the SLS signaling information is specified.

When the broadcast_signaling_present indicates that the SLS signaling information has been transmitted, as information for acquiring the SLS signaling information, SLS_PLP_ID, SLS_destination_IP_address, SLS_destination_UDP_port, and SLS_protocol_version are specified.

However, when the SLS_source_IP_address_present indicates that the IP address of the transmission source (source) exists, SLS_source_IP_address is specified.

In 8-bit SLS_PLP_ID, an ID of a PLP to which the SLS signaling information is transmitted is specified. In 32-bit SLS_destination_IP_address, an IP address of a destination is specified. In 16-bit SLS_destination_UDP_port, a port number of the destination is specified.

In 32-bit SLS_source_IP_address, an IP address of a transmission source (source) is specified. In 8-bit SLS_protocol_version, a version of the protocol of the SLS signaling information is specified.

When num_ext_lenght_bits is specified, an area reserved for future extension is secured as reserved1. Further, an area reserved for future expansion can be secured as reserved2 by ext_length.

In 4-bit num_service_level_descriptors, the number of descriptors of a service level is specified. A service level descriptor loop is repeated according to the number of descriptors of a service level. As illustrated by the frame A in FIG. 12, in the service level descriptor loop, a service level descriptor (service_level_descriptor) is arranged.

Next to the service loop, num_SLT_level_descriptors is arranged following the 4-bit reserved. In 4-bit num_SLT_level_descriptors, the number of descriptors of an SLT level is specified. An SLT level descriptor loop is repeated according to the number of descriptors of an SLT level. As illustrated by the frame B in FIG. 12, in the SLT level descriptor loop, an SLT level descriptor (SLT_level_descriptor) is arranged.

Next to the SLT_level_descriptor loop, reserved3 for future expansion is specified.

(Example of Descriptor of SLT)

FIG. 13 is a diagram illustrating an example of a descriptor arranged in the SLT.

In the SLT, a signaling location descriptor (inet_signaling_location_descriptor), descriptors such as a service language descriptor (service_language_descriptor), and a capability descriptor (capabilities_descriptor) are arranged.

In the signaling location descriptor, location information such as information that indicates an acquisition destination of the signaling information acquired through communication is specified. For example, in a case of employing the method 1, the viewing history server URL is described in the signaling location descriptor.

This signaling location descriptor can be arranged in both of the service level descriptor loop of FIG. 12A and the SLT level descriptor loop of FIG. 12B. That is, in a case where the signaling location descriptor is arranged in the service level descriptor loop (FIG. 12A) of the SLT, the service and the viewing history server URL can be associated. In this case, the viewing history server URL can be specified for each service. Meanwhile, in a case where the signaling location descriptor is arranged in the SLT level descriptor loop (FIG. 12B) of the SLT, a common viewing history server URL can be specified for all of services.

In the service language descriptor, information related to language of the service is specified. This service language descriptor can be arranged in both of the service level descriptor loop of FIG. 12A and the SLT level descriptor loop of FIG. 12B.

In the capability descriptor, information related to capability is specified. This capability descriptor can be arranged in both of the service level descriptor loop of FIG. 12A and the SLT level descriptor loop of FIG. 12B.

(Syntax of Signaling Location Descriptor)

FIG. 14 is a diagram illustrating an example of syntax of the signaling location descriptor (inet_signaling_location_descriptor) of FIG. 13C.

In 8-bit descriptor tag, a descriptor tag of the descriptor is specified. In 8-bit descriptor_length, a descriptor length of the descriptor is specified.

In 8-bit URL_type, a type of a URL is specified. URL_bytes( ) is made of 8*(descriptor_length-1) bits, and in URL_bytes( ) a URL according to the type of a URL specified in URL_type is specified.

For example, FIG. 15 illustrates that a URL of a signaling server that provides the signaling information is specified in URL_bytes( ) in a case where "0x00" is specified as URL_type. Further, FIG. 15 illustrates that a URL of an ESG server that provides electronic service guide (ESG) information is specified in URL_bytes( ) in a case where "0x01" is specified as URL_type.

Further, FIG. 15 illustrates that the URL (viewing history server URL) of the viewing history server 30 is specified in URL_bytes( ) in a case where "0x02" is specified as URL_type. That is, in the method 1, when notifying the viewing history server URL using the signaling location descriptor arranged in the SLT, the URL specified in URL_bytes( ) is identified as the URL (viewing history server URL) of the viewing history server 30 by specification of "0x02" as URL_type.

Note that, in URL_type, "0x03" to "0xFF" are values reserved for future expansion.

Next, details of processing executed in the devices that configure the transmission system 1 of FIG. 1 in a case where the method 1 is employed will be described with reference to the flowcharts of FIGS. 16 to 24.

(Transmission Processing)

Figure 16:
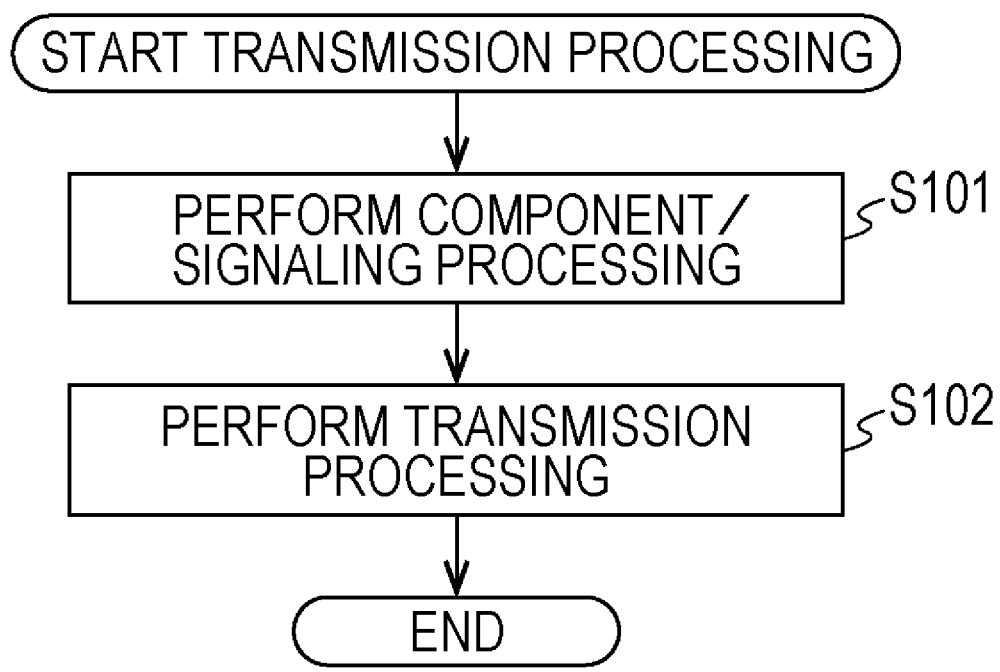
FIG. 16 is a flowchart for describing transmission processing.

First, a flow of transmission processing executed by the transmitting device 10 of FIG. 1 will be described with reference to the flowchart of FIG. 16.

In step S101, component/signaling processing is performed.

In the component/signaling processing, various types of processing for the video stream (video bitstream) processed in the video processing unit 113 and the like, the audio stream (audio bitstream) processed in the audio processing unit 115 and the like, the caption stream processed in the caption processing unit 117 and the like, and the signaling information processed in the signaling processing unit 119 and the like are performed, and the streams of the respective components and the signaling information are made transmittable as the digital broadcasting signal.

In step S102, the transmission processing is performed by the transmitting unit 121, and the streams of the respective components and the signaling information processed in the processing of step S101 are transmitted through the antenna 131 as the digital broadcasting signal. When the processing of step S102 is terminated, the transmission processing of FIG. 16 is terminated.

The flow of the transmission processing has been described.

(Viewing History Server URL Notification Processing)

Figure 17:
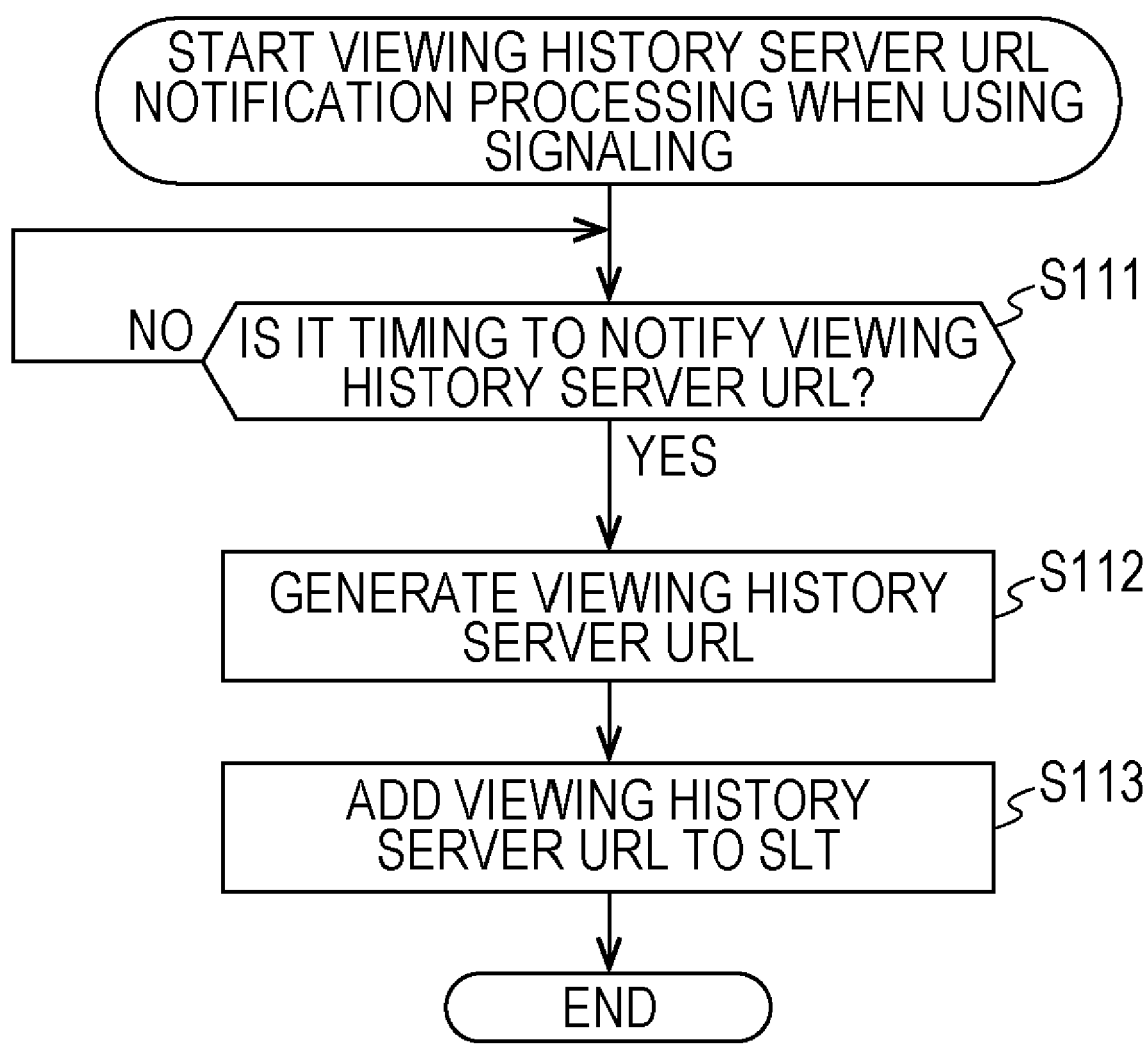
FIG. 17 is a flowchart for describing viewing history server URL notification processing in a case of using signaling.

Next, a flow of viewing history server URL notification processing in a case of using signaling will be described with reference to the flowchart of FIG. 17. Note that this viewing history server URL notification processing is processing executed in parallel to the processing of step S101 of FIG. 16 by the transmitting device 10 of FIG. 1.

In step S111, the control unit 111 determines whether it is timing to notify the viewing history server URL.

In step S111, when it is determined not to be the timing to notify the viewing history server URL, the determination processing of step S111 is repeated. Meanwhile, when it is determined to be the timing to notify the viewing history server URL, the processing proceeds to step S112.

In step S112, the viewing history server URL generating unit 151 generates the viewing history server URL of the target viewing history server 30. The viewing history server URL generated as described above is supplied to the signaling generating unit 118 in the case of the method 1.

In step S113, the signaling generating unit 118 adds the viewing history server URL generated in the processing of step S112 to the signaling location descriptor arranged in the service_level_descriptor loop of the SLT or the SLT_level_descriptor loop, in generating the SLT.

Note that, at this time, in the signaling location descriptor, "0x02" is specified as URL_type. Further, for example, as illustrated in FIG. 10, in a case where the viewing history server 30 is jointly managed by the broadcasting station A, the broadcasting station B, and the broadcasting station C, "http://cdmServer.com/cdm" is described in URL_bytes( ) of the signaling location descriptor of the SLT as the viewing history server URL, in the transmitting devices 10-1 to 10-3 of the broadcasting station A, the broadcasting station B, and the broadcasting station C.

The flow of the viewing history server URL notification processing has been described. In this viewing history server URL notification processing, URL_type as "0x02" and URL_bytes( ) in which the viewing history server URL is specified are described in the signaling location descriptor. Then, the SLT in which the signaling location descriptor is arranged in the service level descriptor loop or the SLT level descriptor loop is generated (S101 of FIG. 16), and is included in the digital broadcasting signal and transmitted (S102 of FIG. 16).

(Initial Scan Processing)

Next, a flow of initial scan processing executed by the receiving device 20 of FIG. 1 will be described with reference to the flowchart of FIG. 18.

In step S201, an operation signal and the like from the input unit 213 are monitored by the control unit 211, and when a start event of initial scan processing is generated, the initial scan processing is started, and the processing proceeds to step S202.

In step S202, the receiving unit 214 performs frequency scan processing according to the control from the broadcasting control unit 251. In step S203, whether frequency scan has succeeded is determined by the frequency scan processing of step S202.

In step S203, when the frequency scan is determined to have failed, the processing is returned to the processing of step S202, and the frequency scan processing is performed again. Meanwhile, in step S203, when the frequency scan is determined to have succeeded, the processing proceeds to step S204.

In step S204, stream/SLT acquisition processing is executed. In this stream/SLT acquisition processing, the SLT transmitted with a multiplexed stream is acquired, and is recorded in the recording unit 212. Note that details of the stream/SLT acquisition processing will be described with reference to the flowchart of FIG. 19.

When the stream/SLT acquisition processing is terminated, the processing proceeds to step S205. In step S205, whether scan of all of frequency bands has been completed is determined.

In step S205, when the scan of all of frequency bands is determined not to be completed, the processing is returned to step S202, and the processing of step S202 and the subsequent steps is repeated. Accordingly, the frequency scan processing in each frequency band is performed, and the SLT is acquired for each frequency band and recorded in the recording unit 212. Then, in step S205, when scan of all of the frequency bands is determined to be completed, the initial scan processing of FIG. 18 is terminated.

The flow of the initial scan processing has been described. In this initial scan processing, the scan of each frequency band is performed, and the information (for example, the channel selection information) obtained from the SLT acquired for each frequency band is recorded in the recording unit 212.

(Stream/SLT Acquisition Processing)

Here, details of the stream/SLT acquisition processing corresponding to the processing of step S204 of FIG. 18 will be described with reference to the flowchart of FIG. 19.

In step S211, the receiving unit 214 performs demodulation processing for the digital broadcasting signal, extracts (acquires) the L2 packet from the L1 frame of the physical layer, and extracts (acquires) the IP/UDP packet encapsulated in the payload of the L2 packet.

In step S212, whether the SLT is included in the IP/UDP packet extracted in the processing of step S211, that is, whether the SLT has been transmitted is determined.

In step S212, when it is determined that the SLT has been transmitted, the processing proceeds to step S213. In step S213, the broadcasting control unit 251 acquires the SLT included in the IP/UDP packet. Further, in step S214, the broadcasting control unit 251 records the service configuration information included in the SLT acquired in the processing of step S213 to the recording unit 212.

In step S215, the broadcasting control unit 251 determines whether the signaling location descriptor (inet_signaling_location_descriptor) exists in the SLT, and "0x02" has been specified as URL_type, that is, whether the viewing history server URL is described in the SLT.

In step S215, when it is determined that the viewing history server URL is described in the SLT, the processing proceeds to step S216. In step S216, the viewing history server URL acquiring unit 254 acquires the viewing history server URL included in (the signaling location descriptor of) the SLT according to a processing result of step S215, and records the viewing history server URL to the recording unit 212.

Meanwhile, in step S215, it is determined that the viewing history server URL is not described in the SLT, the processing of step S216 is skipped. Further, in step S212, when it is determined that SLT has not been transmitted, the processing from steps S213 to S216 is skipped.

Figure 18:
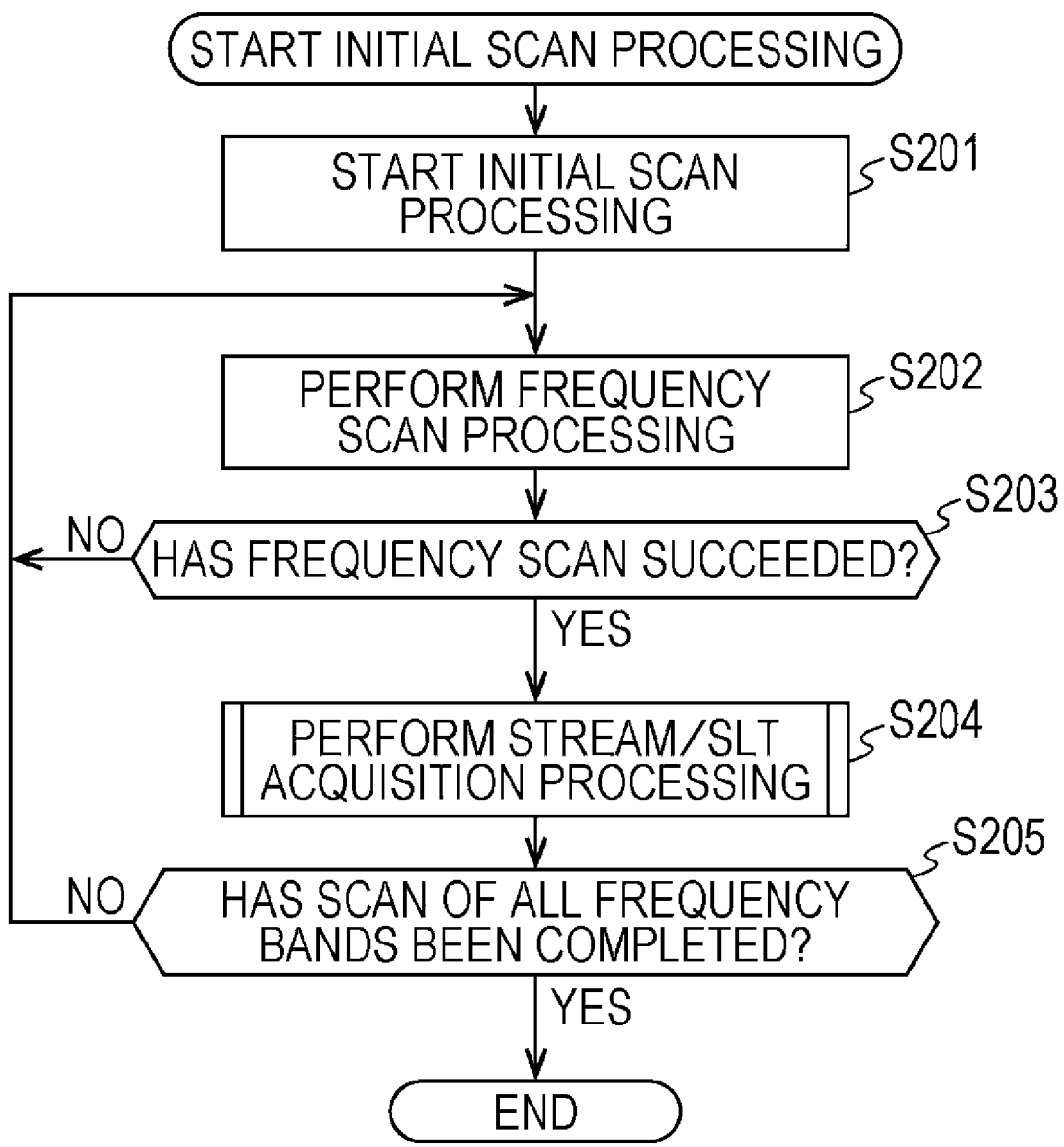
FIG. 18 is a flowchart for describing initial scan processing.
Figure 19:
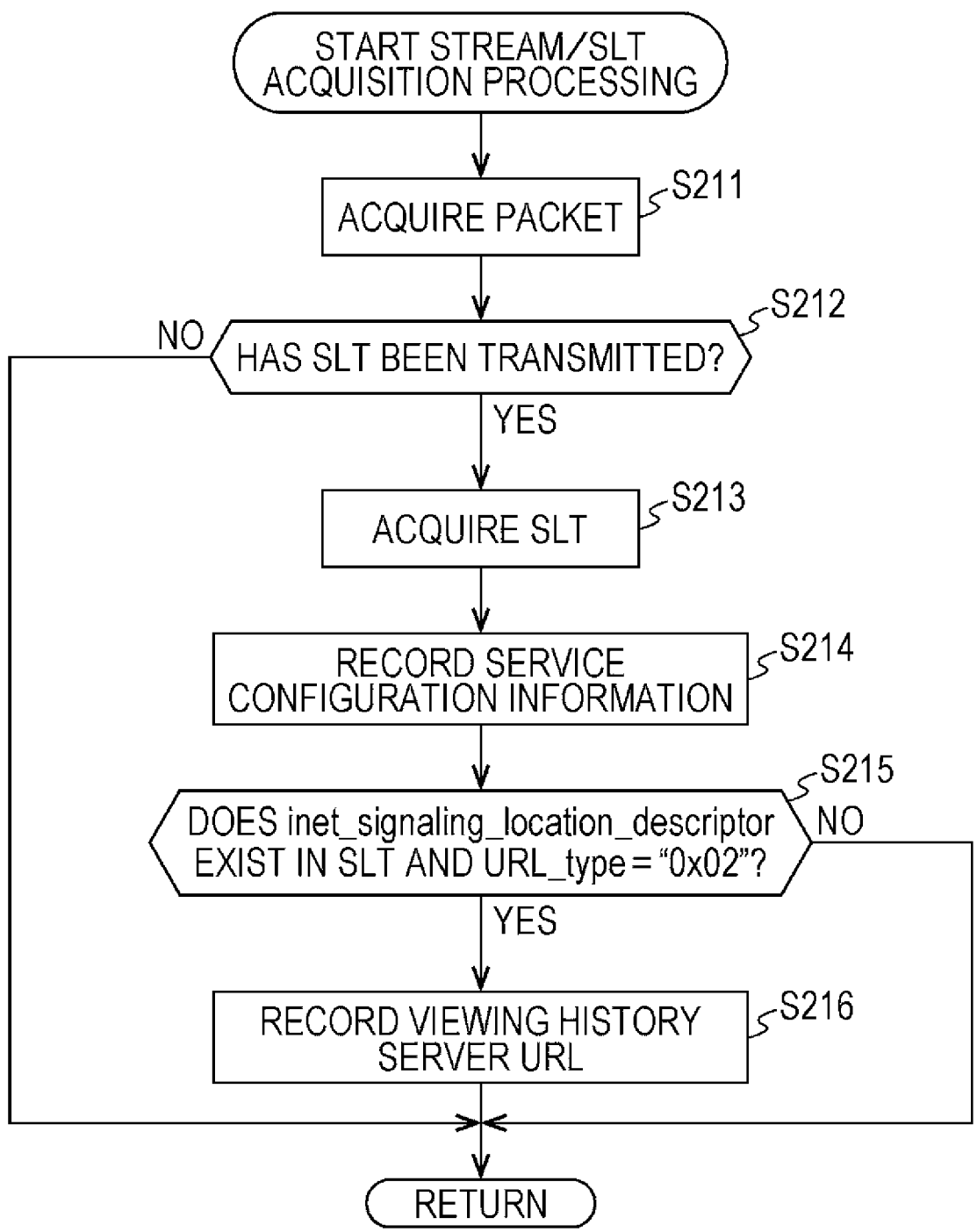
FIG. 19 is a flowchart for describing stream/SLT acquisition processing.

Following that, the processing is returned to the processing of step S204 of FIG. 18, and the processing of step S204 and the subsequent steps is executed.

The flow of the stream/SLT acquisition processing has been described. In this stream/SLT acquisition processing, the SLT is acquired when the SLT has been transmitted, and the viewing history server URL is acquired and recorded when the viewing history server URL is described in the signaling location descriptor of the SLT.

(SLT Acquisition Processing at the Time of Switching Service)

Figure 20:
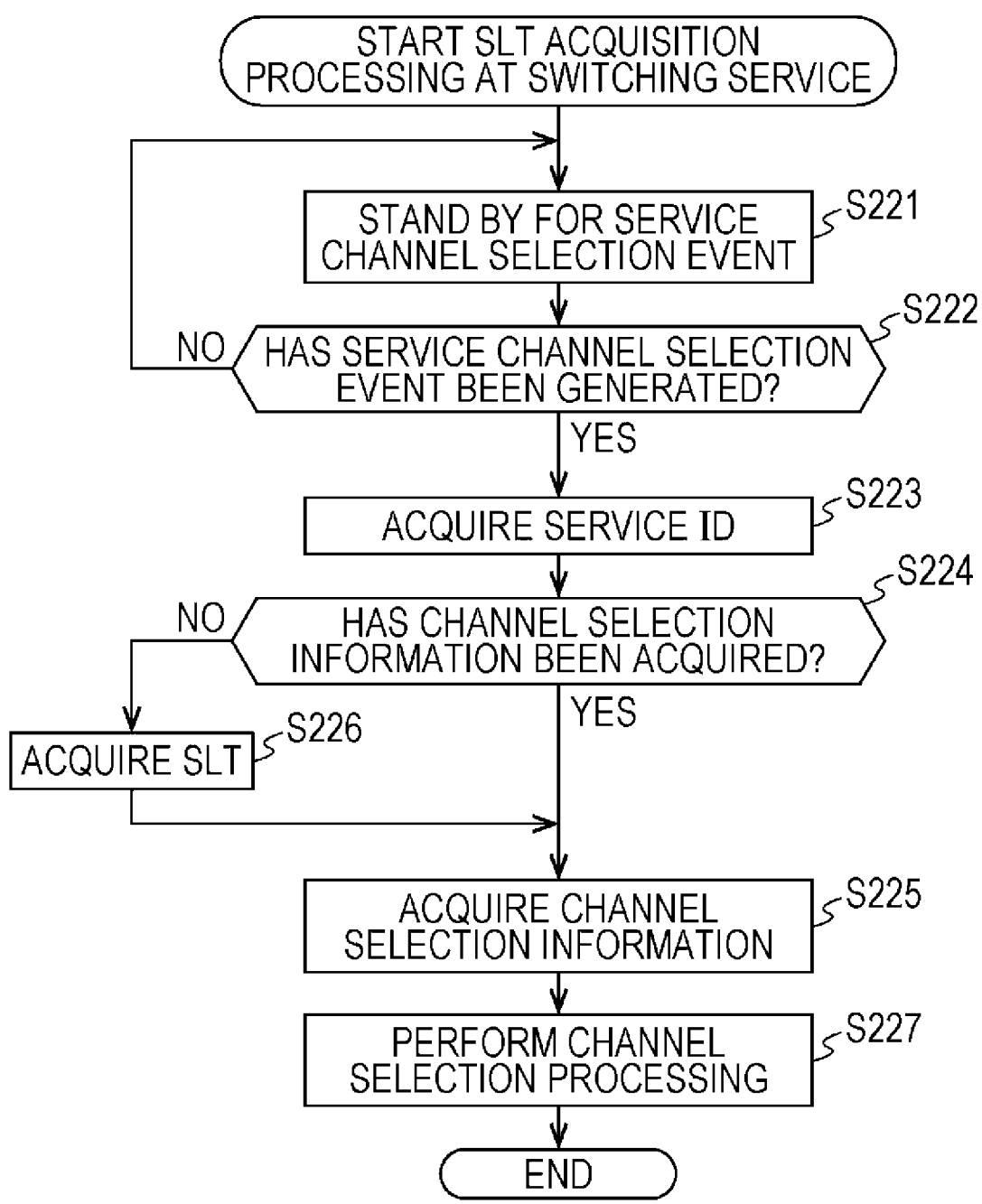
FIG. 20 is a flowchart for describing SLT acquisition processing at the time of switching a service.

Next, a flow of SLT acquisition processing at the time of switching a service executed by the receiving device 20 of FIG. 1 will be described with reference to the flowchart of FIG. 20.

In step S221, the operation signal and the like from the input unit 213 are monitored by the control unit 211, and the processing stands by until a service channel selection event is generated. In step S222, when it is determined that the service channel selection event has been generated, the processing proceeds to step S223.

In step S223, the broadcasting control unit 251 acquires the service ID (channel number) corresponding to the selected service. Further, in step S224, the broadcasting control unit 251 refers to the recording unit 212, and determines whether the channel selection information has been recorded and acquired.

In step S224, when it is determined that the channel selection information has been acquired, the processing proceeds to step S225. In step S225, the broadcasting control unit 251 reads and acquires the channel selection information (the channel selection information corresponding to the service ID of the selected service) recorded in the recording unit 212.

Meanwhile, in step S224, when it is determined that the channel selection information has not yet been acquired, the processing proceeds to step S226. In step S226, reception processing is performed by the control unit 211 and the receiving unit 214, and the SLT included in the IP/UDP packet is acquired. Accordingly, the broadcasting control unit 251 can acquire the channel selection information (the channel selection information corresponding to the service ID of the selected service) from the SLT acquired in the processing of step S226 (S225).

Note that, here, when the signaling location descriptor exists in the SLT acquired in the processing of step S226, and "0x02" is specified as URL_type, the viewing history server URL included in the SLT may be acquired and recorded in the recording unit 212. Further, when the viewing history server URL has already been recorded in the recording unit 212, the viewing history server URL may be overwritten and updated.

When the channel selection information has been acquired by the processing of step S225, the processing proceeds to step S227.

In step S227, the broadcasting control unit 251 performs selection processing by controlling the operations of the respective units based on the channel selection information acquired by the processing of step S225. By the channel selection processing, the content of the service selected in the processing of steps S221 and S222 is reproduced, and the service being in channel selection is switched.

The flow of the SLT acquisition processing at the time of switching a service has been described. In this SLT acquisition processing at the time of switching a service, the SLT is acquired when the channel selection information has not yet been acquired, and the viewing history server URL is acquired and recorded when the viewing history server URL is described in the signaling location descriptor of the SLT, at the time of switching a service.

(SLT Acquisition Processing at the Time of Viewing)

Figure 21:
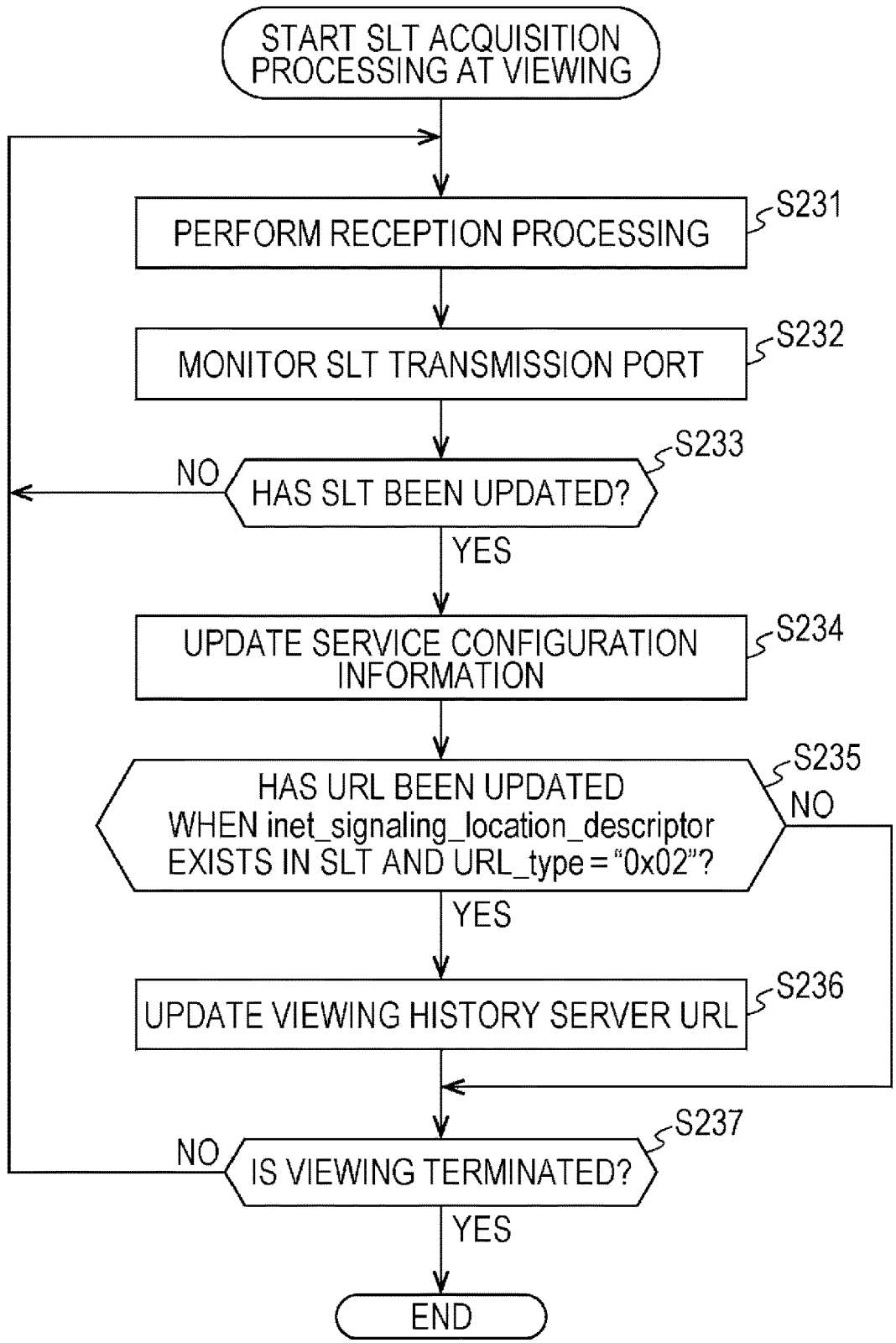
FIG. 21 is a flowchart for describing the SLT acquisition processing at the time of viewing.

Next, a flow of SLT acquisition processing at the time of viewing executed by the receiving device 20 of FIG. 1 will be described with reference to the flowchart of FIG. 21.

In step S231, the reception processing is performed by the control unit 211, the receiving unit 214, and the like, and the transmission port of the SLT is monitored (S232).

In step S233, the broadcasting control unit 251 determines whether the SLT transmitted by the IP/UDP packet has been updated, based on a monitoring result of the processing of step S232.

In step S233, when it is determined that the SLT has not yet been updated, the processing is returned to step S231, and the monitoring processing from steps S231 to S233 is repeated. Meanwhile, in step S233, when it is determined that the SLT has been updated, the processing proceeds to step S234.

In step S234, the broadcasting control unit 251 refers to the recording unit 212, and updates the service configuration information (or a parameter thereof) included in the updated SLT.

In step S235, the broadcasting control unit 251 determines whether the viewing history server URL has been updated when the signaling location descriptor (inet_signaling_location_descriptor) exists in the updated SLT, and "0x02" is specified as URL_type.

In step S235, when it is determined that the viewing history server URL has been updated, the processing proceeds to step S236. In step S236, the viewing history server URL acquiring unit 254 acquires the viewing history server URL included in the SLT according to a processing result of step S235, and updates the viewing history server URL recorded in the recording unit 212.

Note that, in step S235, when it is determined that the viewing history server URL has not yet been updated, the processing of step S236 is skipped, and the processing proceeds to step S237. Further, when the viewing history server URL is not recorded in the recording unit 212, a newly acquired viewing history server URL is recorded in the recording unit 212 as it is.

In step S237, whether the viewing by the user is terminated is determined. In step S237, when it is determined that the viewing is not terminated, the processing is returned to step S231, and the processing of step S231 and the subsequent steps is repeated. Meanwhile, in step S237, when it is determined that the viewing is terminated, the SLT acquisition processing at the time of viewing of FIG. 21 is terminated.

The flow of the SLT acquisition processing at the time of viewing has been described. In this SLT acquisition processing at the time of viewing, the SLT is acquired when the transmitted SLT is updated, the viewing history server URL is acquired when the viewing history server URL is described in the signaling location descriptor of the SLT, and the viewing history server URL is updated.

(Viewing History Information Recording Processing)

Figure 22:
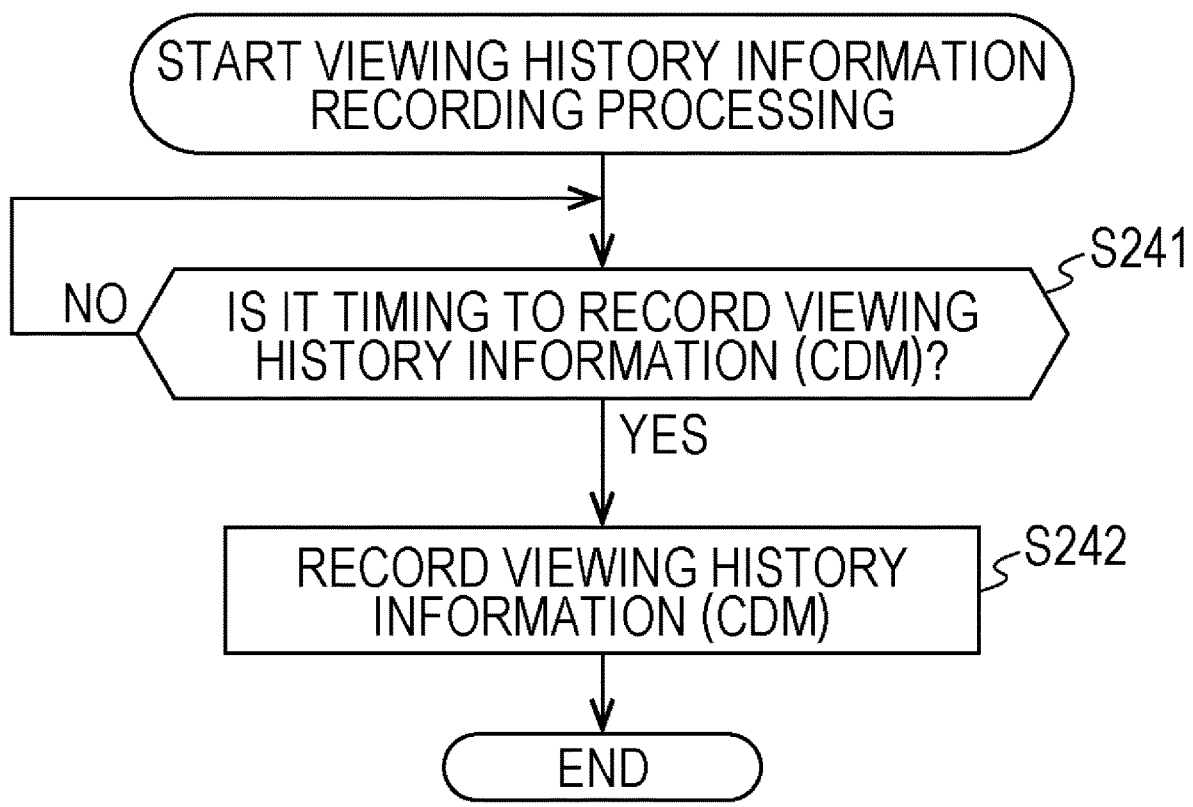
FIG. 22 is a flowchart for describing viewing history information recording processing.

Next, a flow of viewing history information recording processing executed by the receiving device 20 of FIG. 1 will be described with reference to the flowchart of FIG. 22.

In step S241, the viewing history information managing unit 253 determines whether it is timing to record the viewing history information (CDM).

In step S241, when it is determined not to be the timing to record the viewing history information (CDM), the determination processing of step S241 is repeated. Meanwhile, in step S241, when it is determined to be the timing to record the viewing history information (CDM), the processing proceeds to step S242.

In step S242, the viewing history information managing unit 253 records (accumulates) the viewing history information (CDM) of the content to the recording unit 212. When the processing of step S242 is terminated, the viewing history information recording processing of FIG. 22 is terminated.

The flow of the viewing history information recording processing has been described. In this viewing history information recording processing, the viewing history information (CDM) is recorded at predetermined timing, so that the viewing history information (CDM) of each service (channel) is sequentially accumulated in the recording unit 212, for example.

(Viewing History Information Transmission Processing)

Next, a flow of viewing history information transmission processing executed by the receiving device 20 of FIG. 1 will be described with reference to the flowchart of FIG. 23.

In step S251, the viewing history information managing unit 253 determines whether it is timing to transmit the viewing history information (CDM) to the viewing history server 30.

In step S251, when it is determined not to be the timing to transmit the viewing history information (CDM) to the viewing history server 30, the determination processing of step S251 is repeated. Meanwhile, in step S251, when it is determined to be the timing to transmit the viewing history information (CDM) to the viewing history server 30, the processing proceeds to step S252.

In step S252, the viewing history information managing unit 253 reads and acquires the viewing history information (CDM) from the recording unit 212. Note that this viewing history information (CDM) is the viewing history information (CDM) recorded (accumulated) in the recording unit 212 by the viewing history information recording processing of FIG. 22.

In step S253, the viewing history information managing unit 253 reads and acquires the viewing history server URL from the recording unit 212. Note that the viewing history server URL is the viewing history server URL recorded in the recording unit 212 in the processing of step S216 of FIG. 19, or the viewing history server URL updated in the processing of step S236 of FIG. 21.

In step S254, the communication control unit 252 controls the communication unit 223 to transmit the viewing history information (CDM) acquired in the processing of step S252 to the viewing history server 30 through the communication line 60 based on the viewing history server URL acquired in the processing of step S253. When the processing of step S254 is terminated, the viewing history information transmission processing of FIG. 23 is terminated.

The flow of the viewing history information transmission processing has been described. In this viewing history information transmission processing, the viewing history server URL and the viewing history information (CDM) appropriately recorded in the recording unit 212 are read at predetermined timing, and the viewing history information (CDM) is transmitted to the viewing history server 30 according to the viewing history server URL.

In the above description, a case where the viewing history information (CDM) appropriately recorded in the recording unit 212 is transmitted to the viewing history server 30 has been described. However, the viewing history information (CDM) may be instantly transmitted to the viewing history server 30 at timing when the viewing history information (CDM) is generated, without being recorded to the recording unit 212.

(Viewing History Information Collection/Analysis Processing)

Figure 24:
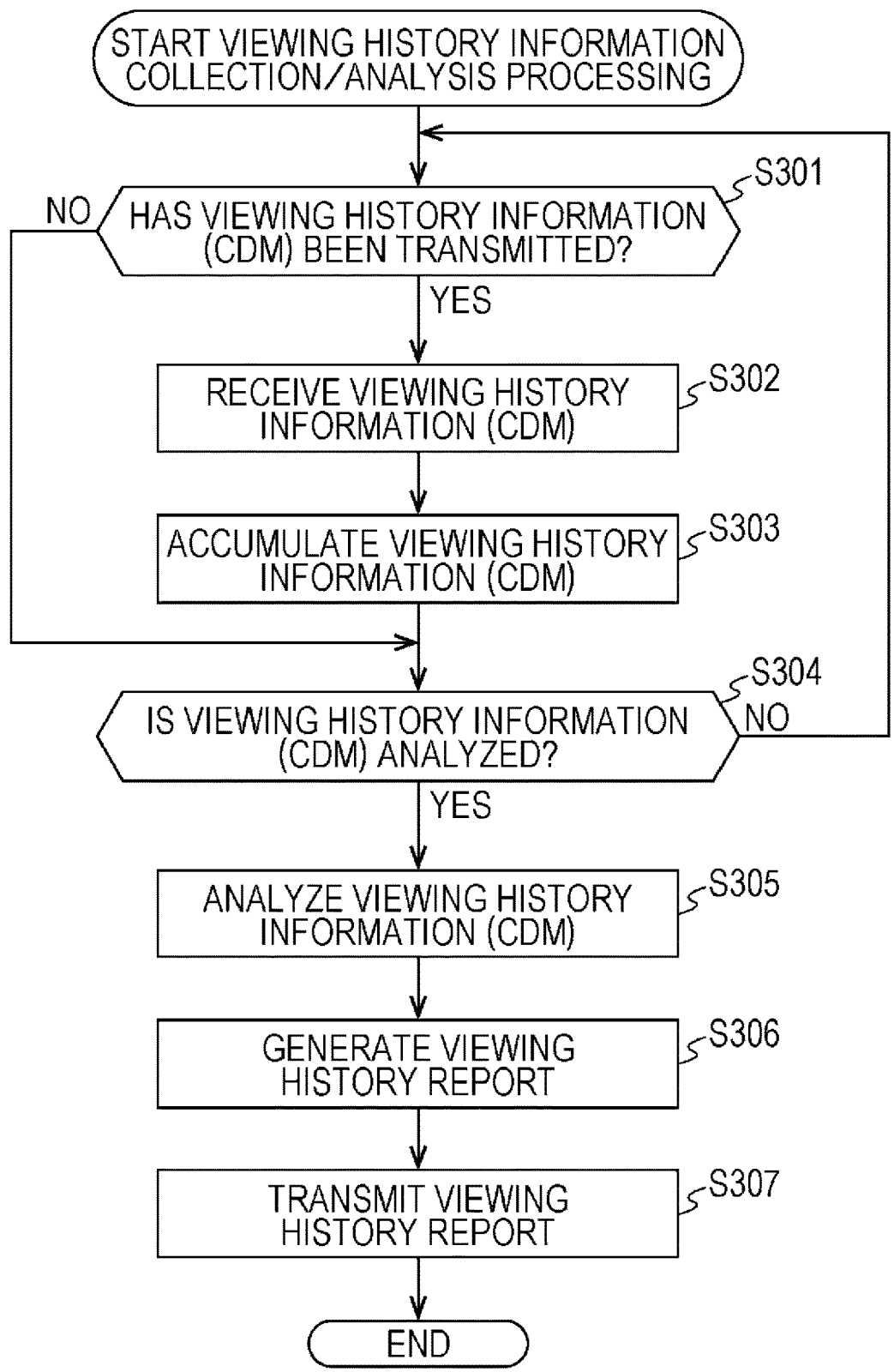
FIG. 24 is a flowchart for describing viewing history information collection/analysis processing.

Finally, a flow of viewing history information collection/analysis processing executed by the viewing history server 30 of FIG. 1 will be described with reference to the flowchart of FIG. 24.

In step S301, whether the viewing history information (CDM) from the receiving device 20 has been transmitted through the communication line 60 is determined.

In step S301, when it is determined that the viewing history information (CDM) has been transmitted from the receiving device 20, the processing proceeds to step S302. In step S302, the communication unit 312 receives the viewing history information (CDM) transmitted from the receiving device 20 through the communication line 60 according to the control from the control unit 311.

In step S303, the viewing history information managing unit 351 accumulates the viewing history information (CDM) received in the processing of step S302 to the viewing history information accumulating unit 313.

When the processing of step S303 is terminated, the processing proceeds to step S304. Note that, in step S301, when it is determined that the viewing history information (CDM) is not transmitted from the receiving device 20, the processing of steps S302 and S303 is skipped, and the processing proceeds to step S304.

In step S304, whether analyzing the viewing history information (CDM) accumulated in the viewing history information accumulating unit 313 is determined.

In step S304, when it is determined not to analyze the viewing history information (CDM), the processing is returned to step S301, and the processing of step S301 and the subsequent steps is repeated. That is, by repetition of the processing from steps S301 to S304, the viewing history information (CDM) transmitted from the plurality of receiving devices 20 is collected, and the viewing history information (CDM) of each service (channel) is accumulated in the viewing history information accumulating unit 313.

Meanwhile, in step S304, when it is determined to analyze the viewing history information (CDM), the processing proceeds to step S305. In step S305, the viewing history information analyzing unit 352 reads the viewing history information (CDM) from the plurality of receiving devices 20 accumulated in the viewing history information accumulating unit 313 by the processing of step S303, and analyzes the viewing history information (CDM).

In step S306, the viewing history information analyzing unit 352 generates the viewing history report of each broadcasting station based on an analysis result of the processing of step S305.

In step S307, the communication unit 312 transmits the viewing history report of each broadcasting station generated in the processing of step S306 to the transmitting device 10 of each broadcasting station according to the control from the control unit 311. When the processing of step S307 is terminated, the viewing history information collection/analysis processing of FIG. 24 is terminated.

The flow of the viewing history information collection/analylsis processing has been described. In this viewing history information collection/analylsis processing, the viewing history information (CDM) from the plurality of receiving devices 20 is sequentially accumulated, and analysis of the accumulated viewing history information (CDM) is performed at predetermined timing, and the viewing history report is generated.

When the method 1 that is a method of using signaling is employed as the method of transmitting the viewing history server URL, the viewing history server URL is included in the signaling location descriptor arranged in the SLT, so that the viewing history server URL is notified from the transmitting device 10 to the receiving device 20. Further, when the method 1 is employed, the receiving device 20 that performs direct reception with an antenna can reliably acquire the metadata (the signaling information such as the SLT) included in the digital broadcasting signal, and the metadata (the signaling information such as the SLT) is transmitted to the receiving device 20 that performs the indirect reception through the MVPD, depending on the operation. Therefore, the viewing history server URL included in the SLT can be acquired and used at the time of transmitting the viewing history information (CDM) in various reception environments.

(2) Method 2: Transmission of Viewing History Server URL Using Video Watermark (Collection Example of Viewing History Information)

Figure 25:
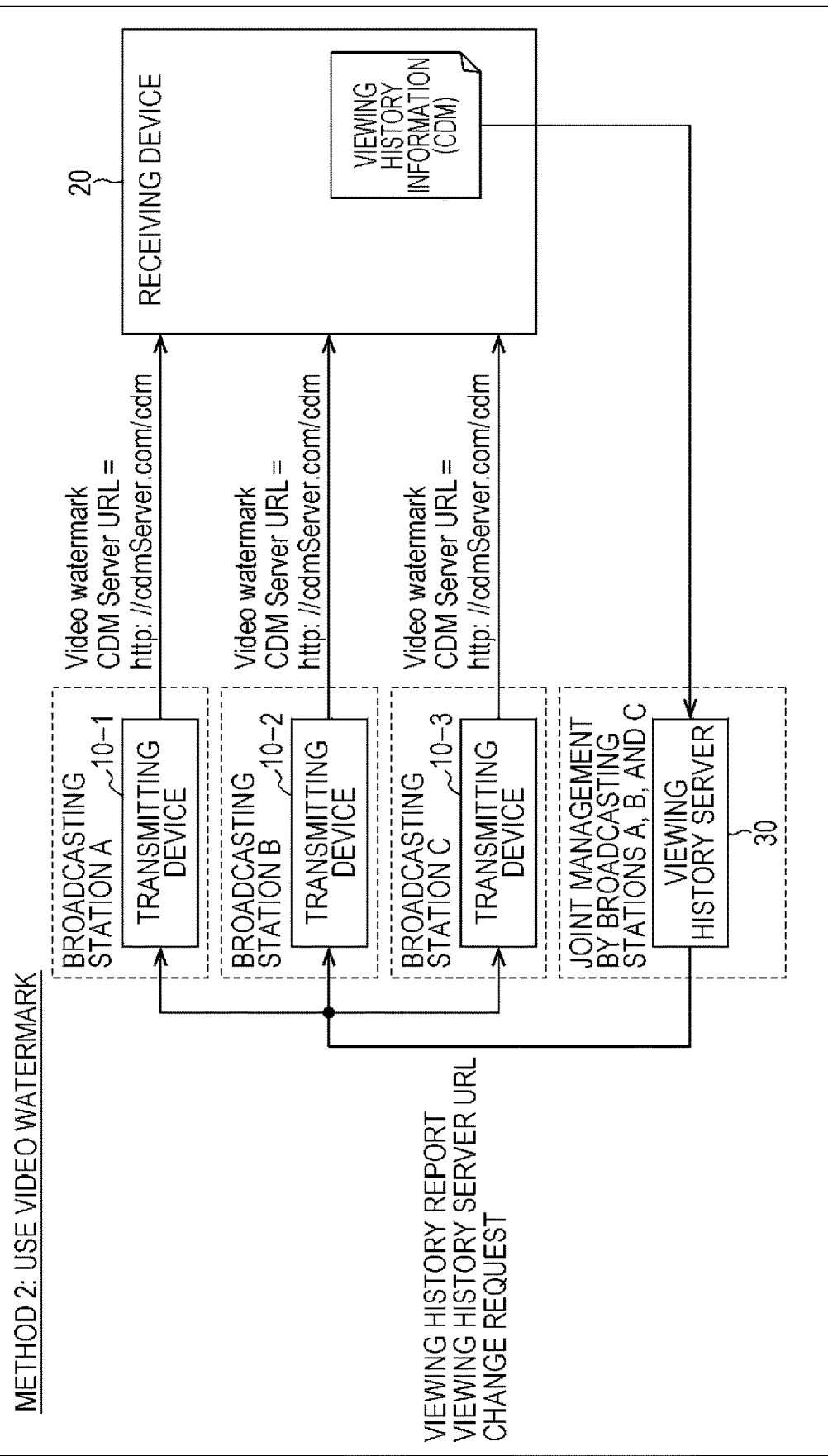
FIG. 25 is a diagram illustrating a collection example of viewing history information (CDM) in a case of transmitting a viewing history server URL using a video watermark.

FIG. 25 is a diagram illustrating a collection example of the viewing history information (CDM) in a case of transmitting the viewing history server URL using a video watermark.

In FIG. 25, the transmitting device 10 of each broadcasting station includes the viewing history server URL to the digital broadcasting signal and transmits the signal by the method 2 using a video watermark. To be specific, the viewing history server URL is described in a watermark payload transmitted in the video stream as the video watermark.

Here, the viewing history server 30 is jointly managed by the broadcasting station A, the broadcasting station B, and the broadcasting station C. Therefore, the transmitting devices 10-1 to 10-3 notify the same viewing history server URL (for example, the URL of "http://cdmServer.com/cdm") for accessing the viewing history server 30 by the video watermarks of the video streams transmitted by the digital broadcasting signals.

The receiving device 20 can receive the digital broadcasting signals from the transmitting devices 10-1 to 10-3, and acquire and hold the viewing history server URL described in the watermark payload transmitted in the video stream as the video watermark. Accordingly, the receiving device 20 can access the viewing history server 30 through the communication line 60 according to the held viewing history server URL (for example, the URL of "http://cdmServer.com/cdm") and transmit the viewing history information (CDM) when it becomes timing to transmit the viewing history information (CDM) to the viewing history server 30.

The viewing history server 30 receives and accumulates the viewing history information (CDM) transmitted from the plurality of receiving devices 20 through the communication line 60. The viewing history server 30 applies analysis processing and the like, for example, to the viewing history information (CDM) collected from the plurality of receiving devices 20 as described above, thereby to generate the viewing history report of each broadcasting station.

(Method of Notifying Viewing History Server URL)

Figure 26:
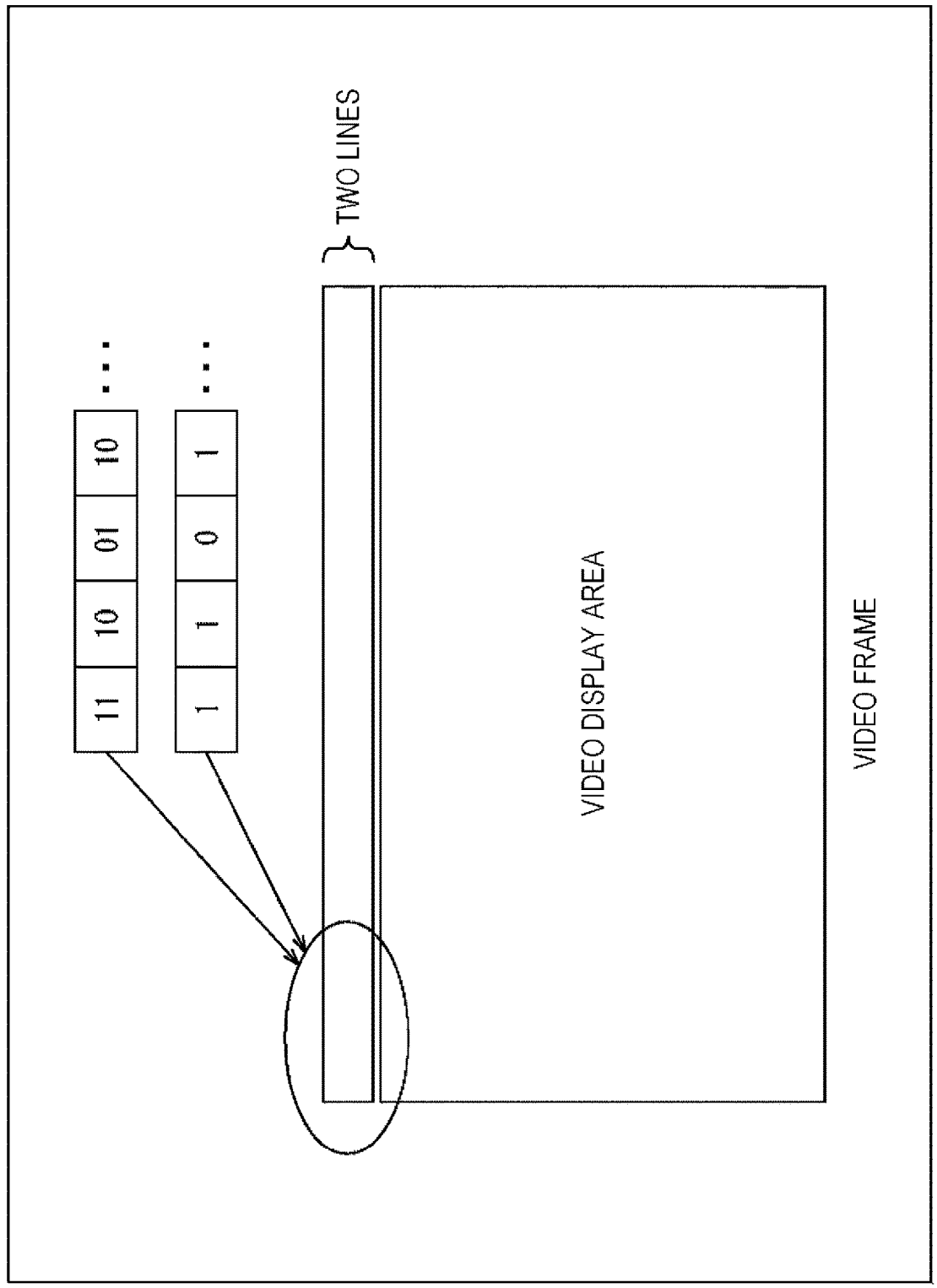
FIG. 26 is a diagram illustrating a method of notifying a viewing history server URL in a case of using a video watermark.

FIG. 26 is a diagram illustrating a method of notifying the viewing history server URL in the case of using a video watermark.

As illustrated in FIG. 26, in one video frame, upper-side two lines of a video display area can be used as the video watermark. In these two lines used as the video watermark, either standard data transmission that is a method of transmitting 1-bit information amount in one block, or two time magnification data transmission that is a method of transmitting 2-bit information amount in one block can be used.

For example, in FIG. 26, in a case of using the standard data transmission, "1" is stored in the head block, "1" is stored in the second block, "0" is stored in the third block, and "1" is stored in the fourth block, in sequence, and one bit of "0" or "1" is stored in each of the fifth and subsequent blocks, in sequence. Meanwhile, in a case of using the two time magnification data transmission, "11" is stored in the head block, "10" is stored in the second block, "01" is stored in the third block, and "10" is stored in the fourth block, in sequence, and 2 bits of a combination of "0" and "1" is stored in each of the fifth and subsequent blocks, in sequence.

Further, in the video watermark, the watermark payload is transmitted using the two lines of the video bitstream.

(Syntax of Watermark Payload)

FIG. 27 is a diagram illustrating an example of syntax of the watermark payload.

In 16-bit run_in_pattern, a transmission pattern of the video watermark and resolution of one area illustrated in the range from white to black are specified. As the transmission pattern, one line or two lines are specified. Further, as the resolution of one area, 8 to 12 bits are specified.

wm_message( ) represents a message area of the watermark. 8-bit zero_pad represents zero padding.

(Syntax of WM Message) FIG. 28 is a diagram illustrating an example of syntax of WM message (wm_message) of FIG. 27.

In 8-bit wm_message_id, a WM message ID is specified. In 8-bit wm_message_length, a WM message length is specified.

In 4-bit wm_message_sequence, a sequence of WM message is specified. In 2-bit fragment_number and 2-bit last_fragment, information related to fragment is specified.

Here, in a case where "0x01" is specified as WM message ID, a content ID message (content_id_message) is arranged. Further, in a case where "0x02" is specified as WM message ID, a channel ID message (channel_id_message) is arranged. Further, in a case where "0x03" is specified as WM message ID, a URI message (uri_message) is arranged.

Then, in a case where the viewing history server URL is described in the watermark payload, the URI message is used. Therefore, here, "0x03" is specified as WM message ID.

Note that the WM message includes error-detecting codes such as message_CRC_32 and CRC_32.

(Syntax of URI Message)

FIG. 29 is a diagram illustrating an example of syntax of URI message (uri_message) of FIG. 28.

In 8-bit uri_type, a type of a URI is specified. In 8-bit uri_strlen, a URI length is specified. URI_string( ) is made of 8*uri_strlen bits, and in URI_string( ) a uniform resource identifier (URI) according to the type of a URI specified in uri_type is specified.

For example, FIG. 30 illustrates that TBD is specified in a case where "0x01" or "0x02" is specified as uri_type. Further, FIG. 30 illustrates that the URL (viewing history server URL) of the viewing history server 30 is specified in a case where "0x03" is specified as uri_type. Note that "0x00", and "0x04" to "0xFF" in uri_type are values reserved for future expansion.

Figure 31:
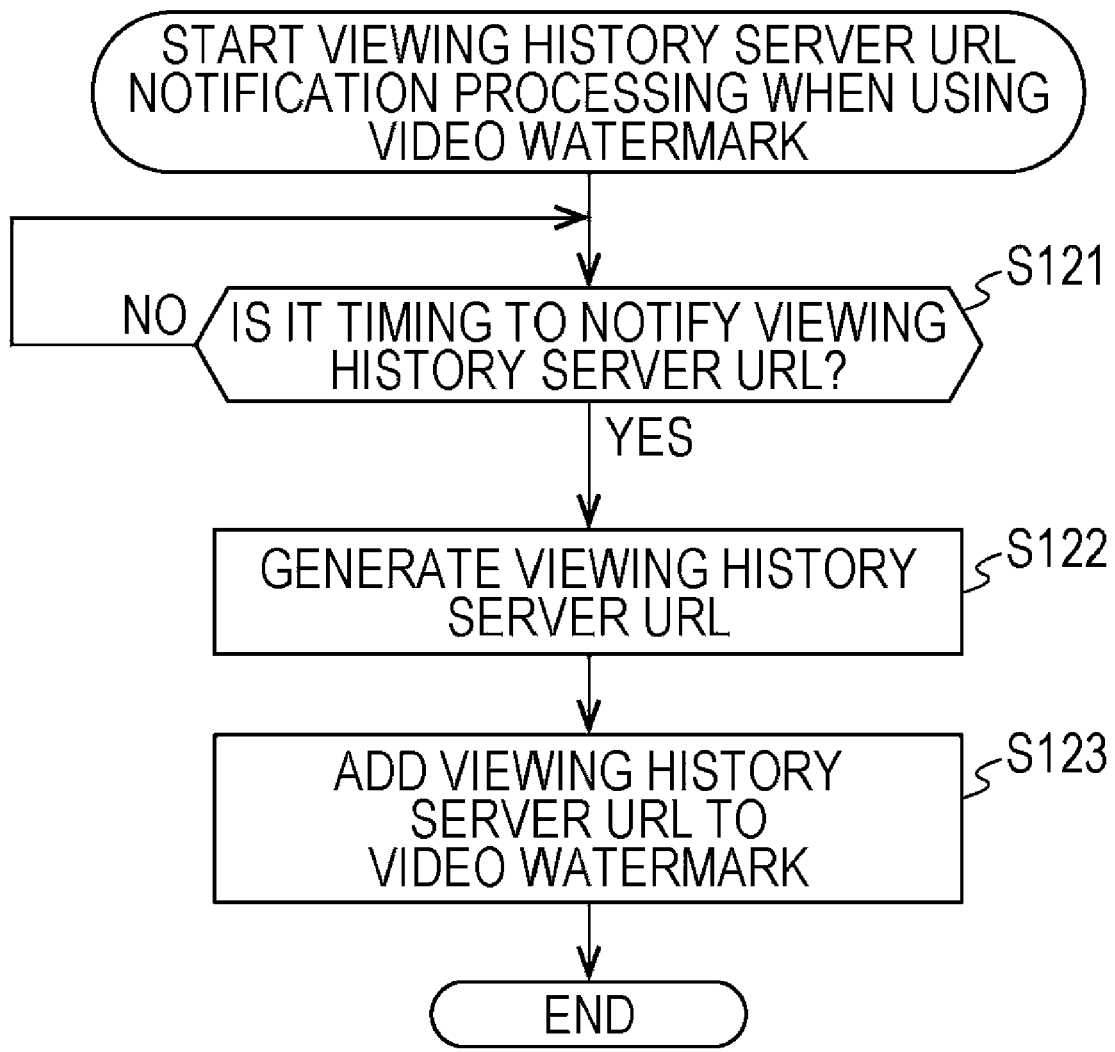
FIG. 31 is a flowchart for describing viewing history server URL notification processing in a case of using a video watermark.

Next, details of processing executed in the devices that configure the transmission system 1 of FIG. 1 in a case where the method 2 is employed will be described with reference to the flowcharts of FIGS. 31 and 32.

(Viewing History Server URL Notification Processing)

First, a flow of viewing history server URL notification processing in a case of using the video watermark will be described with reference to the flowchart of FIG. 31. Note that this viewing history server URL notification processing is processing executed in parallel to the processing of step S101 of FIG. 16 by the transmitting device 10 of FIG. 1.

In step S121, the control unit 111 determines whether it is timing to notify the viewing history server URL.

In step S121, when it is determined not to be the timing to notify the viewing history server URL, the determination processing of step S121 is repeated. Meanwhile, in step S121, when it is determined to be the timing to notify the viewing history server URL, the processing proceeds to step S122.

In step S122, the viewing history server URL generating unit 151 generates a viewing history server URL of a target viewing history server 30. The viewing history server URL generated as described above is supplied to the video processing unit 113 in the case of employing the method 2.

In step S123, the video processing unit 113 adds (describes) the viewing history server URL generated in the processing of step S122 to (the URI message of the WM message of) the watermark payload transmitted as the video watermark of each frame, in processing the video stream.

At this time, in the URI message, "0x03" is specified as uri_type. Further, for example, as illustrated in FIG. 25, in a case where the viewing history server 30 is jointly managed by the broadcasting station A, the broadcasting station B, and the broadcasting station C, "http://cdmServer.com/cdm" is described in URI_string( ) of the URI message as the viewing history server URL, in the transmitting devices 10-1 to 10-3 of the broadcasting station A, the broadcasting station B, and the broadcasting station C.

The flow of the viewing history server URL notification processing has been described. In the viewing history server URL notification processing, uri_type as "0x03" and URI_string( ) in which the viewing history server URL is specified are described in the URI message of the WM message of the watermark payload. Then, the video frame (video stream) including the video watermark of which the watermark payload including the URI message is to be transmitted is generated (S101 of FIG. 16), and is included in the digital broadcasting signal and transmitted (S102 of FIG. 16).

(Viewing History Server URL Acquisition Processing)

Next, a flow of viewing history server URL acquisition processing in a case of using the video watermark will be described with reference to the flowchart of FIG. 32. Note that the viewing history server URL acquisition processing is processing executed during viewing of the content of the service selected according to the channel selection operation by the user, in the receiving device 20 of FIG. 1.

In step S261, the operation signal and the like from the input unit 213 are monitored by the control unit 211, and the processing stands by until the service channel selection event is generated. Then, in step S262, when it is determined that the service channel selection event has been generated, the processing proceeds to step S263.

In step S263, the broadcasting control unit 251 performs channel selection processing by controlling the operations of the receiving unit 214 and the like based on the channel selection information recorded in the recording unit 212.

In step S264, the broadcasting control unit 251 renders (the streams of) the components of the video, audio, and caption by controlling the video processing unit 216, the audio processing unit 218, and the caption processing unit 220.

In step S265, whether to perform processing for the video watermark is determined. In step S265, when it is determined to perform the processing for the video watermark, the processing proceeds to step S266. In step S266, the video processing unit 216 determines whether the viewing history server URL is described in (the URI message of the WM message of) the watermark payload transmitted as the video watermark.

In step S266, when it is determined that the viewing history server URL is described in (the URI message of the WM message of) the watermark payload, the processing proceeds to step S267. In step S267, the viewing history server URL acquiring unit 254 acquires the viewing history server URL described in (the URI message of the WM message of) the watermark payload according to a processing result of step S266, and records the viewing history server URL to the recording unit 212.

Meanwhile, in step S266, when it is determined that the viewing history server URL is not described in (the URI message of the WM message of) the watermark payload, the processing proceeds to step S268. In step S268, the video processing unit 216 performs another video watermark processing (for example, processing for the content ID message, the channel ID message, and the like).

When the processing of step S267 or the processing of step S268 is terminated, the processing proceeds to step S269. Further, in step S265, when it is determined not to perform the processing for the video watermark, the processing from steps S266 to S268 is skipped, and the processing proceeds to step S269.

In step S269, whether the viewing by the user is terminated is determined. In step S269, when it is determined that the viewing is not terminated, the processing is returned to step S264, and the processing of step S264 and the subsequent steps is repeated. Meanwhile, in step S269, when it is determined that the viewing is terminated, the viewing history server URL acquisition processing of FIG. 32 is terminated.

The flow of the viewing history server URL acquisition processing has been described. In the viewing history server URL acquisition processing, the watermark payload is transmitted with the video watermark when the service channel selection even has been generated or at the time of viewing the content, and the viewing history server URL is acquired and recorded when the viewing history server URL is described in the URI message of the WM message.

Figure 32:
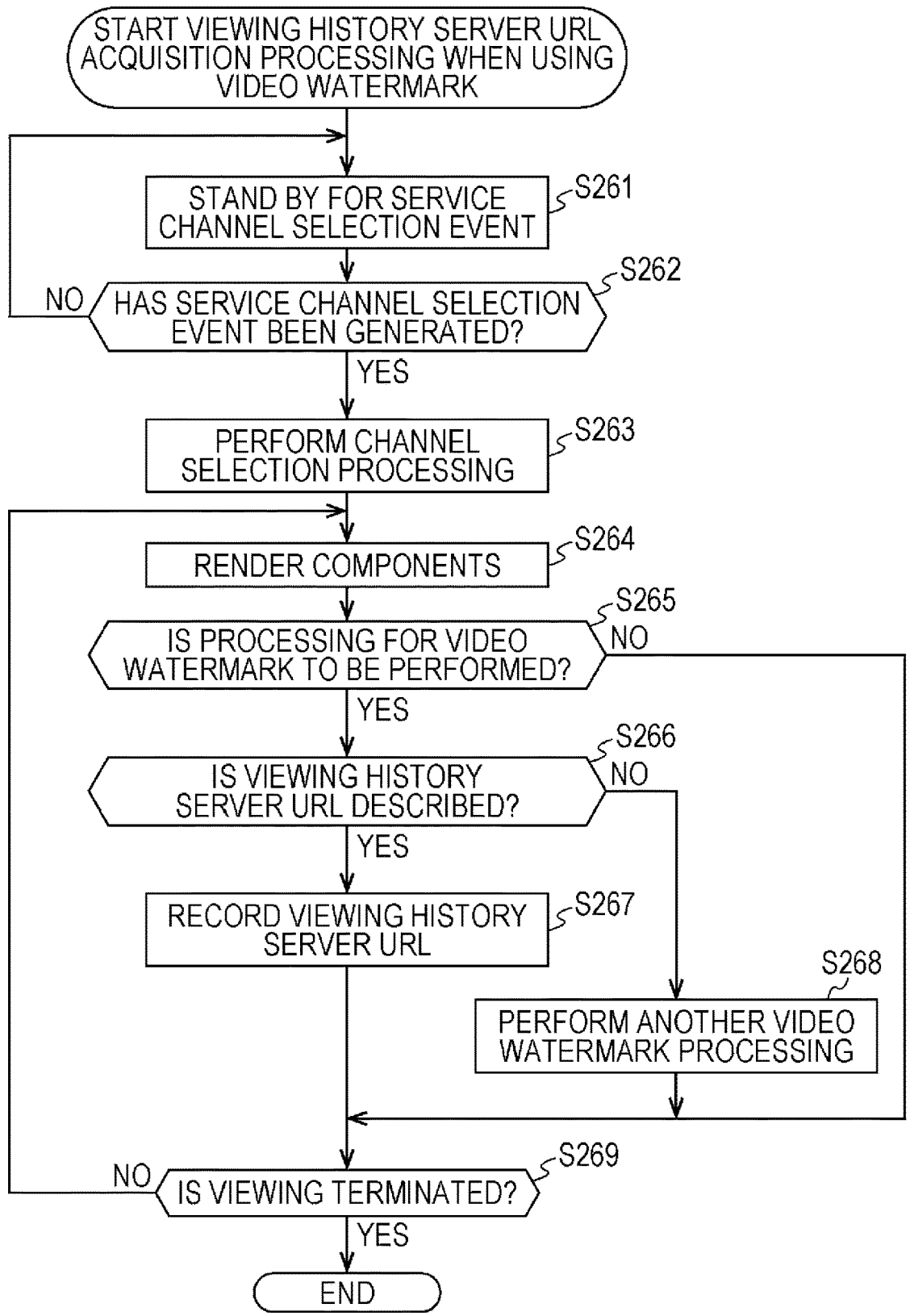
FIG. 32 is a flowchart for describing viewing history server URL acquisition processing in a case of using a video watermark.

Note that, in the viewing history server URL acquisition processing of FIG. 32, a case where the viewing history server URL described in the URI message is acquired at the time of viewing the content has been exemplarily described. However, the viewing history server URL transmitted using the video watermark may be acquired and recorded (newly recorded or updated) at another timing.

Figure 23:
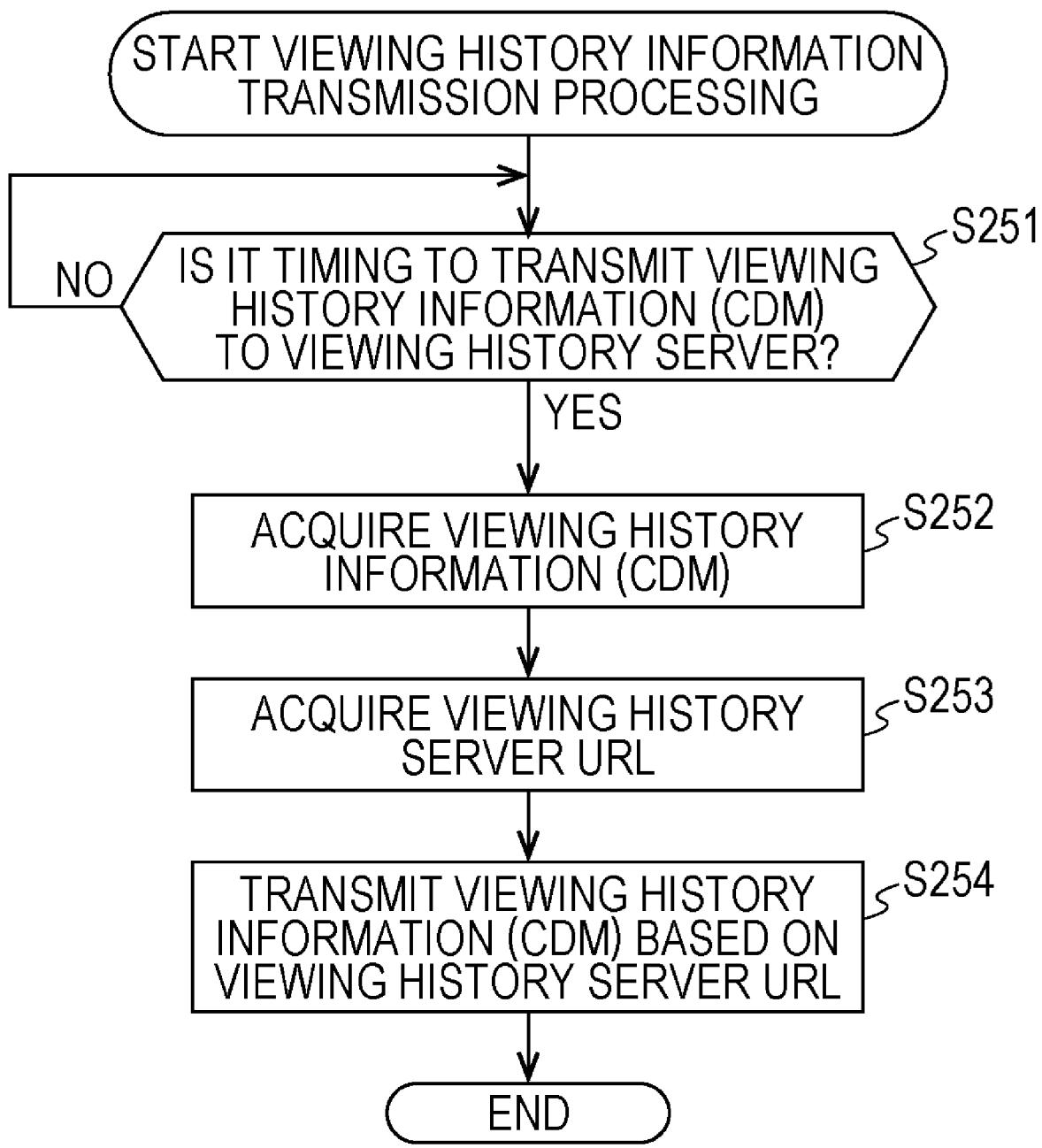
FIG. 23 is a flowchart for describing viewing history information transmission processing.

Further, even in the case of employing the method 2, in the receiving device 20, the viewing history information transmission processing of FIG. 23 is executed, and the viewing history information (CDM) is transmitted to the viewing history server 30 through the communication line 60 based on the viewing history server URL acquired from (the URI message of the WM message of) the watermark payload transmitted with the video watermark, when it becomes timing to transmit the viewing history information (CDM) to the viewing history server 30.

In the case of employing the method 2 that is a method of using a video watermark, as the method of transmitting the viewing history server URL, as described above, the viewing history server URL is notified from the transmitting device 10 to the receiving device 20 by including the viewing history server URL to the video watermark. Further, in the case of employing such a method 2, the receiving device 20 that performs the direct reception with an antenna can process the watermark payload transmitted as the video watermark, and even the receiving device 20 that performs the indirect reception through the MVPD can process the watermark payload transmitted as the video watermark. Therefore, the viewing history server URL included in (the URI message of the WM message of) the watermark payload can be acquired and used at the time of transmitting the viewing history information (CDM), regardless of a reception environment.

In the above description, a case of including the viewing history server URL to the video watermark has been described. However, in a case where an audio watermark can be used, the viewing history server URL may be included to the watermark payload using the audio watermark.

(3) Method 3: Transmission of Viewing History Server URL Using Audio User Data (Collection Example of Viewing History Information)

Figure 33:
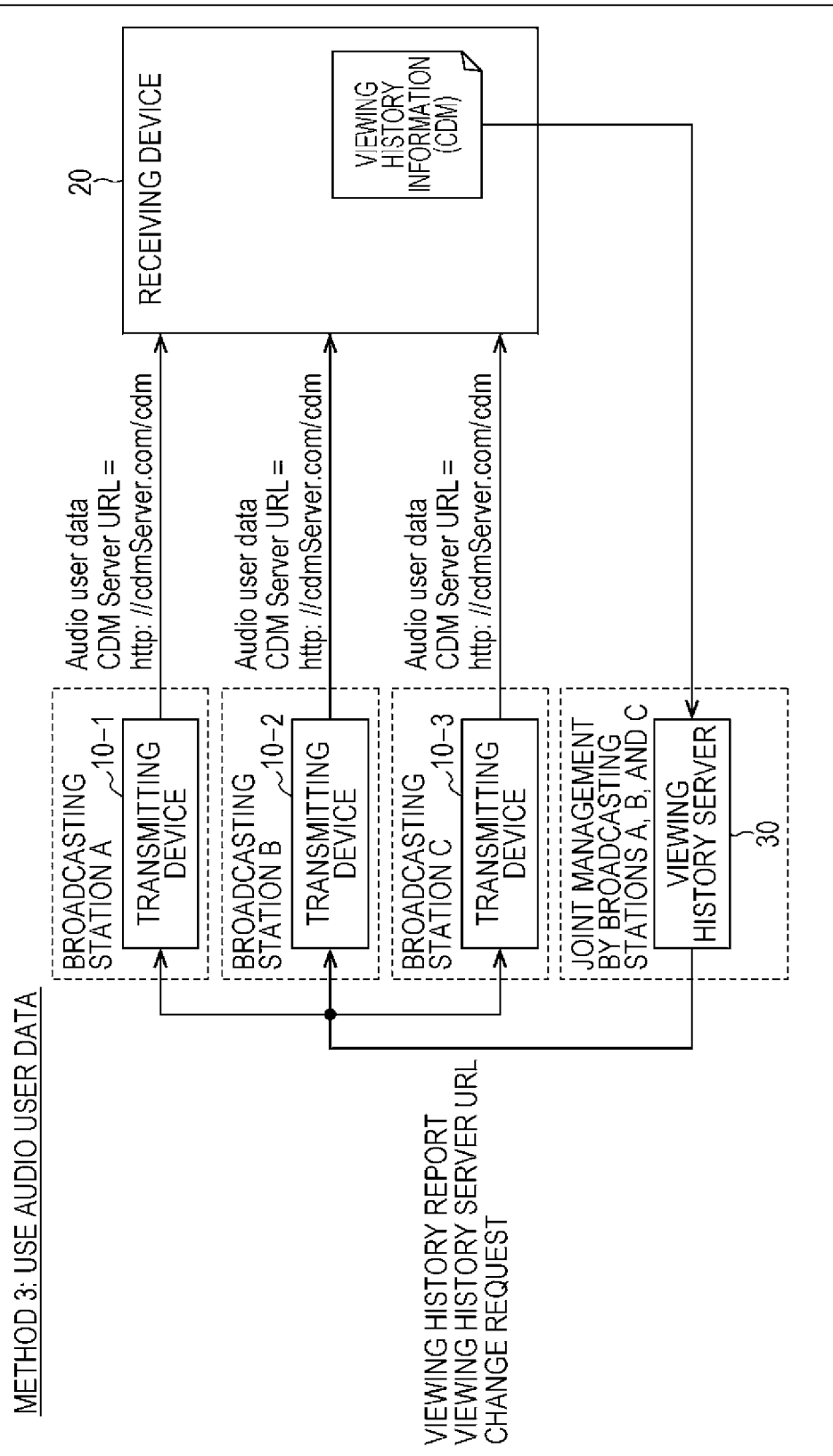
FIG. 33 is a diagram of a collection example of viewing history information (CDM) in a case of transmitting a viewing history server URL using audio user data.

FIG. 33 is a diagram illustrating a collection example of the viewing history information (CDM) in a case of transmitting the viewing history server URL using audio user data.

In FIG. 33, the transmitting device 10 of each broadcasting station includes the viewing history server URL to the digital broadcasting signal and transmits the signal by the method 3 using audio user data. To be specific, the viewing history server URL is described in the audio user data transmitted with an audio stream.

Here, the viewing history server 30 is jointly managed by the broadcasting station A, the broadcasting station B, and the broadcasting station C. Therefore, the transmitting devices 10-1 to 10-3 notify the same viewing history server URL (for example, the URL of "http://cdmServer.com/cdm") for accessing the viewing history server 30 by the audio user data of the audio streams transmitted by the digital broadcasting signals.

The receiving device 20 can receive the digital broadcasting signals from the transmitting devices 10-1 to 10-3, and acquire and hold the viewing history server URL described in the audio user data transmitted by the audio streams. Accordingly, the receiving device 20 can access the viewing history server 30 through the communication line 60 and transmit the viewing history information (CDM) according to the held viewing history server URL (for example, the URL of "http://cdmServer.com/cdm") when it becomes timing to transmit the viewing history information (CDM) to the viewing history server 30.

The viewing history server 30 receives and accumulates the viewing history information (CDM) transmitted from the plurality of receiving devices 20 through the communication line 60. The viewing history server 30 can generate the viewing history report of each broadcasting station by applying analysis processing and the like to the viewing history information (CDM) collected from the plurality of receiving devices 20 as described above.

(Syntax of SYS Metaframe)

FIG. 34 is a diagram illustrating an example of syntax of an SYS metaframe (SysMetaFrame) defined by MPEG-H 3D Audio.

In 8-bit sysType, a type of a system is specified. In dataLen, a data length is specified. sysData is made of 8*dataLen bits, and in sysData, data according to the type specified in sysType is specified.

For example, FIG. 35 illustrates that data specified in sysData is used by "SYS_MP2TS", that is, a MPEG2 TS system, in a case where "1" is specified as sysType. Further, FIG. 35 illustrates that data specified in sysData is used by "SYS_MMT", that is, an MMT system, in a case where "2" is specified as sysType.

Further, FIG. 35 illustrates that data specified in sysData is used by "SYS_DASH", that is, an MPEG-DASH system, in a case where "3" is specified as sysType. Note that the value of sysType as "0" is undefined. Further, "4" to "127" in the value of sysType are values reserved for future use by the International Organization for Standardization (ISO). Further, "128" to "255" are values reserved for future expansion.

Here, for example, when "128" is specified as sysType by allocating "128", among the values for future expansion of "128" to "255", to "SYS_ATSC3.0", use of the data specified in sysData by an ATSC 3.0 system can be illustrated.

FIG. 36 is a diagram illustrating an example of syntax of sysData (sysData_atsc3.0) in a case where "SYS_ATSC3.0" is specified as sysType.

In 4-bit version, a version is specified. In 4-bit sys_data_type, a data type is specified. Here, in a case where "cdm_uri" is specified as sys_data_type, cdm_uri_length and cdm_uri are specified.

In 16-bit cdm_uri_length, a URI length is specified. cdm_uri is made of 8*cdm_uri_length bits, and in cdm_uri, a URI as the viewing history server URL is specified.

Figure 37:
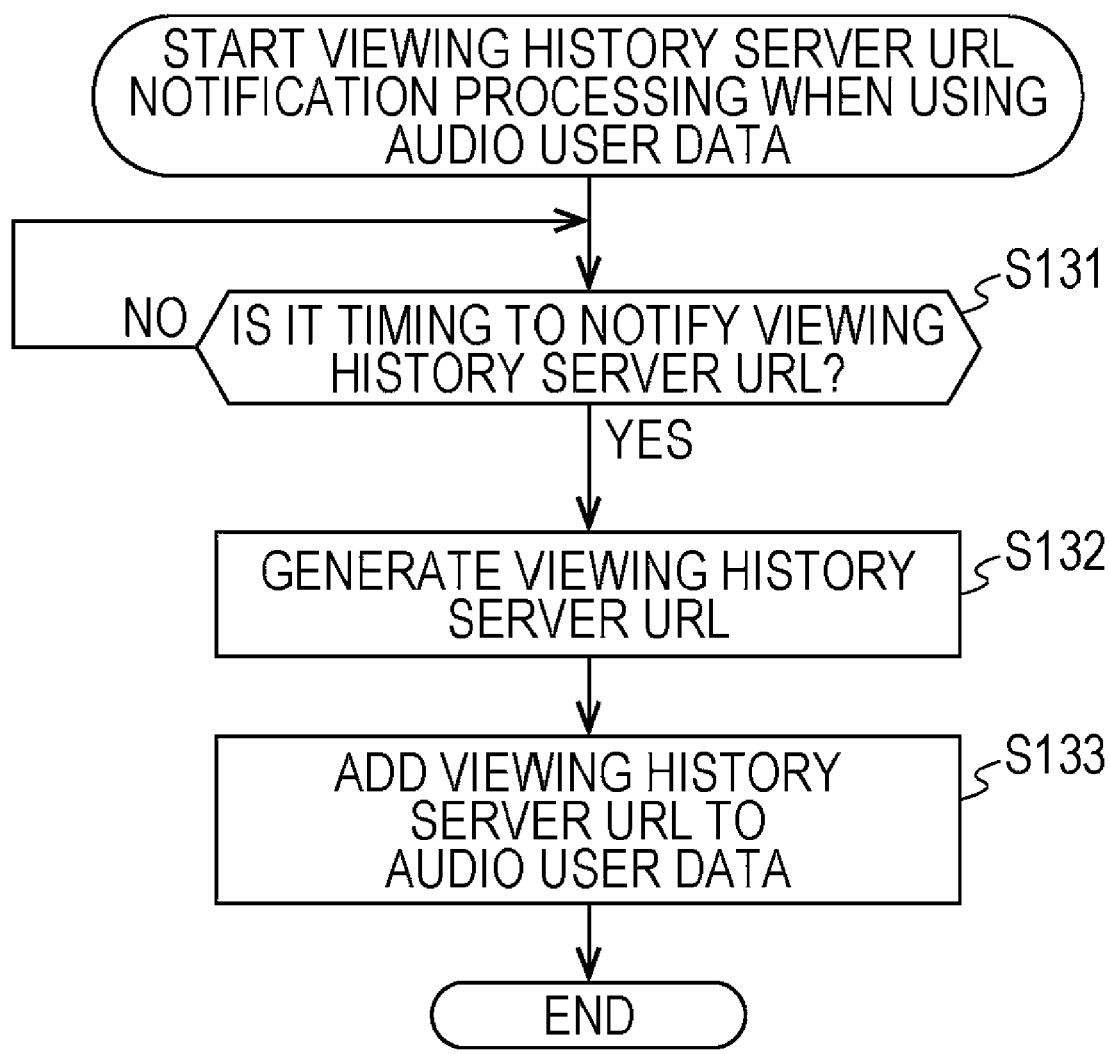
FIG. 37 is a flowchart for describing viewing history server URL notification processing in a case of using audio user data.

Next, details of processing executed in the devices that configure the transmission system 1 of FIG. 1 in a case where the method 3 is employed will be described with reference to the flowcharts of FIGS. 37 and 38.

(Viewing History Server URL Notification Processing)

First, a flow of viewing history server URL notification processing in a case of using the audio user data will be described with reference to the flowchart of FIG. 37. Note that this viewing history server URL notification processing is processing executed in parallel to the processing of step S101 of FIG. 16 by the transmitting device 10 of FIG. 1.

In step S131, the control unit 111 determines whether it is timing to notify the viewing history server URL.

In step S131, when it is determined not to be the timing to notify the viewing history server URL, the determination processing of step S131 is repeated. Meanwhile, in step S131, when it is determined to be the timing to notify the viewing history server URL, the processing proceeds to step S132.

In step S132, the viewing history server URL generating unit 151 generates a viewing history server URL of a target viewing history server 30. The viewing history server URL generated as described above is supplied to the audio processing unit 115 in a case of employing the method 3.

In step S133, the audio processing unit 115 adds the viewing history server URL generated in the processing of step S132 to the audio user data (sysData of the SYS metaframe) in processing an audio stream.

Note that, at this time, in the SYS metaframe (SysMetaFrame), "128" ("SYS_ATSC3.0") is specified as sysType, and sysData_atsc3.0 is used as sysData. Further, in sysData_atsc3.0, "cdm_uri" is specified as sys_data_type. Further, for example, as illustrated in FIG. 33, in a case where the viewing history server 30 is jointly managed by the broadcasting station A, the broadcasting station B, and the broadcasting station C, "http://cdmServer.com/cdm" is described in cdm_uri of sysData_atsc3.0 of the SYS metaframe as the viewing history server URL, in the transmitting devices 10-1 to 10-3 of the broadcasting station A, the broadcasting station B, and the broadcasting station C.

The flow of the viewing history server URL notification processing has been described. In this viewing history server URL notification processing, sys_data_type as "cdm_uri" and cdm_uri in which the viewing history server URL is specified are described in sysData_atsc3.0 of the SYS metaframe. Then, the audio stream including the SYS metaframe including the sysData_atsc3.0 is generated (S101 of FIG. 16), and is included in the digital broadcasting signal and transmitted (S102 of FIG. 16).

(Viewing History Server URL Acquisition Processing)

Next, a flow of viewing history server URL acquisition processing of a case of using the audio user data will be described with reference to the flowchart of FIG. 38. Note that the viewing history server URL acquisition processing is, for example, processing executed during viewing of the content of the service selected according to the channel selection operation by the user, in the receiving device 20 of FIG. 1.

In step S271, the operation signal and the like from the input unit 213 are monitored by the control unit 211, and the processing stands by until the service channel selection event is generated. Then, in step S272, when it is determined that the service channel selection event has been generated, the processing proceeds to step S273.

In step S273, the broadcasting control unit 251 performs channel selection processing by controlling the operation of the receiving unit 214 and the like based on the channel selection information recorded in the recording unit 212.

In step S274, the broadcasting control unit 251 renders (the streams of) the component of the video, audio, and caption by controlling the video processing unit 216, the audio processing unit 218, and the caption processing unit 220.

In step S275, whether to perform processing for the audio user data of the audio stream is determined. In step S275, when it is determined to perform the processing for the audio user data, the processing proceeds to step S276. In step S276, the audio processing unit 218 determines whether the viewing history server URL is described in the audio user data (sysData_atsc3.0 of the SYS metaframe).

In step S276, when it is determined that the viewing history server URL is described in the audio user data (sysData_atsc3.0 of the SYS metaframe), the processing proceeds to step S277. In step S277, the viewing history server URL acquiring unit 254 acquires the viewing history server URL described in the audio user data (sysData_atsc3.0 of the SYS metaframe) according to a processing result of step S276 and records the viewing history server URL to the recording unit 212.

Meanwhile, in step S275, when it is determined not to perform the processing for the audio user data, or in step S276, when it is determined that the viewing history server URL is not described in the audio user data (sysData_atsc3.0 of the SYS metaframe), the processing proceeds to step S278.

In step S278, whether the viewing by the user is terminated is determined. In step S278, when it is determined that the viewing is not terminated, the processing is returned to step S274, and the processing of step S274 and the subsequent steps is repeated. Meanwhile, in step S278, when it is determined that the viewing is terminated, the viewing history server URL acquisition processing of FIG. 38 is terminated.

The flow of the viewing history server URL acquisition processing has been described. In this viewing history server URL acquisition processing, when the service channel selection event has been generated, that is, at the time of viewing of the content, the viewing history server URL is acquired and recorded when the viewing history server URL is described in the audio user data (sysData_atsc3.0 of the SYS metaframe).

Figure 38:
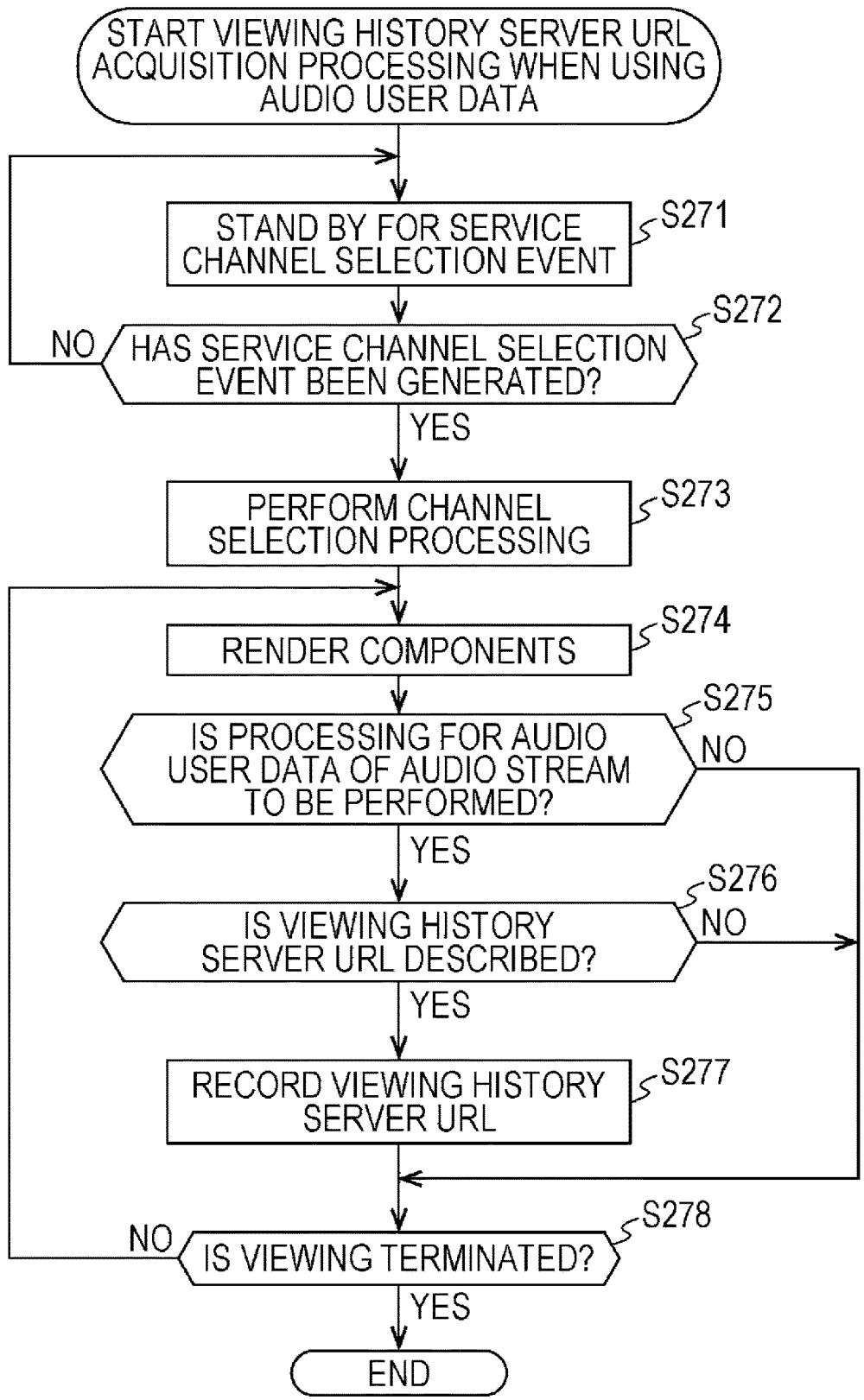
FIG. 38 is a flowchart for describing viewing history server URL acquisition processing in a case of using audio user data.

In the viewing history server URL acquisition processing of FIG. 38, a case where the viewing history server URL described in sysData_atsc3.0 of the SYS metaframe is acquired at the time of viewing the content has been exemplarily described. However, the viewing history server URL transmitted using the audio user data may be acquired and recorded (newly recorded or updated) at another timing.

Further, even in the case of employing the method 3, in the receiving device 20, the viewing history information transmission processing of FIG. 23 is executed, and the viewing history information (CDM) is transmitted to the viewing history server 30 through the communication line 60 based on the viewing history server URL acquired from the audio user data (sysData_atsc3.0 of the SYS metaframe) when it becomes timing to transmit the viewing history information (CDM) to the viewing history server 30.

In the case of employing the method 3 that is a method using audio user data, as the method of transmitting the viewing history server URL, as described above, the viewing history server URL is notified from the transmitting device 10 to the receiving device 20 by including the viewing history server URL to the audio user data. Further, in the case of employing such a method 3, the receiving device 20 that performs the direct reception with an antenna can process the audio user data, and even the receiving device 20 that performs the indirect reception through the MVPD can process the audio user data. Therefore, the viewing history server URL included in the audio user data (sysData_atsc3.0 of the SYS metaframe) can be acquired and used at the time of transmitting the viewing history information (CDM), regardless of a reception environment.

In the above description, a case of including the viewing history server URL in the audio user data (sysData_atsc3.0 of the SYS metaframe) has been described. However, the viewing history server URL may be included using the video user data in a case where the video user data can be used.

(4) Method 4: Transmission of Viewing History Server URL Using Metadata of TTML Document (Collection Example of Viewing History Information)

Figure 39:
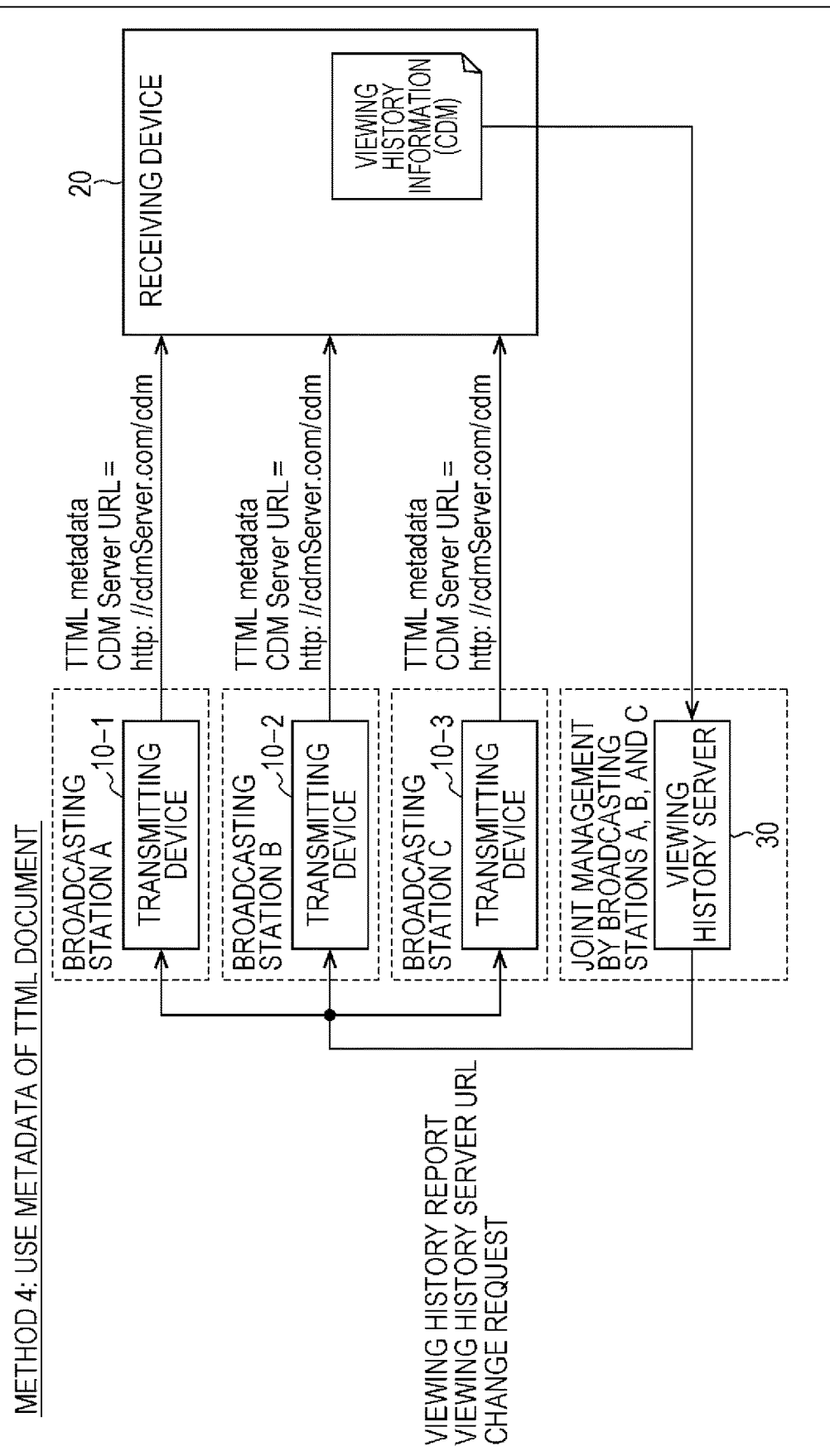
FIG. 39 is a diagram illustrating a collection example of viewing history information (CDM) in a case of transmitting a viewing history server URL using metadata of a TTML document.

FIG. 39 is a diagram illustrating a collection example of the viewing history information (CDM) in a case of transmitting the viewing history server URL using metadata of a TTML document.

In FIG. 39, the transmitting device 10 of each broadcasting station includes the viewing history server URL to the digital broadcasting signal and transmits the signal by the method 4 using metadata of a TTML document. To be specific, the viewing history server URL is described in the metadata of the TTML document transmitted with a caption stream.

Here, the viewing history server 30 is jointly managed by the broadcasting station A, the broadcasting station B, and the broadcasting station C. Therefore, the transmitting devices 10-1 to 10-3 notify the same viewing history server URL (for example, the URL of "http://cdmServer.com/cdm") for accessing the viewing history server 30 by the metadata of the TTML documents of the caption streams transmitted by the digital broadcasting signals.

The receiving device 20 can receive the digital broadcasting signals from the transmitting devices 10-1 to 10-3, and acquire and hold the viewing history server URL described in the metadata of the TTML document transmitted by the caption stream. Accordingly, the receiving device 20 can access the viewing history server 30 through the communication line 60 and transmit the viewing history information (CDM) according to the held viewing history server URL (for example, the URL of "http://cdmServer.com/cdm") when it becomes timing to transmit the viewing history information (CDM) to the viewing history server 30.

The viewing history server 30 receives and accumulates the viewing history information (CDM) transmitted from the plurality of receiving devices 20 through the communication line 60. The viewing history server 30 can generate the viewing history report of each broadcasting station by applying analysis processing and the like to the viewing history information (CDM) collected from the plurality of receiving devices 20, as described above.

(Description Example of TTML Document)

FIG. 40 is a diagram illustrating a description example of the TTML document in an XML format.

In FIG. 40, a cdmUri element for describing the viewing history server URL is described in metadata element of a head element described in the TTML document. Here, a name space of ATSC (ATSC 3.0) as the organization for standardization is defined, and the cdmUri element is caused to belong to the name space of ATSC 3.0, so that the metadata of the TTML document is expanded.

"http://cdmServer.com/cdm" is described between a start tag and an end tag of the cdmUri element as the viewing history server URL. The cdmUri element is expanded in the metadata element in this way, so that the viewing history server URL can be described as the metadata of the TTML document.

Figure 41:
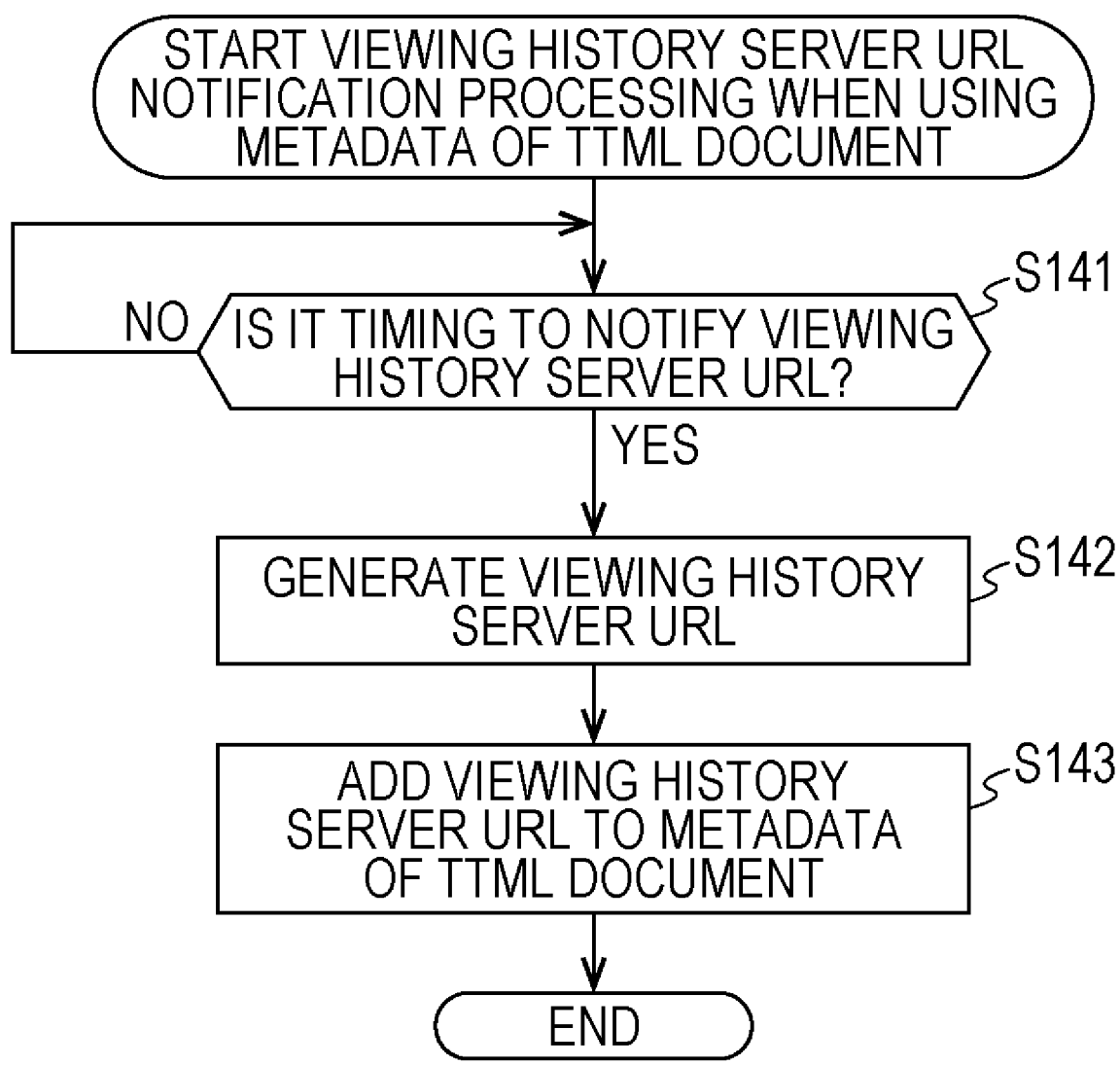
FIG. 41 is a flowchart for describing viewing history server URL notification processing in a case of using metadata of a TTML document.

Next, details of processing executed in the devices that configure the transmission system 1 of FIG. 1 in a case where the method 4 is employed will be described with reference to the flowcharts of FIGS. 41 and 42.

(Viewing History Server URL Notification Processing)

First, a flow of viewing history server URL notification processing in a case of using the metadata of the TTML document will be described with reference to the flowchart of FIG. 41. Note that this viewing history server URL notification processing is processing executed in parallel to the processing of step S101 of FIG. 16 by the transmitting device 10 of FIG. 1.

In step S141, the control unit 111 determines whether it is timing to notify the viewing history server URL.

In step S141, when it is determined not to be the timing to notify the viewing history server URL, the determination processing of step S141 is repeated. Meanwhile, in step S141, when it is determined to be the timing to notify the viewing history server URL, the processing proceeds to step S142.

In step S142, the viewing history server URL generating unit 151 generates a viewing history server URL of a target viewing history server 30. The viewing history server URL generated as described above is supplied to the caption processing unit 117 in a case of employing the method 4.

In step S143, the caption processing unit 117 adds the viewing history server URL generated in the processing of step S142 to the metadata of the TTML document, in processing the caption stream.

However, for example, as illustrated in FIG. 39, in a case where the viewing history server 30 is jointly managed by the broadcasting station A, the broadcasting station B, and the broadcasting station C, "http://cdmServer.com/cdm" is described between the start tag and the end tag of the cdmUri element of the metadata element in the head element of the TTML document, in the transmitting devices 10-1 to 10-3 of the broadcasting station A, the broadcasting station B, and the broadcasting station C.

The flow of the viewing history server URL notification processing has been described. In this viewing history server URL notification processing, the viewing history server URL is described between the start tag and the end tag of the cdmUri element of the metadata element in the head element of the TTML document. Then, the caption stream including the TTML document including the metadata element is generated (S101 of FIG. 16), and is included in the digital broadcasting signal and transmitted (S102 of FIG. 16).

(Viewing History Server URL Acquisition Processing)

Next, a flow of viewing history server URL acquisition processing in a case of using the metadata of the TTML document will be described with reference to the flowchart of FIG. 42. Note that this viewing history server URL acquisition processing is processing executed during viewing of the content of the service selected according to the channel selection operation of the user, by the receiving device 20 of FIG. 1.

In step S281, the operation signal and the like from the input unit 213 are monitored by the control unit 211, and the processing stands by until the service channel selection event is generated. Then, in step S282, when it is determined that the service channel selection event has been generated, the processing proceeds to step S283.

In step S283, the broadcasting control unit 251 performs channel selection processing by controlling the operations of the receiving unit 214 and the like based on the channel selection information recorded in the recording unit 212.

In step S284, the broadcasting control unit 251 renders (the streams of) the components of the video, audio, and caption by controlling the video processing unit 216, the audio processing unit 218, and the caption processing unit 220.

In step S285, whether to perform the processing for the metadata of the TTML document is determined. In step S285, when it is determined to perform the processing for the metadata of the TTML document, the processing proceeds to step S286. In step S286, the caption processing unit 220 determines whether the viewing history server URL is described in the metadata (the cdmUri element of the metadata element) of the TTML document.

In step S286, when it is determined that the viewing history server URL is described in the metadata (the cdmUri element of the metadata element) of the TTML document, the processing proceeds to step S287. In step S287, the viewing history server URL acquiring unit 254 acquires the viewing history server URL described in the metadata (the cdmUri element of the metadata element) of the TTML document according to a processing result of step S286, and records the viewing history server URL to the recording unit 212.

Meanwhile, in step S285, when it is determined not to perform the processing for the metadata of the TTML document, or in step S286, when it is determined that the viewing history server URL is not described in the metadata (the cdmUri element of the metadata element) of the TTML document, the processing proceeds to step S288.

In step S288, whether the viewing by the user is terminated is determined. In step S288, when it is determined that the viewing is not terminated, the processing is returned to step S284, and the processing of step S284 and the subsequent steps is repeated. Meanwhile, in step S288, when it is determined that the viewing is terminated, the viewing history server URL acquisition processing of FIG. 42 is terminated.

The flow of the viewing history server URL acquisition processing has been described. In this viewing history server URL acquisition processing, the viewing history server URL is acquired and recorded when the viewing history server URL is described in the metadata (the cdmUri element of the metadata element) of the TTML document, when the service channel selection event has been generated, that is, at the time of viewing the content.

Figure 42:
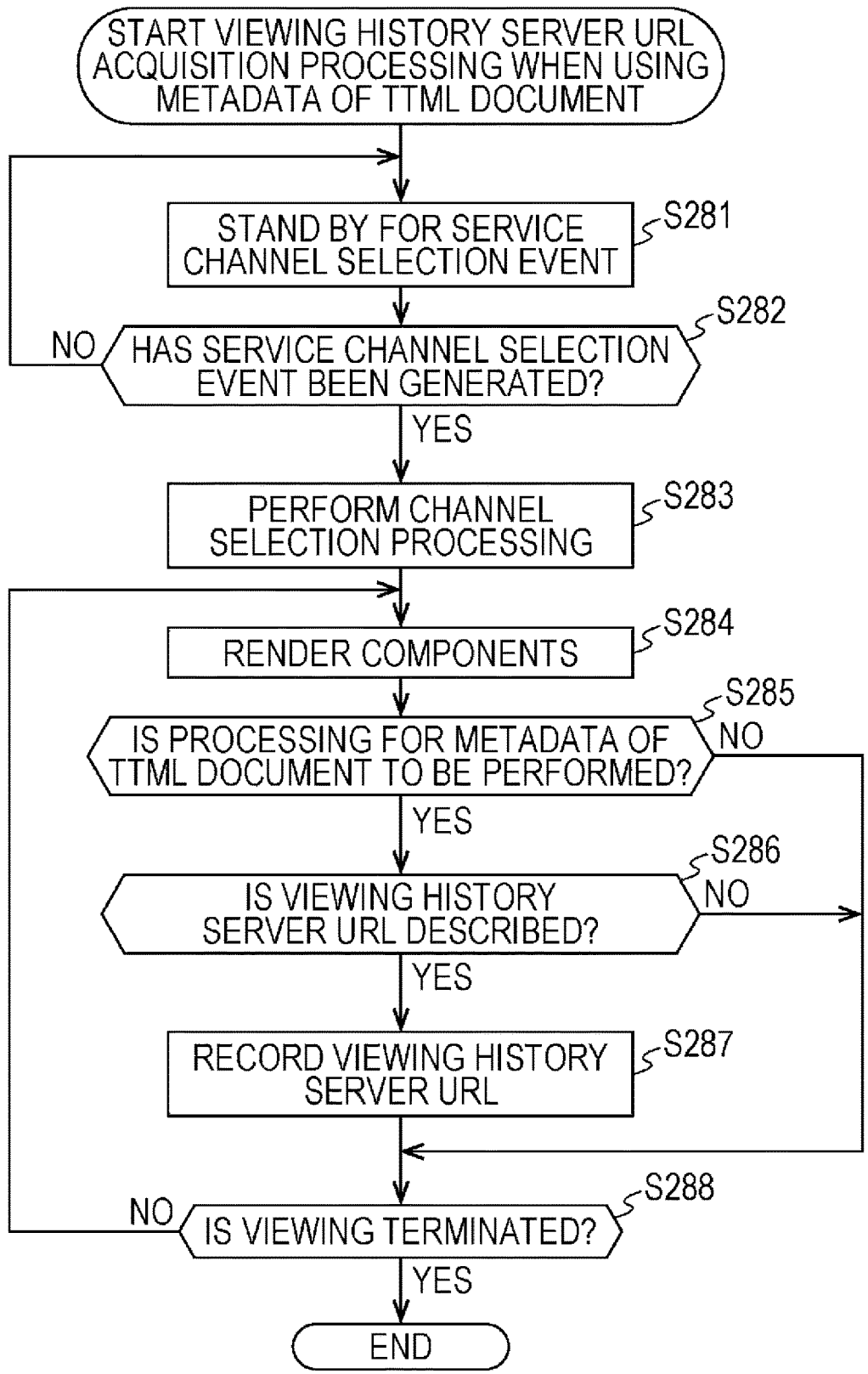
FIG. 42 is a flowchart for describing viewing history server URL acquisition processing in a case of using metadata of a TTML document.

In the viewing history server URL acquisition processing of FIG. 42, a case where the viewing history server URL described in the metadata of the TTML document is acquired at the time of viewing the content has been exemplarily described. However, the viewing history server URL transmitted using the metadata of the TTML document may be acquired and recorded (newly recorded or updated) at another timing.

Further, even in the case of employing the method 4, in the receiving device 20, the viewing history information transmission processing of FIG. 23 is executed, and the viewing history information (CDM) is transmitted to the viewing history server 30 through the communication line 60 based on the viewing history server URL acquired from the metadata (the cdmUri element of the metadata element) of the TTML document, when it becomes timing to transmit the viewing history information (CDM) to the viewing history server 30.

In the case of employing the method 4 that is a method using metadata of a TTML document, as the method of transmitting the viewing history server URL, as described above, the viewing history server URL is notified from the transmitting device 10 to the receiving device 20 by including the viewing history server URL to the metadata of the TTML document. Further, in the case of employing such a method 4, the receiving device 20 that performs the direction reception with an antenna can process the metadata of the TTML document, and even the receiving device 20 that performs the indirect reception through the MVPD can process the metadata of the TTML document. Therefore, the viewing history server URL included in the metadata of the TTML document can be acquired and used at the time of transmitting the viewing history information (CDM), regardless of a reception environment.

4. Modification

In the above description, the ATSC that is the method employed in the US has been described as the standard of terrestrial digital television broadcasting. However, the present embodiments may be applied to the integrated services digital broadcasting (ISDB) that is the method employed in Japan and the like or the digital video broadcasting (DVB) that is the method employed by European countries. Further, the present embodiments are employed not only in the terrestrial digital television broadcasting, but also in satellite digital television broadcasting, digital wired television broadcasting, and the like.

Further, in the above description, the SLT in a binary format has been described. However, the SLT may be in a text format such as the XML format. FIGS. 43 to 46 illustrate examples of the syntax of the SLT in the XML format. Similarly, the descriptor arranged in the SLT is not limited to the binary format, and can be the text format such as the XML format. FIG. 47 illustrates an example of the syntax of the signaling location descriptor in the XML format.

5. Configuration of Computer

Figure 48:
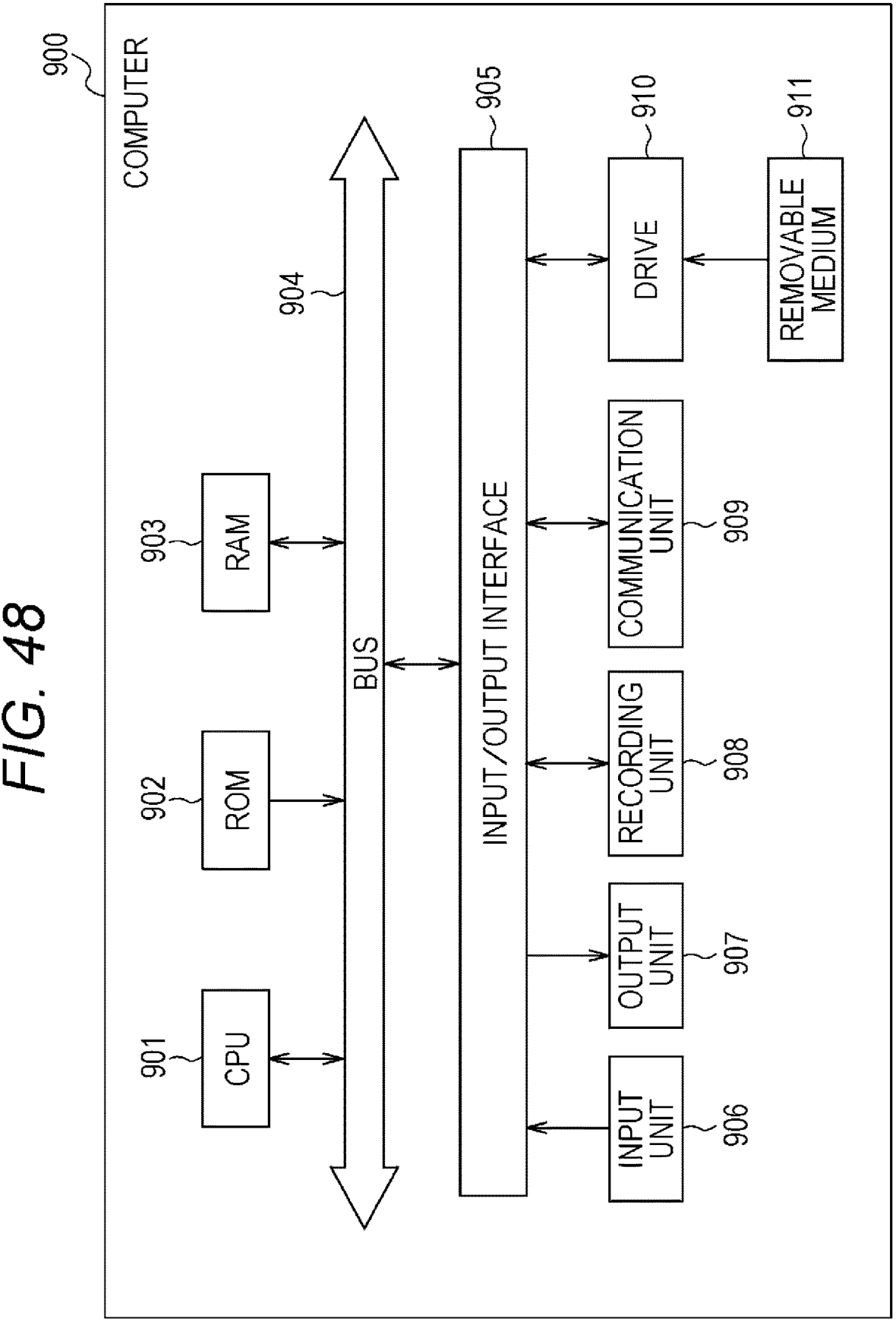
FIG. 48 is a diagram illustrating a configuration example of a computer.

The above-described series of processing can be executed by hardware, or can be executed by software. When the series of processing is executed by software, a program that configures the software is installed to a computer. FIG. 48 is a diagram illustrating a configuration example of hardware of the computer that executes the series of processing by the program.

In a computer 900, a central processing unit (CPU) 901, a read only memory (ROM) 902, a random access memory (RAM) 903 are mutually connected by a bus 904. An input/output interface 905 is further connected to the bus 904. An input unit 906, an output unit 907, a recording unit 908, a communication unit 909, and a drive 910 are connected to the input/output interface 905.

The input unit 906 is made of a keyboard, a mouse, a microphone, and the like. The output unit 907 is made of a display, a speaker, and the like. The recording unit 908 is made of a hard disk, a non-volatile memory, and the like. The communication unit 909 is made of a network interface, and the like. The drive 910 drives a removable medium 911 such as a magnetic disk, an optical disk, a magneto-optical disk, or a semiconductor memory.

In the computer 900 configured as described above, the CPU 901 loads the program recorded in the ROM 902 or the recording unit 908 to the RAM 903 through the input/output interface 905 and the bus 904 and executes the program, so that the above-described series of processing is performed.

The program executed by the computer 900 (CPU 901) can be recorded in the removable medium 911 as a package medium and provided. Further, the program can be provided through a wired or wireless transmission medium such as a local area network, the internet, or digital satellite broadcasting.

In the computer 900, the program can be installed to the recording unit 908 through the input/output interface 905 by attaching the removable medium 911 to the drive 910. Further, the program can be received by the communication unit 909 through the wired or wireless transmission medium, and installed to the recording unit 908. In addition, the program can be installed to the ROM 902 or the recording unit 908 in advance.

Here, in the present specification, the processing performed by the computer according to the program is not necessarily performed in time series along the order described as the flowcharts. That is, the processing performed by the computer according to the program includes processing executed in parallel or in an individual manner (for example, parallel processing or processing by objects). Further, the program may be processed by one computer (processor), or may be processed in a distributed manner by a plurality of computers.

Note that embodiments of the present technology are not limited to the above-described embodiments, and various modification can be made without departing from the gist of the present technology.

Further, the present technology can employ following configurations.

(1)
A receiving device including:
circuitry configured to
receive a digital broadcast stream;
acquire server information corresponding to a viewing history server that collects viewing history information related to a viewing history of content, the server information being included in the digital broadcast stream; and
control transmission of the viewing history information to the viewing history server based on the acquired server information.

(2)
The receiving device according to (1), in which
the digital broadcast stream includes first control information, the first control information including channel selection information for the content,
the server information is included in the first control information, and the circuitry is configured to acquire the server information from the first control information.

(3)
The receiving device according to (2), in which
the first control information specifies the server information for each of a plurality of services provided in the digital broadcast stream, or specifies the server information to be common among the plurality of services, and
the content is included in one of the plurality of services.

(4)
The receiving device according to (2) or (3), in which
the first control information is
arranged in a user datagram protocol (UDP) packet included in an IP packet, and
acquired ahead of second control information transmitted by a real-time object delivery over unidirectional transport (ROUTE) session or an MPEG media transport (MMT) session.

(5)
The receiving device according to (1), in which
the server information is included in a video or audio watermark that is inserted in the content, and
the circuitry is configured to acquire the server information from the watermark.

(6)
The receiving device according to (1), in which
the server information is included in video or audio user data of the content, and
the circuitry is configured to acquire the server information from the user data.

(7)
The receiving device according to (1), in which
the server information is included in metadata of a timed text markup language (TTML) document for displaying closed caption text associated with the content, and
the circuitry is configured to acquire the server information from the metadata of the TTML document.

(8)
The receiving device according to any one of (1) to (7), in which the circuitry is configured to:
manage the viewing history information.

(9)
The receiving device according to any one of (1) to (8), in which
the server information is a uniform resource locator (URL) of the viewing history server, and
the viewing history information is a consumption data message (CDM) including a service identifier field associated with a single virtual channel or non-real-time service and an individual consumption data record.

(10)
A data processing method of a receiving device, the method including:
acquiring, by circuitry of the receiving device, server information corresponding to a viewing history server that collects viewing history information related to a viewing history of content, the server information being included in a digital broadcast stream; and
controlling, by the circuitry of the receiving device, transmission of the viewing history information to the viewing history server based on the acquired server information.

(11)
A transmitting device including:
circuitry configured to
generate server information corresponding to a viewing history server that collects viewing history information related to a viewing history of content, the server information being included in a digital broadcast stream; and
transmit the digital broadcast stream including the generated server information and the content.

(12)
The transmitting device according to (11), in which
the digital broadcast stream includes first control information, the first control information including channel selection information for the content, and
the server information is included in first control information.

(13)
The transmitting device according to (12), in which
the first control information specifies the server information for each of a plurality of services provided in the digital broadcast stream, or specifies the server information to be common among the plurality of services, and
the content is included in one of the plurality of services.

(14)
The transmitting device according to (12) or (13), in which
the first control information is arranged in a user datagram protocol (UDP) packet included in an IP packet, and
acquired ahead of second control information transmitted by a real-time object delivery over unidirectional transport (ROUTE) session or an MPEG media transport (MMT) session.

(15)
The transmitting device according to (11), in which
the server information is included in a video or audio watermark that is inserted in the content.

(16)
The transmitting device according to (11), in which
the server information is included in video or audio user data of the content.

(17)
The transmitting device according to (11), in which
the server information is included in metadata of a timed text markup language (TTML) document for displaying closed caption text associated with the content.

(18)
The transmitting device according to any one of (11) to (17), in which
the circuitry is configured to change the server information according to a request to change the server information.

(19)

The transmitting device according to any one of (11) to (18), in which
the server information is a uniform resource locator (URL) of the viewing history server, and
the viewing history information is a consumption data message (CDM) including a service identifier field associated with a single virtual channel or non-real-time service and an individual consumption data record.

(20)

A data processing method of a transmitting device, the method including:
generating, by circuitry of the transmitting device, server information corresponding to a viewing history server that collects viewing history information related to a viewing history of content, the server information being included in a digital broadcast stream; and
transmitting, by the circuitry of the transmitting device, the digital broadcast stream including the generated server information and the content.

(21)

A receiving device including:
a receiving unit configured to receive a broadcasting wave of digital broadcasting using an Internet protocol (IP) transmission method;
an acquiring unit configured to acquire destination information indicating a destination of a viewing history server that collects viewing history information related to a viewing history of content, the destination information being transmitted with the broadcasting wave; and
a control unit configured to control transmission of the viewing history information to the viewing history server through a communication line based on the acquired destination information.

(22)

The receiving device according to (21), wherein
the destination information is included in first control information including information for controlling channel selection processing of the content and is transmitted, and
the acquiring unit acquires the destination information included in the first control information.

(23)

The receiving device according to (22), wherein
the first control information specifies the destination information for each of services of the content, or specifies the destination information to be common among the services.

(24)

The receiving device according to (22) or (23), wherein
the first control information
is arranged in a user datagram protocol (UDP) packet included in an IP packet and is transmitted, and
is acquired ahead of second control information transmitted by a real-time object delivery over unidirectional transport (ROUTE) session or a MPEG media transport (MMT) session.

(25)

The receiving device according to (21), wherein
the destination information is included in a video or audio watermark that configures the content and is transmitted, and
the acquiring unit acquires the destination information included in the watermark.

(26)

The receiving device according to (21), wherein
the destination information is included in video or audio user data that configures the content and is transmitted, and
the acquiring unit acquires the destination information included in the user data.

(27)

The receiving device according to (21), wherein
the destination information is included in metadata of a timed text markup language (TTML) document in a TTML format for displaying a caption that configures the content and is transmitted, and
the acquiring unit acquires the destination information included in the metadata of the TTML document.

(28)

The receiving device according to any one of (21) to (27), further including:
a managing unit configured to manage the viewing history information.

(29)

The receiving device according to any one of (21) to (28), wherein
the IP transmission method conforms to advanced television systems committee (ATSC) 3.0,
the destination information is a uniform resource locator (URL) of the viewing history server, and
the viewing history information is a consumption data message (CDM) defined by the ATSC.

(30)

A data processing method of a receiving device, the method including the steps of:
acquiring, by the receiving device, destination information indicating a destination of a viewing history server that collects viewing history information related to a viewing history of content, the destination information being transmitted with a broadcasting wave of digital broadcasting using an IP transmission method; and
controlling, by the receiving device, transmission of the viewing history information to the viewing history server through a communication line based on the acquired destination information.

(31)

A transmitting device including:
a generating unit configured to generate destination information indicating a destination of a viewing history server that collects viewing history information related to a viewing history of content, the destination information being transmitted with a broadcasting wave of digital broadcasting using an IP transmission method; and
a transmitting unit configured to transmit the generated destination information with the broadcasting wave together with the content.

(32)

The transmitting device according to (31), wherein
the destination information is included in first control information including information for controlling channel selection processing of the content and is transmitted.

(33)

The transmitting device according to (32), wherein
the first control information specifies the destination information for each of services of the content, or specifies the destination information to be common among the services.

(34)

The transmitting device according to (32) or (33), wherein
the first control information
is arranged in a UDP packet included in an IP packet and is transmitted, and
is acquired ahead of second control information transmitted by a ROUTE session or an MMT session.

(35)

The transmitting device according to (31), wherein the destination information is included in a video or audio watermark that configures the content and is transmitted.

(36)

The transmitting device according to (31), wherein the destination information is included in video or audio user data that configures the content and is transmitted.

(37)

The transmitting device according to (31), wherein the destination information is included in metadata of a TTML document in a TTML format for displaying a caption that configures the content and is transmitted.

(38)

The transmitting device according to any one of (31) to (37), wherein the generating unit changes contents of the destination information according to a change request of the destination information.

(39)

The transmitting device according to any one of (31) to (38), wherein the IP transmission method conforms to ATSC 3.0, the destination information is a URL of the viewing history server, and the viewing history information is a CDM defined by the ATSC.

(40)

A data processing method of a transmitting device, the method including the steps of: generating, by the transmitting device, destination information indicating a destination of a viewing history server that collects viewing history information related to a viewing history of content, the destination information being transmitted with a broadcasting wave of digital broadcasting using an IP transmission method; and transmitting, by the transmitting device, the generated destination information with the broadcasting wave together with the content.

REFERENCE SIGNS LIST

1 Transmission system
10 Transmitting device
20 Receiving device
30 Viewing history server
40 Transmitting facility
50 Distributing device
60 Communication line
111 Control unit
112 Video data acquiring unit
113 Video processing unit
114 Audio data acquiring unit
115 Audio processing unit
116 Caption data acquiring unit
117 Caption processing unit
118 Signaling generating unit
119 Signaling processing unit
120 Multiplexer
121 Transmitting unit
122 Communication unit
151 Viewing history server URL generating unit
211 Control unit
212 Recording unit
213 Input unit
214 Receiving unit
215 Demultiplexer
216 Video processing unit
217 Video output unit
218 Audio processing unit
219 Audio output unit
220 Caption processing unit
221 Display unit
222 Speaker
223 Communication unit
251 Broadcasting control unit
252 Communication control unit
253 Viewing history information managing unit
254 Viewing history server URL acquiring unit
311 Control unit
312 Communication unit
313 Viewing history information accumulating unit
351 Viewing history information managing unit
352 Viewing history information analyzing unit
900 Computer
901 CPU

The invention claimed is:

1. A receiving device comprising:
circuitry configured to
receive a digital broadcast stream that includes content and server information, the server information indicating (i) a Uniform Resource Locator (URL) and (ii) a URL type that is a single 8-bit value and that indicates a type of server corresponding to the URL, the URL type having a different value than the URL,
acquire the URL and the URL type from the digital broadcast stream, and
transmit viewing history information related to a viewing history of the content based on the URL in a case that the acquired URL type acquired from the digital broadcast stream is determined to indicate the server is a viewing history server.

2. The receiving device according to claim 1, wherein the digital broadcast stream includes first control information, the first control information including channel information for the content,
the URL is included in the first control information, and the circuitry is configured to acquire the URL from the first control information.

3. The receiving device according to claim 2, wherein the first control information specifies the URL to be for one of a plurality of services provided in the digital broadcast stream.

4. The receiving device according to claim 2, wherein the first control information is
arranged in a user datagram protocol (UDP) packet included in an IP packet, and
acquired ahead of second control information transmitted by a real-time object delivery over unidirectional transport (ROUTE) session or an MPEG media transport (MMT) session.

5. The receiving device according to claim 1, wherein the circuitry is configured to manage the viewing history information.

6. The receiving device according to claim 1, wherein the viewing history information includes a consumption data message (CDM) including a service identifier.

7. A data processing method of a receiving device, the method comprising:
receiving, by circuitry of the receiving device, a digital broadcast stream that includes content and server information, the server information indicating (i) a Uniform Resource Locator (URL) and (ii) a URL type that is a single 8-bit value and that indicates a type of server corresponding to the URL , the URL type having a different value than the URL;

acquiring, by the circuitry of the receiving device, the URL and the URL type from the digital broadcast stream; and transmitting, by the circuitry of the receiving device, viewing history information related to a viewing history of the content based on the URL in a case that the acquired URL type acquired from the digital broadcast stream is determined to indicate the server is a viewing history server.

8. A transmitting device comprising:
circuitry configured to
generate server information that includes a Uniform Resource Locator (URL) and a URL type, the URL type being a single 8-bit value and indicating a type of server corresponding to the URL is a viewing history server that collects viewing history information related to a viewing history of content , the URL type having a different value than the URL; and transmit a digital broadcast stream that includes the content and the server information to a receiving device configured to transmit the viewing history information based on the URL in a case that the URL type acquired from the digital broadcast stream is determined to indicate the server is a viewing history server.

9. The transmitting device according to claim 8, wherein the digital broadcast stream includes first control information, the first control information including channel information for the content, and
the URL is included in the first control information.

10. The transmitting device according to claim 9, wherein the first control information specifies the URL to be for one of a plurality of services provided in the digital broadcast stream, or specifies the URL to be common among the plurality of services, and
the content is included in the one of the plurality of services.

11. The transmitting device according to claim 9, wherein the first control information is
arranged in a user datagram protocol (UDP) packet included in an IP packet, and
acquired ahead of second control information transmitted by a real-time object delivery over unidirectional transport (ROUTE) session or an MPEG media transport (MMT) session.

12. A data processing method of a transmitting device, the method comprising:
generating, by circuitry of the transmitting device, server information that includes a Uniform Resource Locator (URL) and a URL type, the URL type being a single 8-bit value and indicating a type of server corresponding to the URL is a viewing history server that collects viewing history information related to a viewing history of content , the URL type having a different value than the URL; and transmitting, by the circuitry of the transmitting device, a digital broadcast stream that includes the content and the server information to a receiving device configured to transmit the viewing history information based on the URL in a case that the URL type acquired from the digital broadcast stream is determined to indicate the server is a viewing history server.

13. The data processing method according to claim 7, wherein
the digital broadcast stream includes first control information, the first control information including channel information for the content,
the URL is included in the first control information, and
the URL is acquired from the first control information.

14. The data processing method according to claim 13, wherein the first control information specifies the URL to be for one of a plurality of services provided in the digital broadcast stream.

15. The data processing method according to claim 7, further comprising:
managing the viewing history information.

16. The data processing method according to claim 7, wherein the viewing history information includes a consumption data message (CDM) including a service identifier.

17. The receiving device according to claim 1, wherein the circuitry is configured to connect to the viewing history server using the URL corresponding to the viewing history server.

18. The receiving device according to claim 1, wherein the receiving device is a television receiver.

19. The receiving device according to claim 1, wherein the URL identifies the server as a viewing history server.

20. The data processing method according to claim 7, wherein the URL identifies the server as a viewing history server.

21. The receiving device according to claim 2, wherein the first control information specifies the URL to be common among a plurality of services.

22. The data processing method according to claim 13, wherein the first control information specifies the URL to be common among a plurality of services.

23. The receiving device according to claim 1, wherein the receiving device includes a display unit and a speaker.

* * * * *